United States Patent

[11] 3,620,270

[72] Inventors John C. Jureit
Coral Gables;
Oscar Csakvary, Miami; Adolfo Castillo, Miami; Benjamin H. Kushner, Miami; Otto J. Karch, Miami Springs, all of Fla.
[21] Appl. No. 871,629
[22] Filed Oct. 24, 1969
[45] Patented Nov. 16, 1971
[73] Assignee Automated Building Components, Inc. Miami, Fla.
Continuation of application Ser. No. 675,174, Oct. 13, 1967, now abandoned. This application Oct. 24, 1969, Ser. No. 871,629

[54] AUTOMATED SAW
57 Claims, 47 Drawing Figs.
[52] U.S. Cl. ..................................................... 143/47, 143/6, 144/2
[51] Int. Cl. ..................................................... B27b 5/18, B27b 27/06, B27c 9/00
[50] Field of Search ........................................ 143/6, 7, 47, 48; 144/2, 3, 252

[56] References Cited
UNITED STATES PATENTS
2,662,563  12/1953  Grove ........................... 143/47
2,987,085   6/1961  Porter ........................... 143/47
2,995,162   8/1961  Mountain ........................ 144/3
3,329,181   7/1967  Buss et al. ..................... 143/47

FOREIGN PATENTS
503,487   4/1939  Great Britain ................. 143/47
544,724   8/1957  Canada ......................... 143/47

Primary Examiner—Harrison L. Hinson

ABSTRACT: The fabricating machine comprises a fixed table mounting a length positioner assembly comprising a movable table having a plurality of stops spaced at predetermined intervals therealong and selectively movable for projection above the surface of the movable table. The movable table is driven lengthwise by serially disposed fluid-actuated cylinders having predetermined displacements whereby actuation of one or more of the cylinders displaces the movable table a predetermined distance from a reference point, thereby locating the projected stop a predetermined distance from a saw blade mounted for rotation on a superstructure assembly overlying the saw table. The saw assembly is rotatably driven to a predetermined angular position by an angle positioner assembly comprising serially disposed fluid-actuated cylinders, whereby actuation of one or more of the cylinders causes the saw assembly to rotate to the predetermined angular position for making a selected angle of traverse across the saw table.
Length and angle information for actuating selected cylinders of the length and angle positioner assemblies is provided on punched tape. A tape reader senses the information and an electrical circuit is responsive thereto to provide control signals to valves controlling the fluid-actuated cylinders, whereby selected cylinders are actuated. Pullback and holddown clamps are provided to respectively engage a board to be cut to pull the same against a rear fence and clamp the board against the table, thereby locating the board in proper sawing position and precluding movement of the board during sawing.

INVENTORS
John C. Jureit
Oscar Csakvary
Adolfo Castillo
Benjamin H. Kushner
Otto J. Karch
BY Le Blanc & Shur
ATTORNEYS

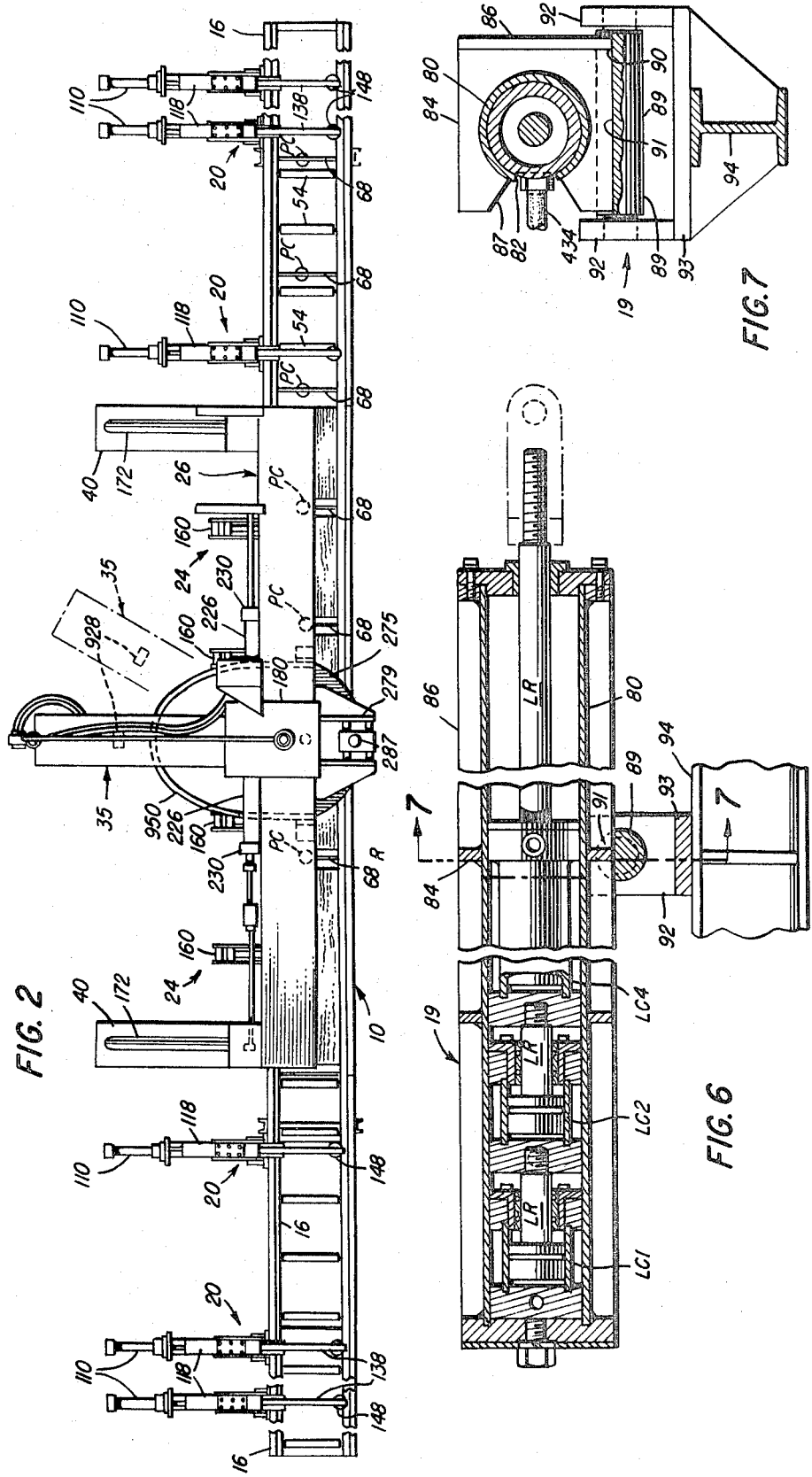

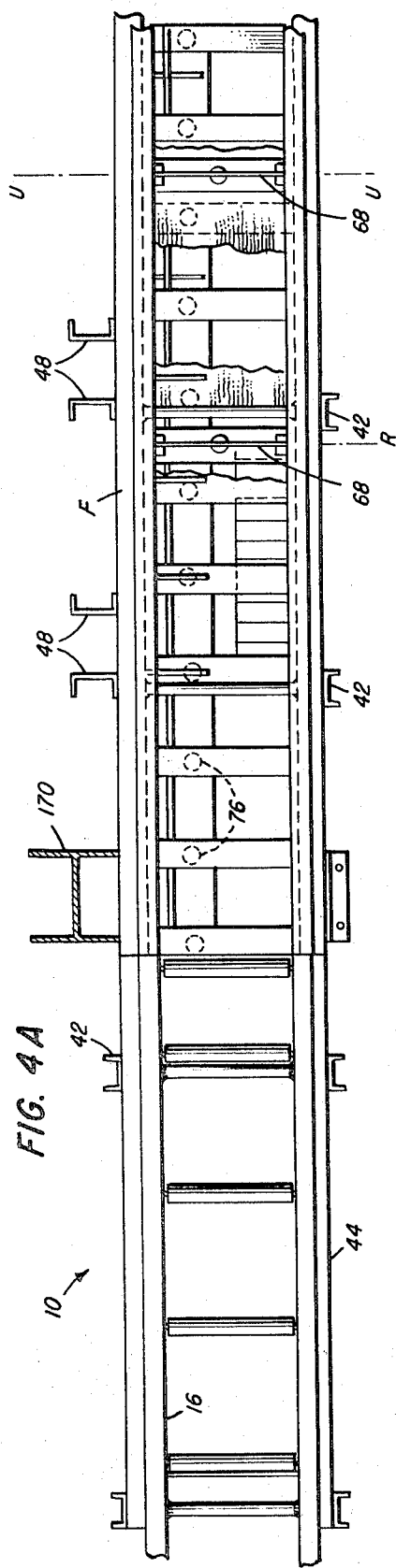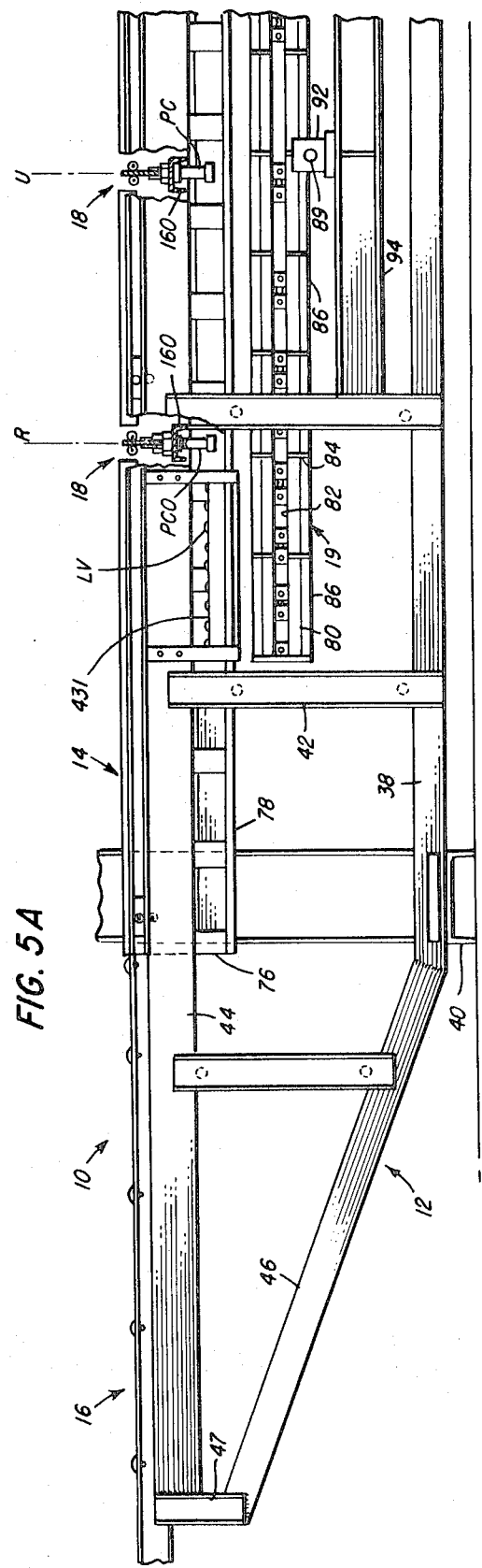

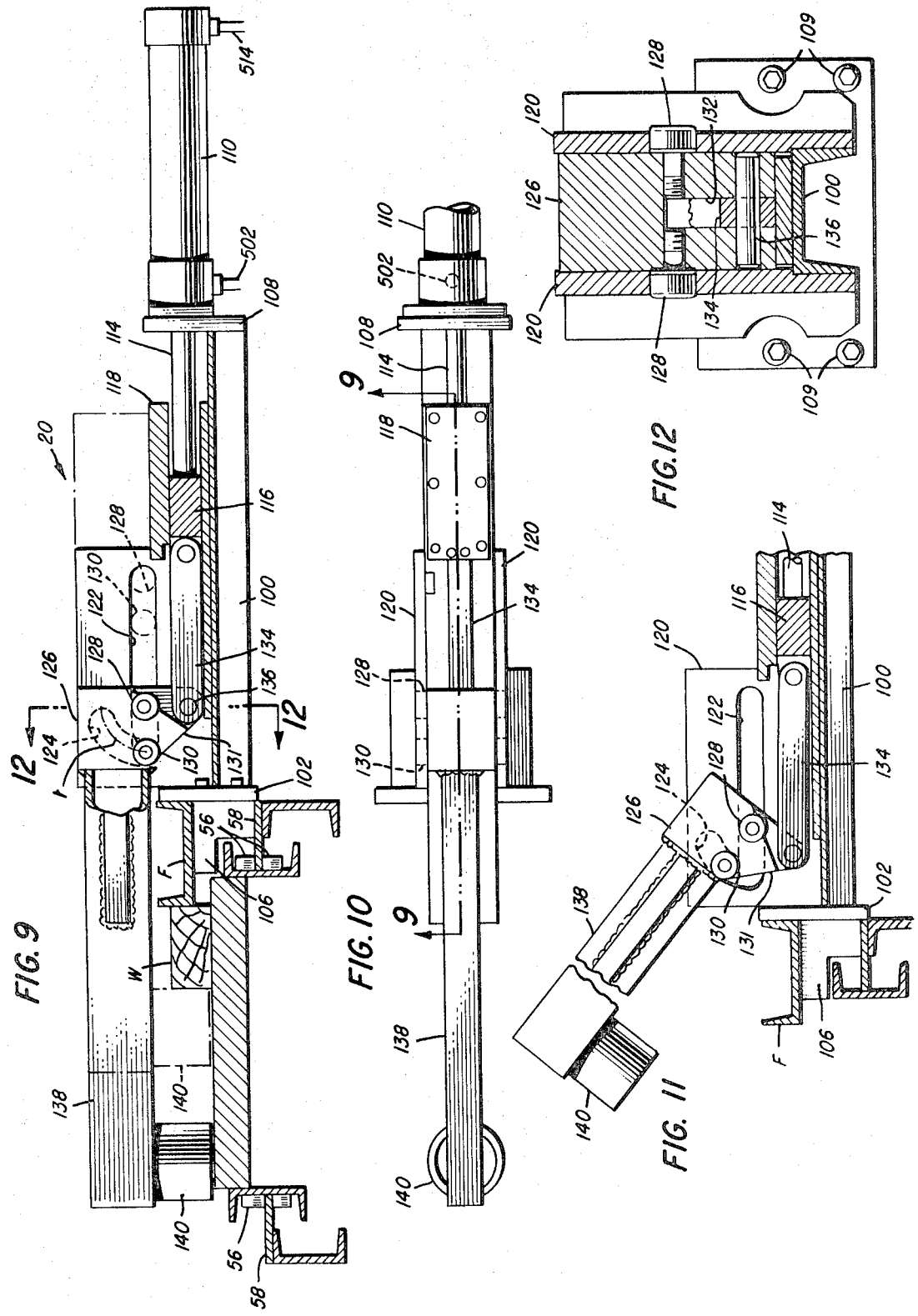

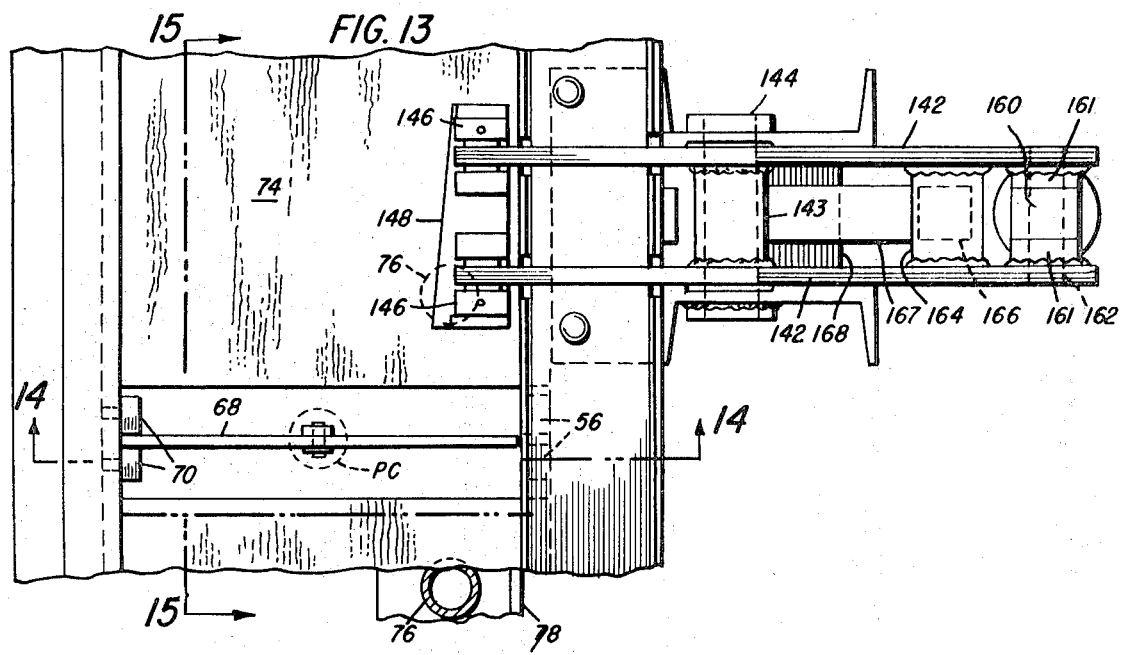
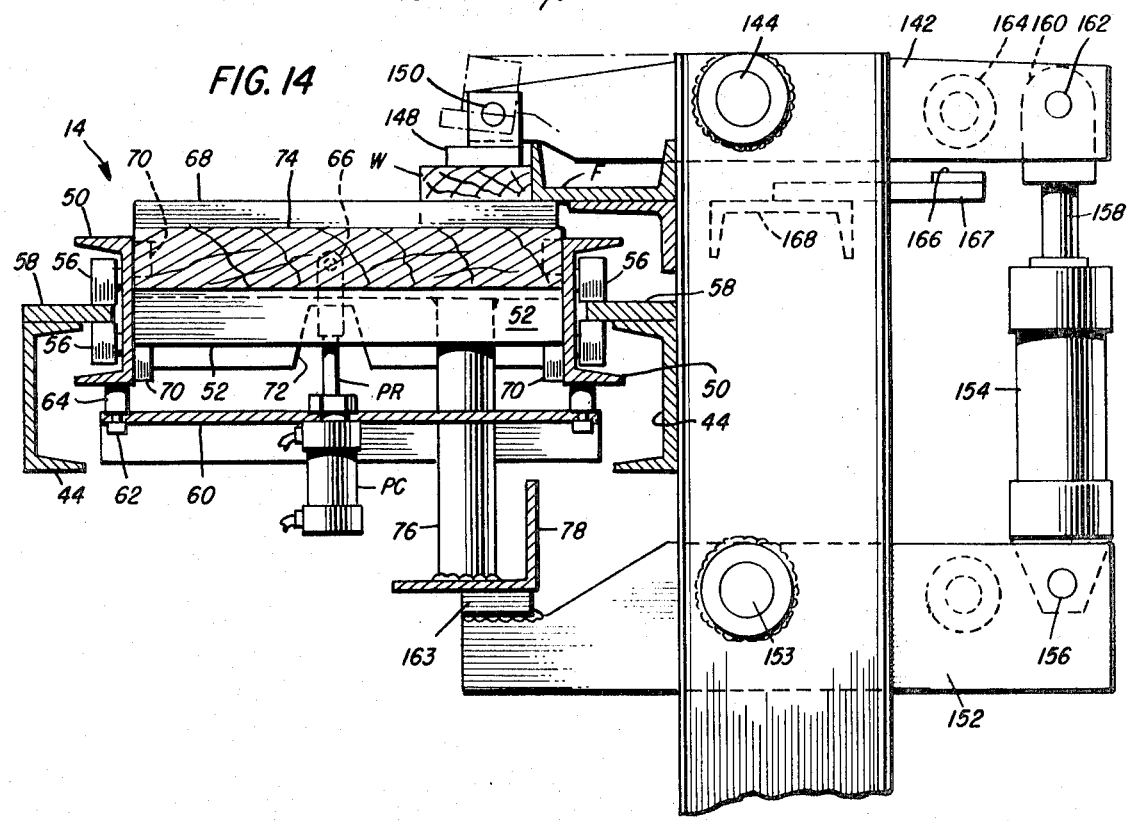

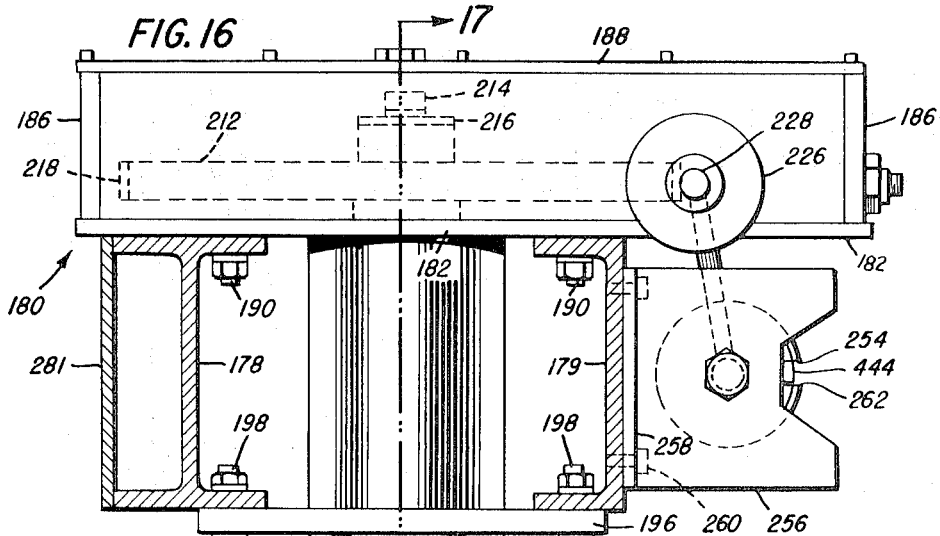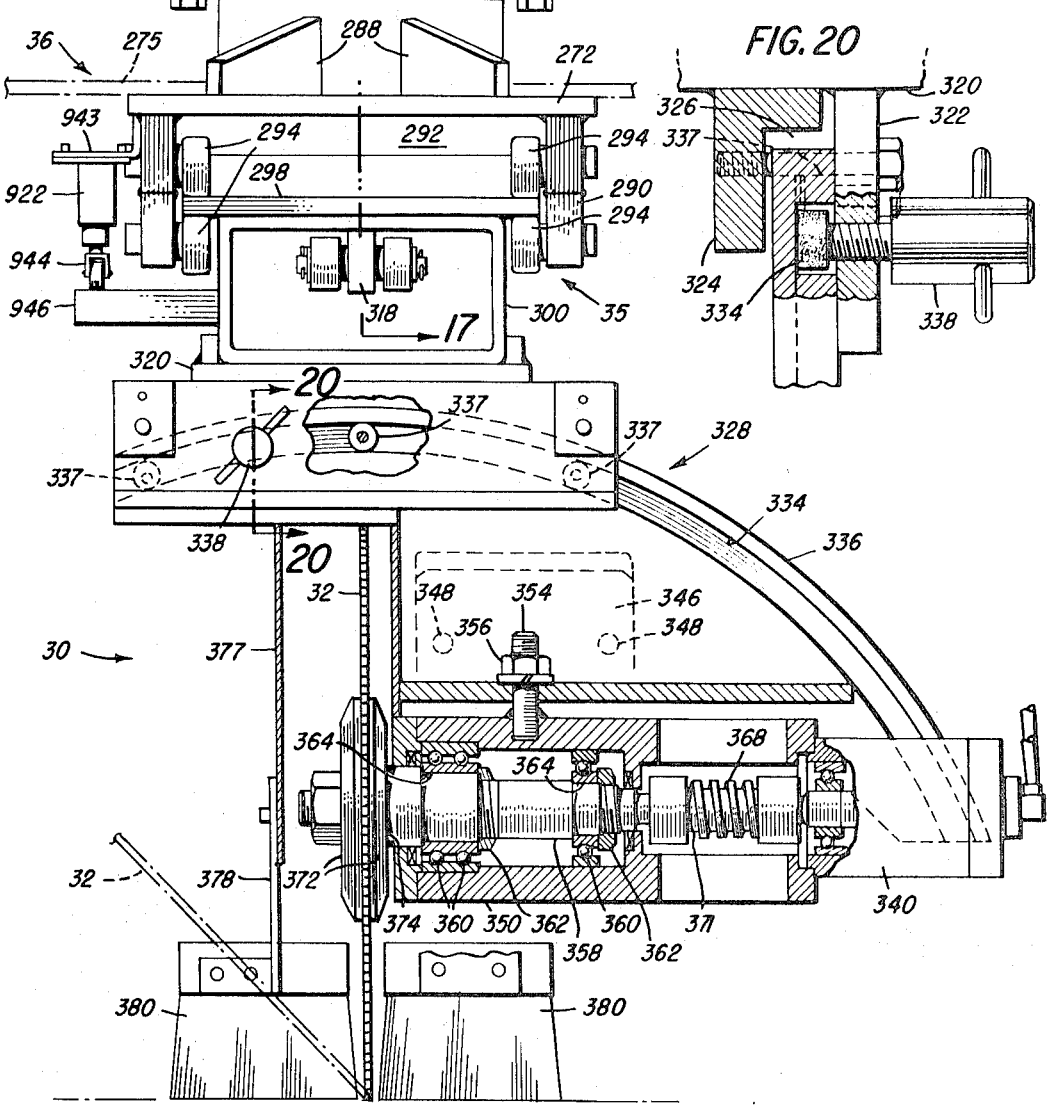

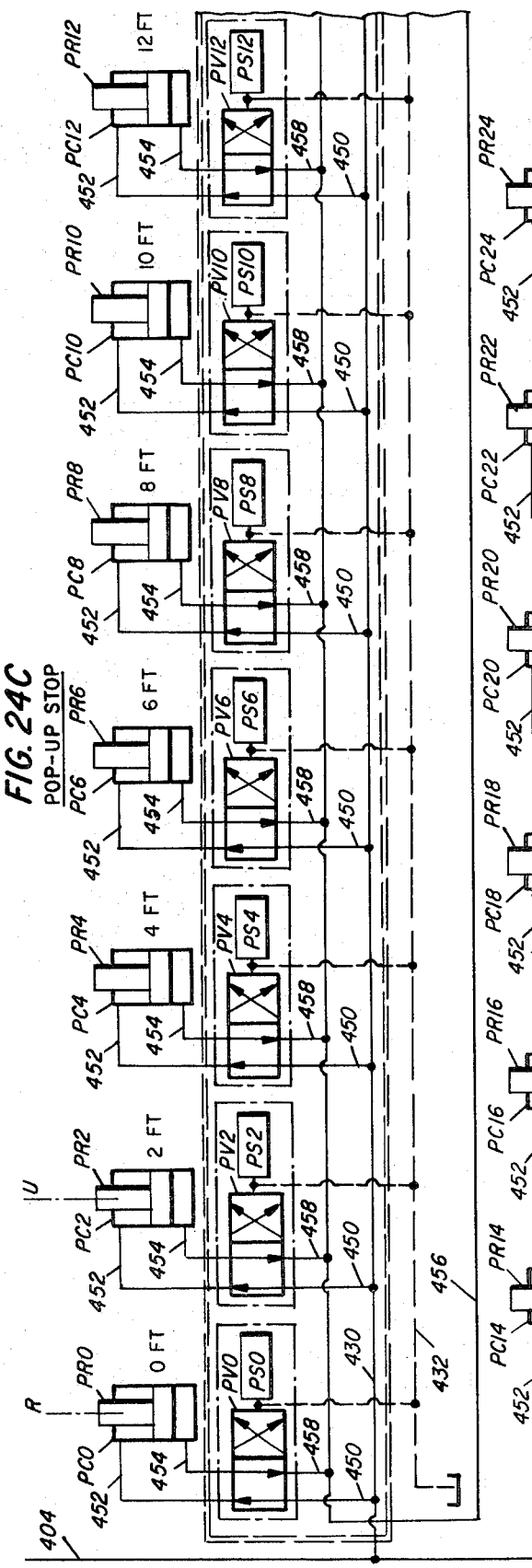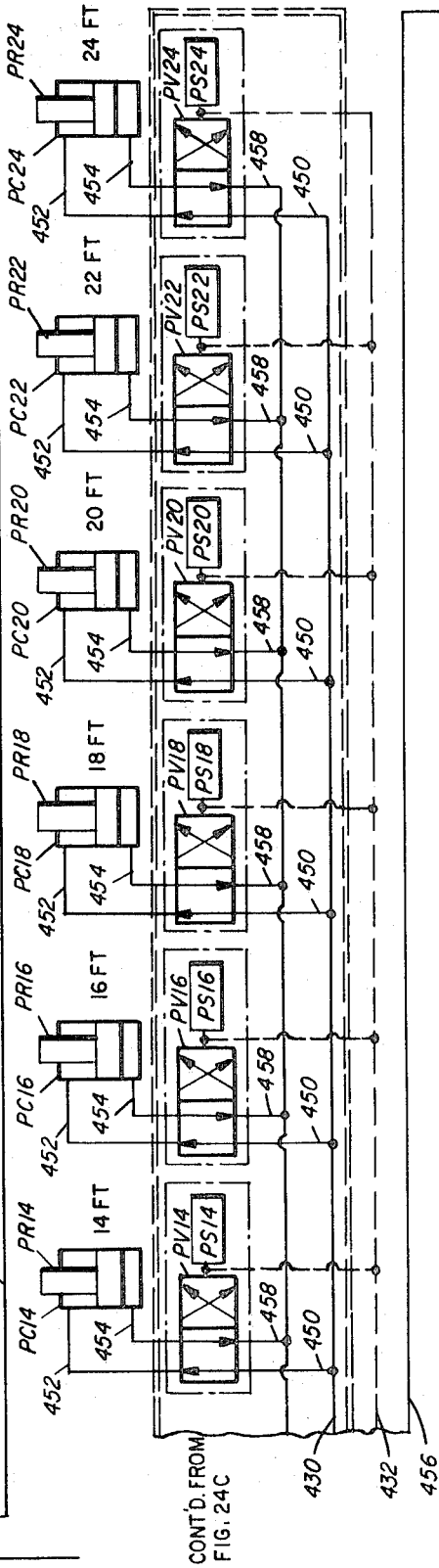
FIG. 24C
POP-UP STOP
FIG. 24D

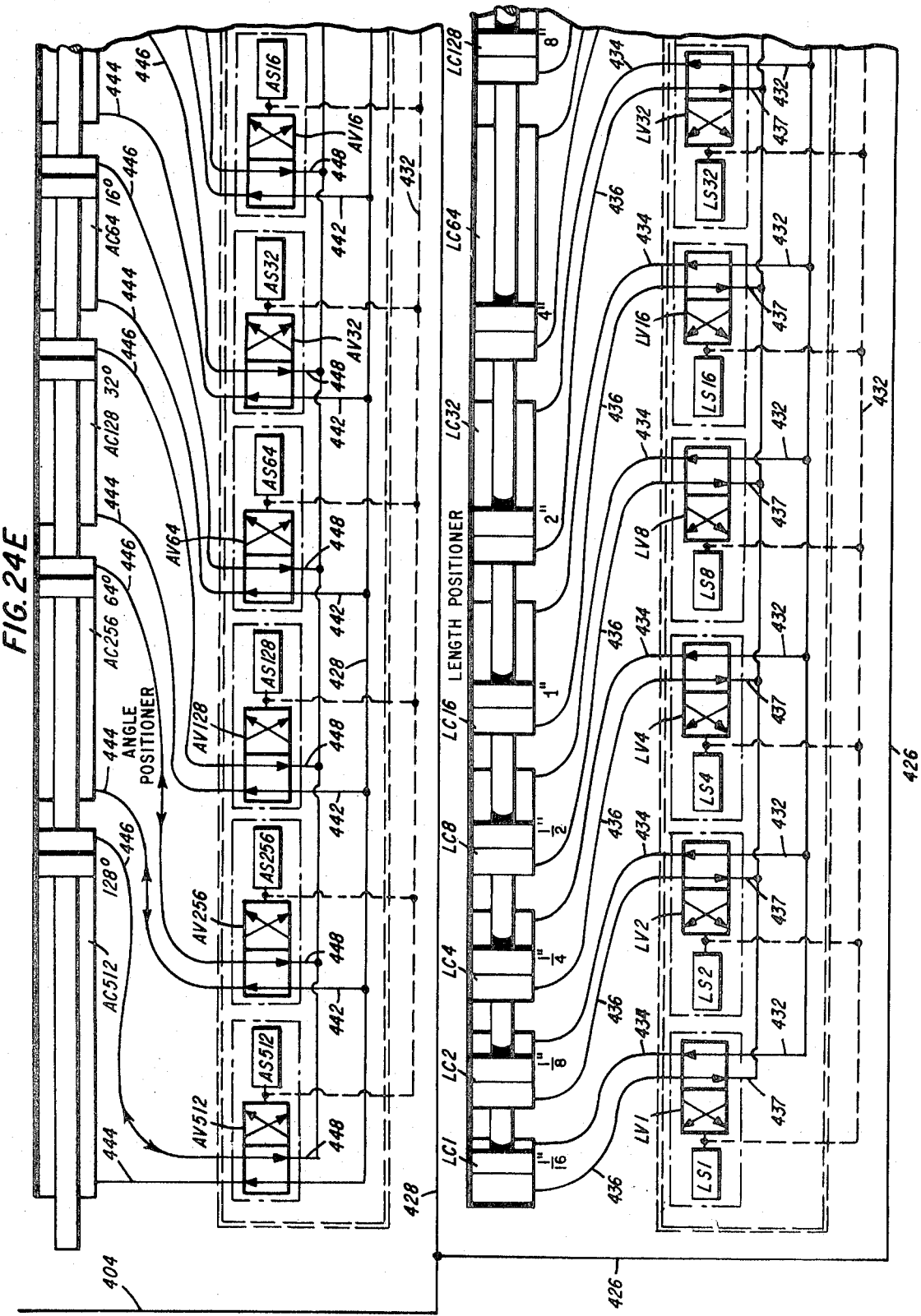

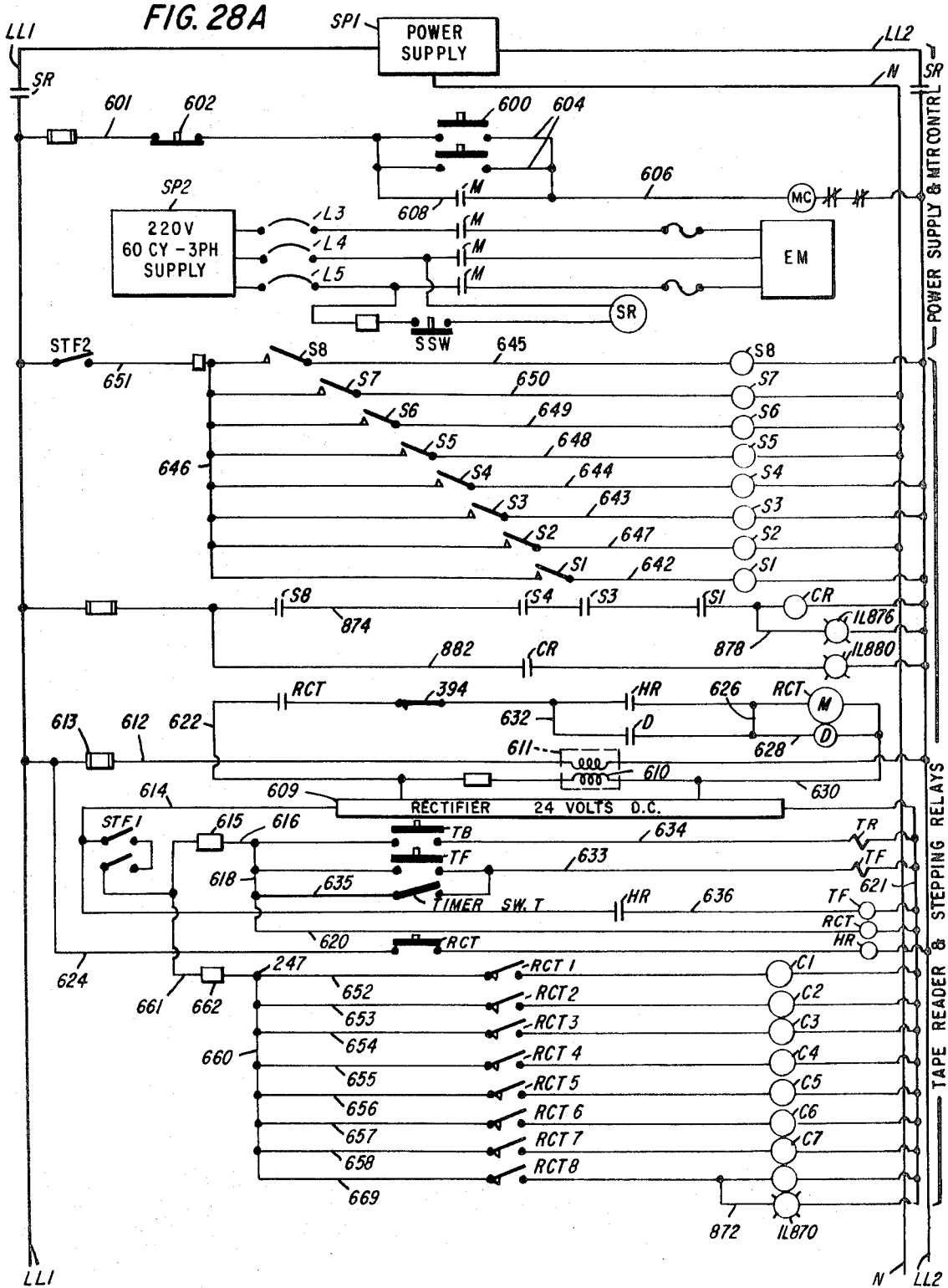

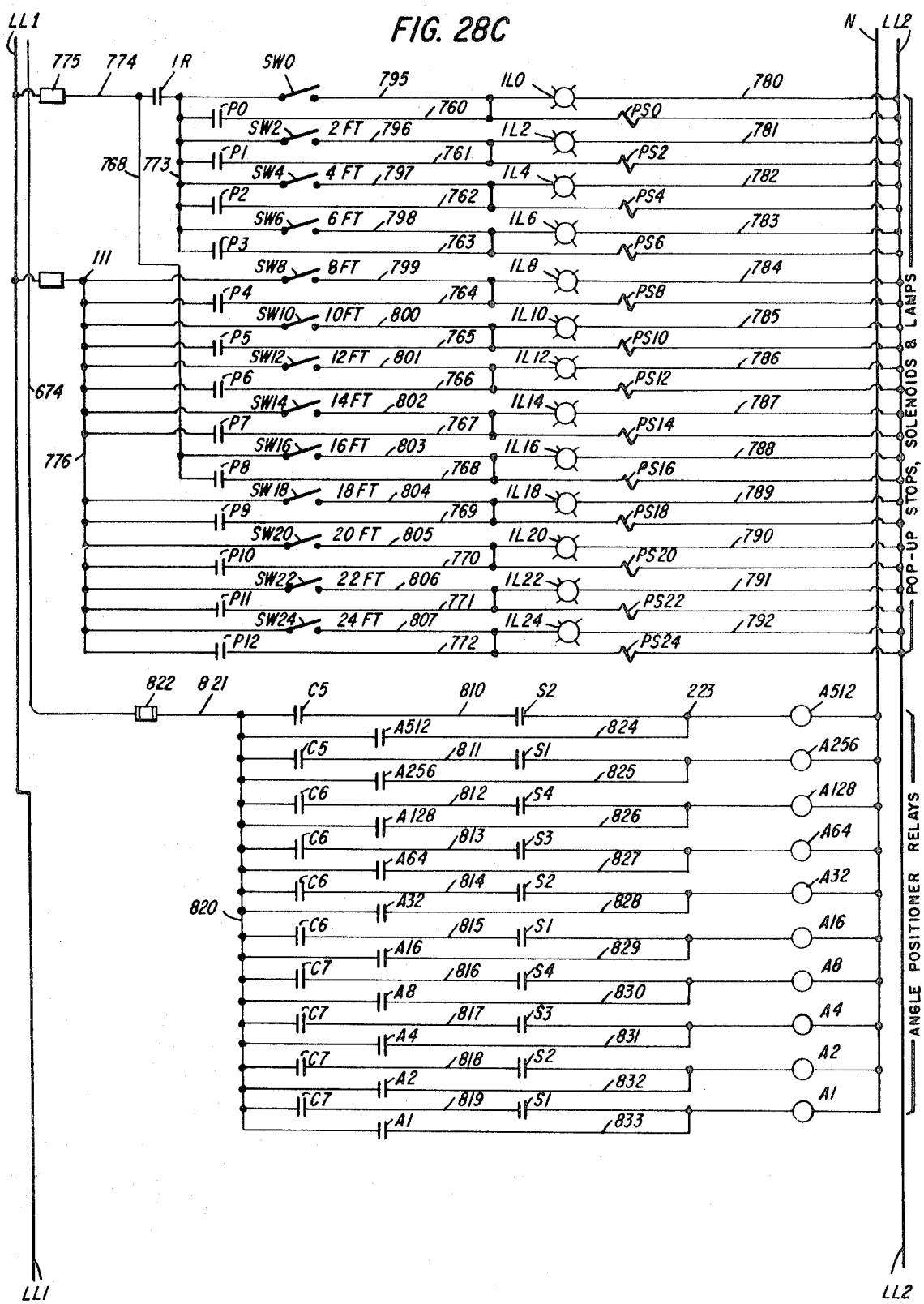

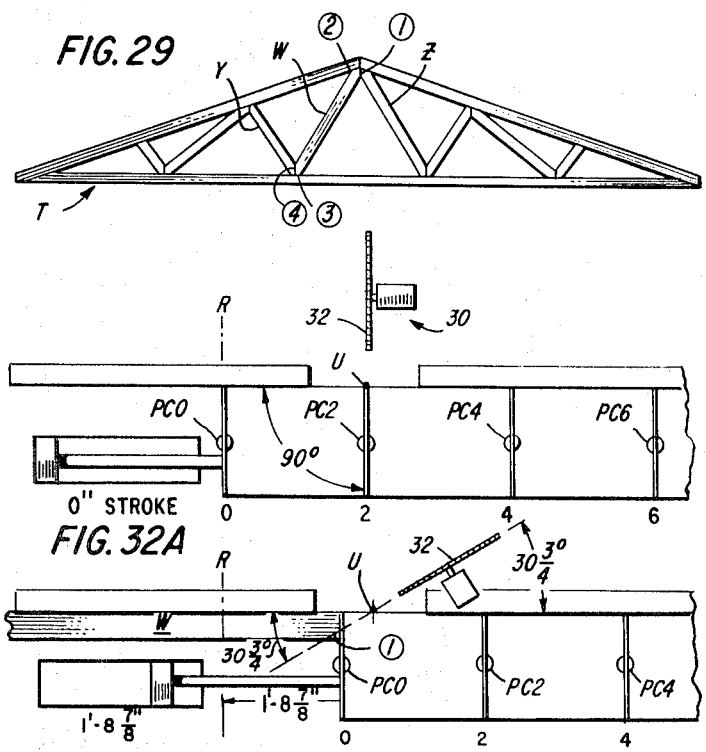
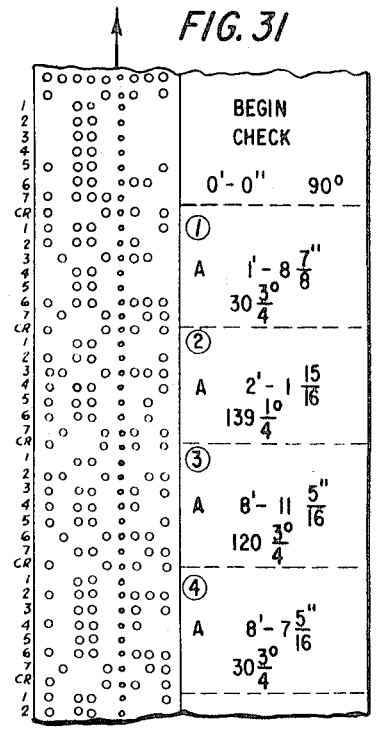
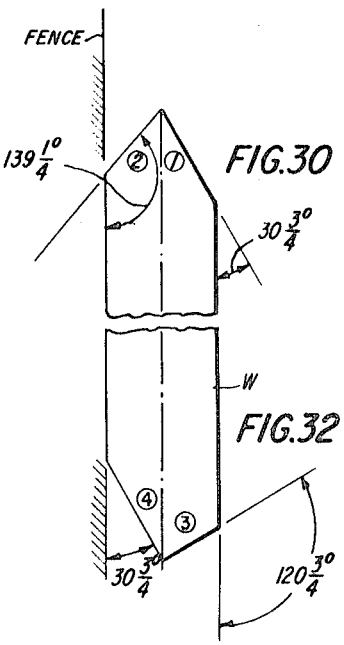

AUTOMATED SAW

This application is a continuation of application Ser. No. 675,174, filed Oct. 13, 1967 and now abandoned.

BACKGROUND OF THE INVENTION

This invention relates to an apparatus for manufacturing structural wooden devices, and more particularly to apparatus for cutting wooden frame members which are assembled to form structural devices such as wooden roof trusses, panels, and the like.

With the advent of the connector plate shown in Jureit U.S. Pat. No. 2,877,520, it became possible to manufacture structural wooden devices, such as roof trusses, panels, and the like, hereinafter referred to as trusses, without the necessity of manual nailing, bolting or gluing. These connectors comprise sheet metal plates having slender, elongated naillike teeth struck therefrom in three or more rows so as to extend substantially perpendicular to the plate. Structural wooden butt joints employing such connectors may be formed by simply sandwiching the two butted wooden members between pairs of the Jureit plates and simultaneously pressing the teeth of both plates into the lumber to form a completed joint. The operation is rapid, low in cost, and provides a built-in quality in that there is no necessity to rely upon the proper number of nails, bolts or other fasteners being manually affixed in the formation of the joints. The widespread adoption of such joints has resulted in concurrent improvements in other aspects of the truss fabrication procedure.

For example, because all roof trusses of a particular configuration are comprised of component parts of the same shape, it has proved convenient to prepare the components for assembly in a systematized or production line manner, even further reducing the fabrication time and cost thereof. If a particular truss is comprised of a plurality of distinctly shaped wooden chords and webs and 100 trusses are to be produced, 100 boards of the first shape are cut, then 100 boards of the second shape, etc. All of the precut component chords and webs are then appropriately arranged and assembled by means of the so-called "truss presses" such as shown in Jureit U.S. Pat. No. 3,195,449. Typically, the cutting process is carried out by means of conventional-type table saws, adjustable radial arm saws, etc. This process has proven to be quite successful.

Further, it has been found advantageous to systematize to a large degree other phases of the design and manufacturing process, both in the interest of quality and economy. In particular, computing equipment has been utilized to actually design trusses upon specifications of the overall configurations thereof, starting materials, etc. Thus, upon specification by the architect of the general shape, etc., of the desired truss, the computer can very rapidly calculate the appropriate lengths and angles of the component chords and webs and produce scale drawings thereof, appropriately labeled as to dimensions, type of stock material, etc. These drawings are directly provided to the sawyers and assemblers without the cost and delay of manual design.

As the use of roof trusses employing Jureit-type connector plates became more widespread, the demand grew for the production of widely varying types of trusses which would permit architects increased freedom of roof design. Use of such trusses permits the erection of low-cost homes with varying roof lines, so as to avoid the growth of communities wherein all houses are identical. Due to the wide variety of possible truss designs and board shapes, there results a situation in which a substantially unlimited number of board length and cutting angles may be specified by the architect. As a result, the various cutting and fabrication techniques referred to above lose their systematized or production line nature since each segment of the truss may well be of a different length, etc., and few successive trusses will require the same segments. Such board-to-board uniqueness greatly increases the amount of time necessary to assemble a given roof truss since it is generally not possible to mass produce the segments before assembly.

SUMMARY OF THE PRESENT INVENTION

According to the present invention, it has been found to be possible to automate the work of the sawyer to such a great degree as to substantially overcome the problems of uniqueness of the segments of special trusses. Briefly, according to one embodiment of the invention, there is provided a fabrication machine including a single numerically controlled variable angle saw assembly and a numerically controlled variable length positioner assembly, whereby the proper angle of cut and length of board can be automatically established. The fabricating machine may be controlled by punched or magnetic tape or by punched cards carrying the information generated by the above-described computing machines in response to the specification of the gross characteristics of the truss. The illustrated and preferred embodiment herein described and illustrated employs punched tape and the information necessary to fabricate all of the segments of a single truss may be provided serially on the tape whereby the operator need only insert the same into a tape reader which provides the machine with all of the information necessary to control the length and angle assemblies and rapidly fabricate the component parts of trusses. Such information includes lengthwise dimensions of the frame members to be cut, as well as the angle of the cut relative to the lengthwise axis of the frame members, such information being provided for each end of the frame member. All such information is appropriately displayed for visual check by the operator to insure proper machine functioning.

In addition, to provide greater flexibility, the machine can cut boards having one or two cuts at each end with no adjustment or modification between cuts. For example, the longer upper and lower chords of roof trusses may require single angled cuts at their opposite ends. The webs connecting between the upper and lower chords, however, may require either single or double cuts at various angles relative to the lengthwise axes thereof at their opposite ends to properly butt the webs against the chords and/or other webs, as the case may be.

As may be understood, considerable variation may be expected in the lengths of both the starting material and the completed segments. For example, the required stock length may vary from 2 to 24 or more feet. Accordingly, it is a feature of the invention that there is provided a two-step, numerically controlled positioning arrangement in which the cutting position is set sequentially by coarse and fine adjustments.

It is also a feature of the invention that means are provided to adjust the angular position of the saw blade whereby such blade always crosses the cutting surface in approximately the same place, irrespective of the angle setting, and where the lumber is moved in one direction only to make each subsequent cut. This simplifies the construction of the machine, as well as the design of the components of the truss.

As may be understood, the use of the concepts of the present invention greatly facilitates the fabrication of special roof trusses, since the extreme accuracy of angle and length settings needed for proper fit is accomplished rapidly and automatically without the expenditure of operator time. In addition, if desired, the fabrication line is readily adaptable to the manual setting of the dimensions and angles.

It is a further feature hereof that in instances wherein a double cut is necessary at one end of a web, the numerical length dimension and saw angle information provided the machine may locate such web for the first angle cut thereof such that the saw traverses the web in a manner to preclude waste when the second angle cut on the same end is made. The length and angle information for the first cut positions the machine to locate the normally squared end of the lumber so that the saw blade enters the squared face intermediate the lateral edges thereof and traverses toward the outer edge of the lumber. For the second cut of the same end, the length and angle information positions the machine so that the saw blade traverses the lumber from the inner edge toward the cut edge, whereby initial cutting of a waste piece from the end of the lumber is precluded.

A brief and generalized summary of the component parts and operation of the fabricating machine will now be given to provide a clearer understanding thereof, particularly with respect to the detailed description of a preferred embodiment of the invention provided hereinafter. Generally, the fabricating machine performs three basic operations: The first operation locates a board to be cut along a saw table a predetermined length from a fixed reference point and hence a predetermined length from the saw (or more precisely to the point of entry of the saw in the board as such point is fixed relative to the saw table for all saw angles) so that the proper length of board may be cut; the second operation rotates the saw relative to the lengthwise dimension of the board so that the predetermined angle of cut through the board can be made; and the third operation clamps the board to the saw table in sawing position so that the saw blade may traverse the board and make the predetermined cut. The first two operations are automatically accomplished under the control of the prepunched tape, while the third operation is controlled by the operator.

To locate the board in predetermined lengthwise position relative to a fixed reference, the fabrication machine comprises a fixed saw table mounting a longitudinally movable saw table. A length positioner assembly is provided comprising a plurality of popup stops spaced at predetermined intervals along the movable table, a fluid-actuated cylinder being provided each stop for projecting the same above the movable table. The cylinder associated with a selected stop is actuated in response to length information prepunched on the tape as hereinafter described to project the corresponding selected stop above the movable table. The end of a board may be butted against the projected stop, thus providing a predetermined lengthwise dimension between the butted board and the fixed reference point. The spacing between popup stops is on the order of 2 feet, and it can be seen that the projection of the selected stop provides only a coarse length adjustment.

Selected longitudinal displacement of the movable saw table which carries the popup stops provides a fine length adjustment of the projected stop relative to the fixed reference point. The movable table, in the preferred form, is capable of movement in increments of one-sixteenth inch over a total range of lengthwise movement at least equal to the 2 foot spacing between the popup stops by means of a length positioner to be described. With the foregoing arrangement, a popup stop can be projected above the movable table a predetermined distance from the fixed reference point by proper selection of one of the popup stops and selected displacement of the movable table along the fixed table. For reasons noted hereinafter, the fixed reference point is located 2 feet to one side of the point of entry of the saw blade. Accordingly, with a popup stop located at the reference point and at 2 foot intervals therebeyond when the movable table is fully retracted, the distance between the point of entry of the saw blade and the projected stop can be selected over a range of 24 feet (13 stops being provided herein) at increments of one-sixteenth inch throughout the entire range.

The saw assembly depends from an overhead structure mounting an angle positioner assembly, the saw assembly being located relative to the table so that the saw blade always enters the lumber at the same point (unipoint) in the table regardless of the angle of cut to be made thereby. The saw blade is mounted for traversing movement across the saw table by a guide assembly which is mounted for rotary movement from the fixed overhead structure, the angular position of the guide assembly relative to the saw table determining the angle of cut through the board.

A plurality of fluid-actuated holddown and pullback clamp assemblies are spaced longitudinally along the saw table. After the end of the board is butted against the projected popup stop, the operator actuates the holddown and pullback assemblies to clamp the board to the saw table. The pullback assemblies engage the outer edge of the board and pull the same rearwardly toward a fence mounted on the fixed table to clamp the board thereagainst. The holddown assemblies comprise scissors-type clamps which engage against the upper face of the board and the undersurface of the movable table to clamp the board to the movable table, thereby preventing the board from rising or otherwise being displaced from the saw table. The operator then actuates the saw and causes the blade to traverse forwardly through the board making the cut at the predetermined length and angle and to return therethrough to its initial position. The operator then releases the pullback and holddown clamps and the lumber is ready for advancement along the table for abutment against a next selected stop representing the length dimension for a next cut.

The length positioner for displacing the movable table and the angle positioner assembly for rotating the saw assembly each comprises plural fluid-actuated piston and cylinder arrangements having various predetermined piston displacements providing predetermined increments of length and angle displacement of the movable table and the saw assembly, respectively. The cylinders are connected serially in end to end relation with the piston of each cylinder fixed to the base of the next succeeding cylinder. The base of an end cylinder is fixed while the remaining cylinders are slidably mounted whereby the total displacement of the piston rod at the opposite free end cylinder equals the sum of the displacement(s) of the piston(s) of the actuated cylinder(s). In the length positioners, the smallest cylinder has a piston displacement of one-sixteenth inch, the next smallest a piston displacement of one-eighth inch, the next one-fourth inch, and so on, (each cylinder having a piston displacement double the piston displacement of the preceding cylinder) with the largest cylinder having a piston displacement of 16 inches, the latter piston being connected to the movable table. Accordingly, actuation of selected cylinders provides a total length displacement of the movable table equal to the sum of the piston displacements of the selected cylinders and the movable table may thus be advanced a selected distance through a range from 0 to 2 feet in increments of one-sixteenth inch.

In the angle positioner assembly, the piston rod of the free end cylinder is connected to the rack of a rack and gear arrangement which rotates the saw assembly. The smallest cylinder of the angle positioner assembly has a piston displacement providing for ¼° of angular displacement of the saw assembly, the next smallest has a piston displacement providing ½° of angular displacement, the next 1°, and so on (each cylinder having a piston displacement double the piston displacement of the preceding cylinder), with the largest cylinder providing for 128° of angular displacement. Accordingly, actuation of selected cylinders provides a total angular displacement of the saw assembly equal to the sum of the angular displacements provided by the piston displacements of the actuated cylinders, thereby providing a predetermined angle of cut.

A fluid circuit is provided and comprises a solenoid actuated control valve for each of the cylinders of the length and angle positioner assemblies. An electrical circuit is arranged in controlling relation to the valves to selectively shift the same and thereby provide pressure fluid to selected cylinders of the length and angle positioner cylinders. Information representing the predetermined length and angle positions the popup stops and saw blade, respectively, is prepunched on tape and provides electrical control signals as the tape steps through a tape reader to actuate selected cylinders of the length and angle positioner cylinders. Standard telegraphic eight-channel tape is employed herein whereby information prepunched thereon representative of the lengths and angles of cuts for a plurality of webs and chords for one or more trusses may be transmitted between fabricating machine sites and a central computer site whereat such information is computed and keypunched on tape. While eight-channel tape is employed, only the first four channels are selectively prepunched to provide length and angle information to the machine.

The tape is divided into frames of eight transverse rows each: the first three rows in each frame are selectively prepunched and represent length position information controlling actuation of one or more of the cylinders of the fine length positioner; the next row is selectively prepunched and represents length position information controlling actuation of one of the popup cylinders providing the coarse length adjustment; the next three rows are selectively prepunched and represent angle position information controlling actuation of one or more of the cylinders of the angle positioner assembly; and the eighth row is prepunched to represent a machine stop function. The perforations in each tape row provide electrical signals which, when correlated with an electrical signal representing the particular row being sensed in the tape reader, provide control signals to the appropriate solenoid actuated valves to shift such valves and provide pressure fluid to one or more of the cylinders associated with the length and angle positioner assemblies.

Accordingly, it is a primary object of the present invention to provide improved apparatus for cutting wooden members forming roof trusses, panels, or the like.

It is another object of the present invention to provide a fabrication machine for cutting wooden members forming roof trusses, panels, or the like, to various specified lengths and angles in a rapid, low-cost, and efficient manner.

It is still another object of the present invention to provide a fabrication machine for cutting wooden members to predetermined lengths and angles having a selectively angularly positioned saw which enters the lumber at a fixed point regardless of the selected saw angle and which is automatically rotated to the selected angular position.

It is still another object of the present invention to provide a fabrication machine having a length positioner assembly which automatically locates a stop a predetermined distance from the saw against which a wooden member may be butted, thus affording a predetermined length of cut.

It is a further object of the present invention to provide a fabrication machine having pullback and holddown clamps whereby the wooden member is retained in predetermined sawing position.

It is still a further object of the present invention to provide a fabrication machine arranged to eliminate lumber waste, particularly with respect to double angle cuts formed on a single end of the wooden member.

It is still a further object of the present invention to provide a fabrication machine for cutting wooden members wherein the information representing the desired length of the wooden member and angle of cut therethrough may be fed into the machine on prepunched tape to automatically locate length and angle positioner assemblies of the machine in response thereto for making a cut at the desired length and angle.

These and further objects and advantages of the present invention will become more apparent upon reference to the following specification, claims and appended drawings.

DESCRIPTION OF THE DRAWING FIGURES

FIG. 2 is a plan view thereof;

FIGS. 4A and 4B are enlarged fragmentary plan views of the left and right sides, respectively, of the saw table, with portions broken away for ease of illustration, FIG. 4B forming a continuation of FIG. 4A;

FIGS. 5A and 5B are enlarged fragmentary front elevational views of the left and right sides, respectively, of the saw table, with portions thereof broken away for ease of illustration, FIG. 5B forming a continuation of FIG. 5A;

FIG. 6 is an enlarged longitudinal sectional view of the length positioner cylinders with portions thereof broken away for ease of illustration;

FIG. 7 is an enlarged transverse sectional view taken about on line 7—7 of FIG. 6;

FIG. 9 is an enlarged sectional view of a pullback clamp assembly taken about on line 9—9 of FIG. 10;

FIG. 10 is a fragmentary plan view of a pullback clamp assembly;

FIG. 11 is a view similar to FIG. 9 illustrating the clamping arm in a raised position;

FIG. 12 is a transverse sectional view of the pullback clamp assembly taken about on line 12—12 of FIG. 9;

FIG. 13 is an enlarged fragmentary plan view of the saw table and a holddown clamp assembly;

FIG. 14 is an enlarged fragmentary sectional view of a saw table taken about on line 14—14 of FIG. 13 and illustrating the holddown clamp assembly in side elevation;

FIG. 16 is an enlarged sectional view of a superstructure assembly, saw assembly and guide therefor with the saw in position for traversing movement lengthwise along the saw table;

FIG. 20 is an enlarged fragmentary cross-sectional view of a lock for the saw tilt bracket;

Figure 24A:
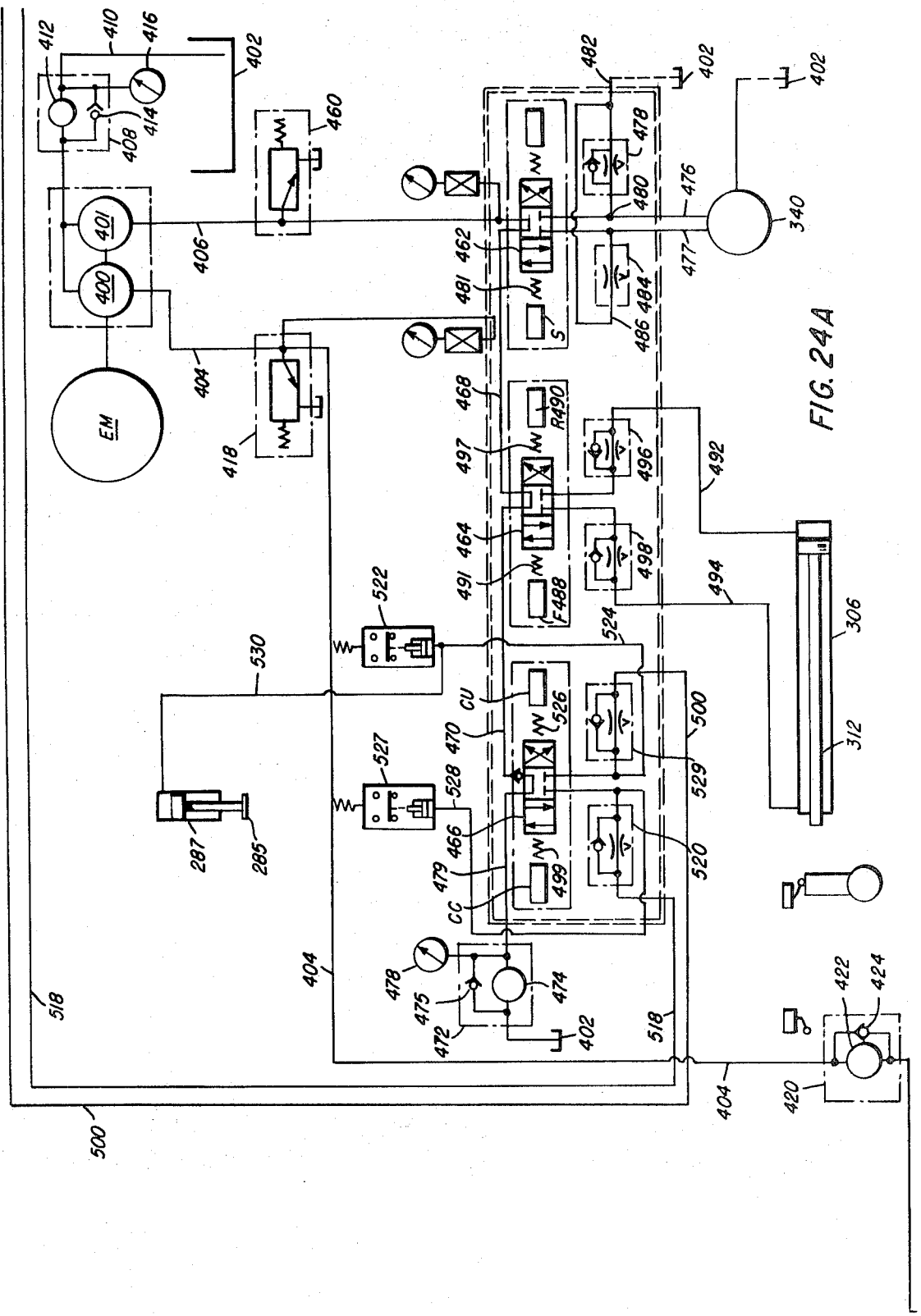
Figure 24B:
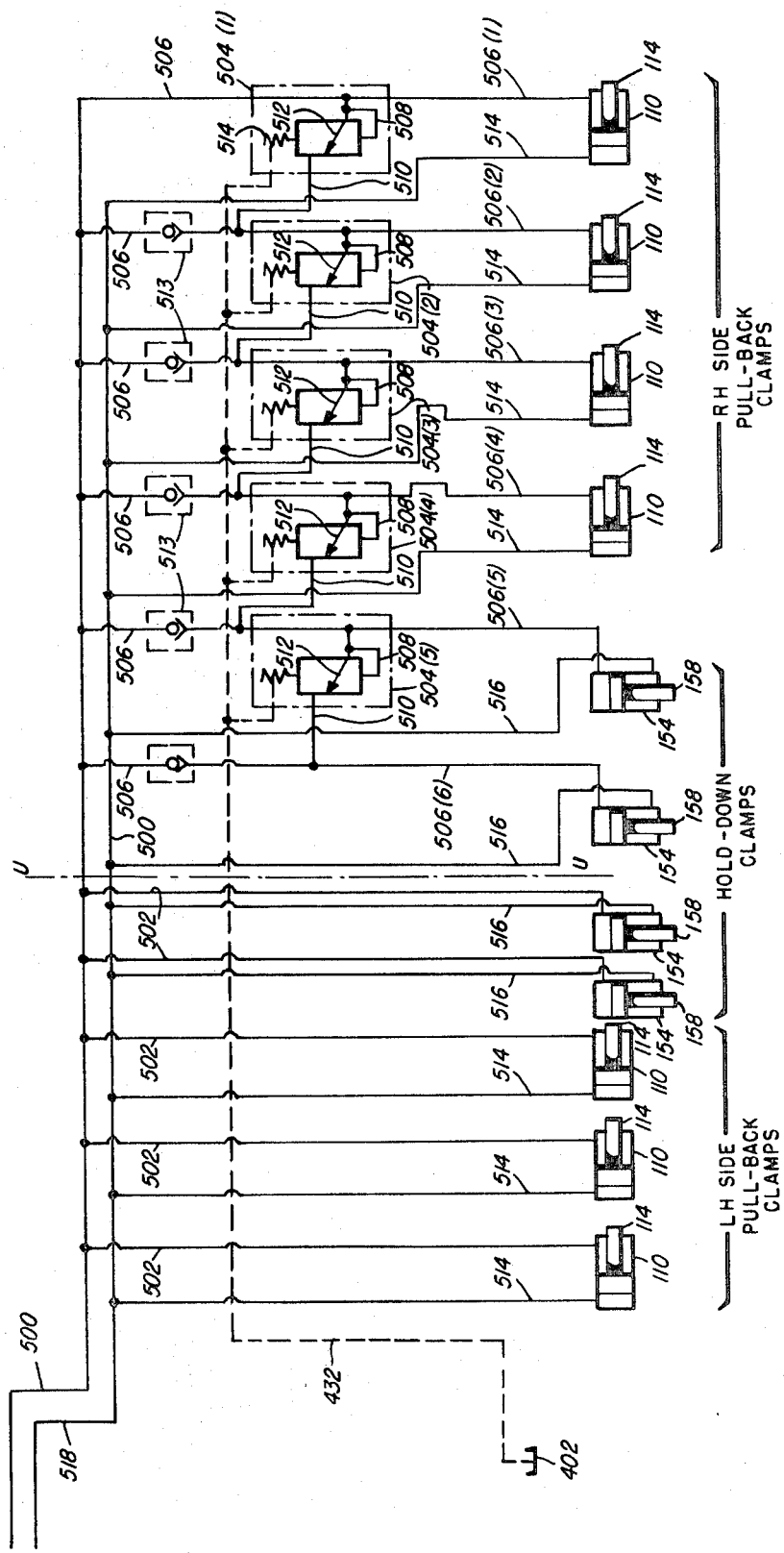
Figure 24F:
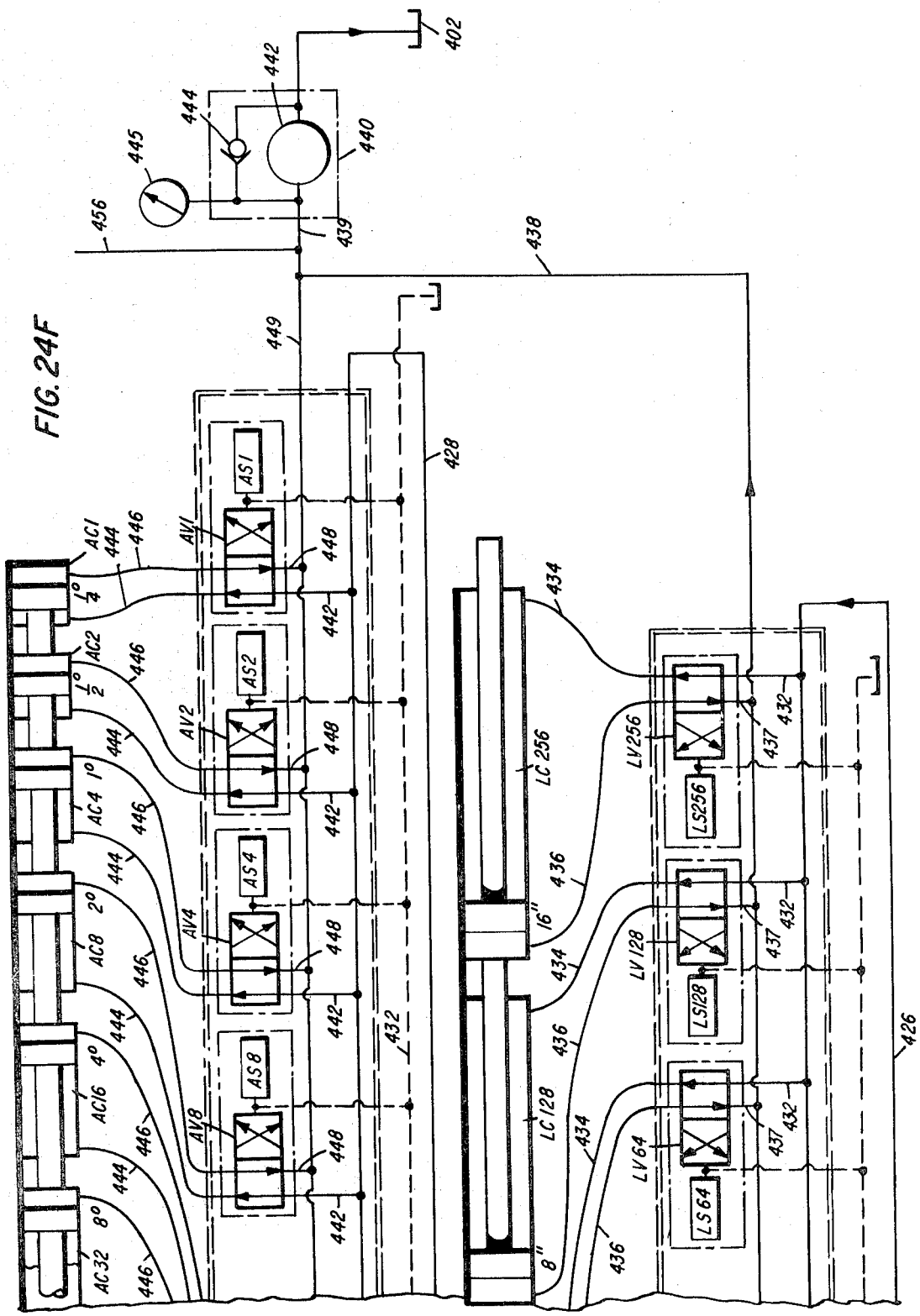
Figure 26:
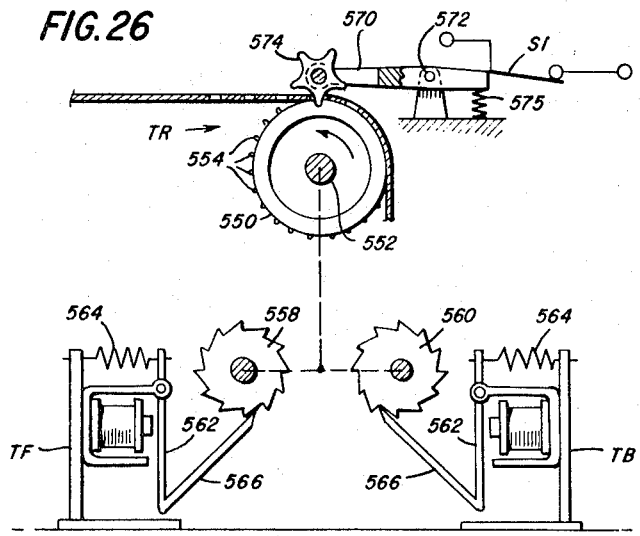
Figure 27:
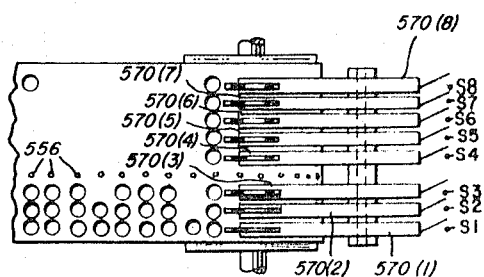
Figure 25:
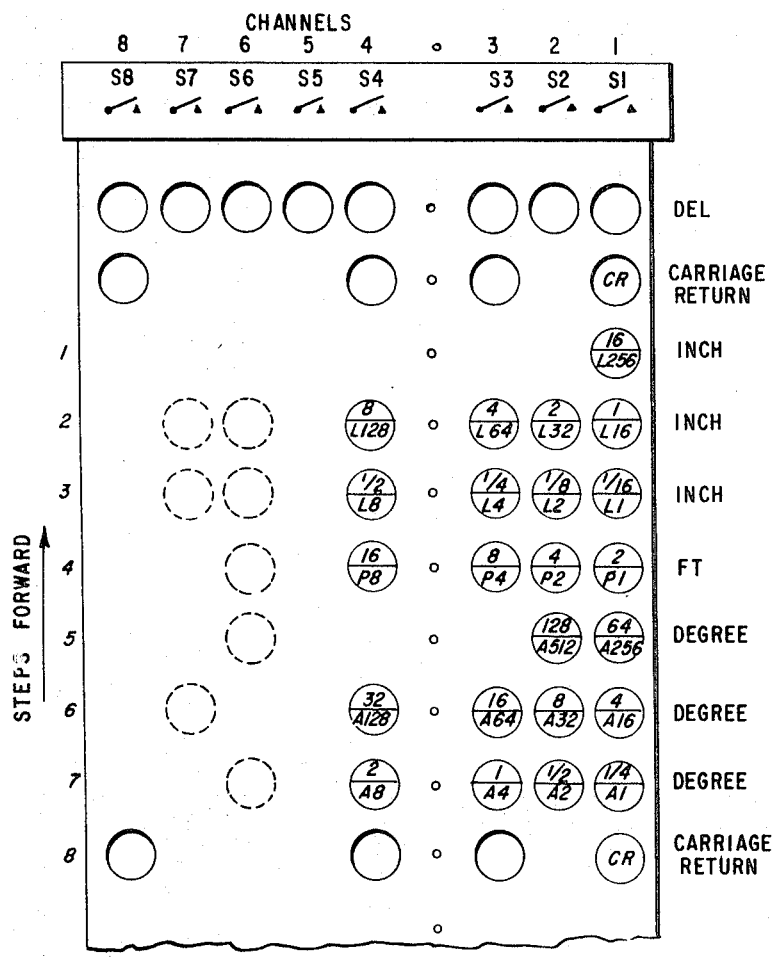

FIGS. 24A–24F are schematic illustrations of the fluid control circuit employed in the fabricating machine; FIG. 24A illustrating the fluid supply and the clamp, saw and saw traverse fluid circuits; FIG. 24B illustrating the fluid circuit controlling the pullback and holddown clamps; FIGS. 24C and 24D illustrating the fluid circuit controlling the popup stops; FIG. 24D forming a continuation of the right-hand end of FIG. 24C; FIG. 24E illustrating the left-hand portion of the fluid circuit controlling the angle and length positioner; and FIG. 24F illustrating the right-hand portions thereof forming a continuation of the circuits shown in FIG. 24E;

FIG. 25 is an enlarged fragmentary illustration of the tape input information;

FIG. 26 is a schematic illustration of a tape reader;

FIG. 27 is a fragmentary plan view thereof;

FIGS. 28A–28D illustrate the electrical circuits for the fabricating machine;

FIG. 29 is an elevational view of a truss;

FIG. 30 is an enlarged elevational view of a web of the truss illustrated in FIG. 29 with portions thereof broken away for ease of illustration;

FIG. 31 is a plan view of the tape frames providing length and angle information for making the cuts on the web illustrated in FIG. 30; and FIGS. 32A–32E are schematic illustrations of the length and angle assemblies positioned to make the cuts forming the web shown in FIG. 30.

DESCRIPTION OF A PREFERRED EMBODIMENT

General Layout

Figure 1:
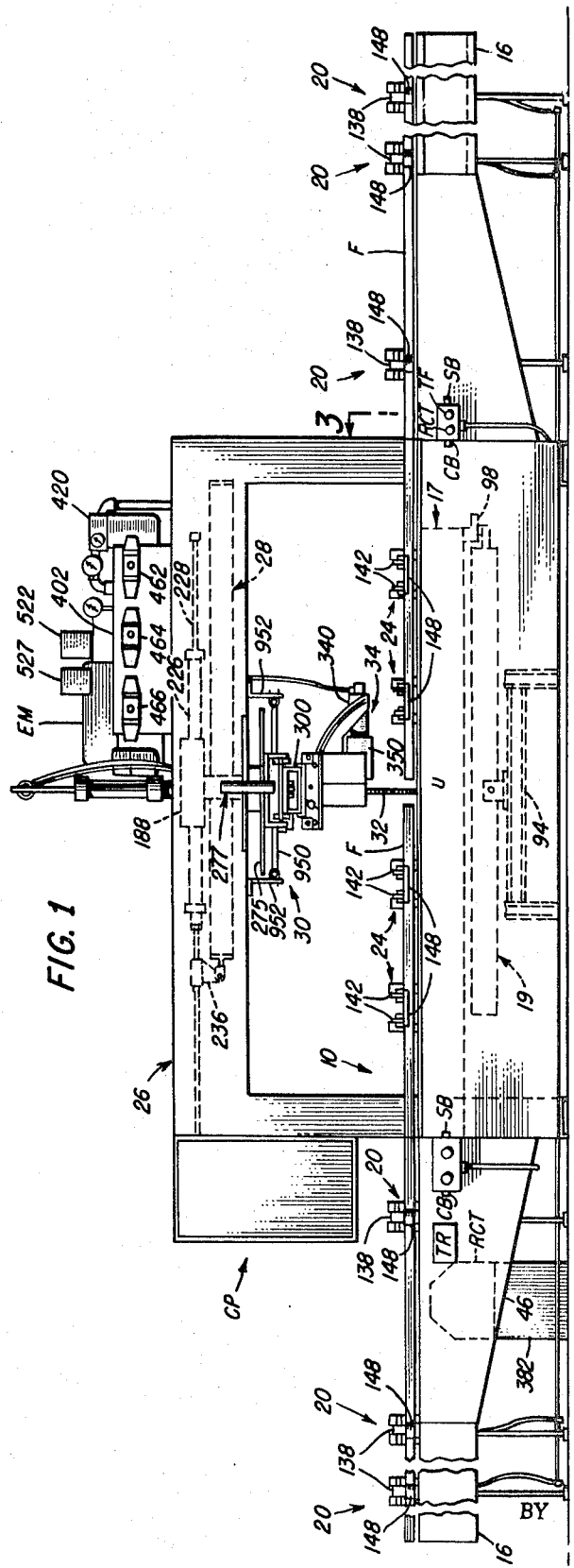
FIG. 1 is a front elevational view of a fabricating machine constructed in accordance with the present invention with portions thereof being broken away for ease of illustration.
Figure 3:
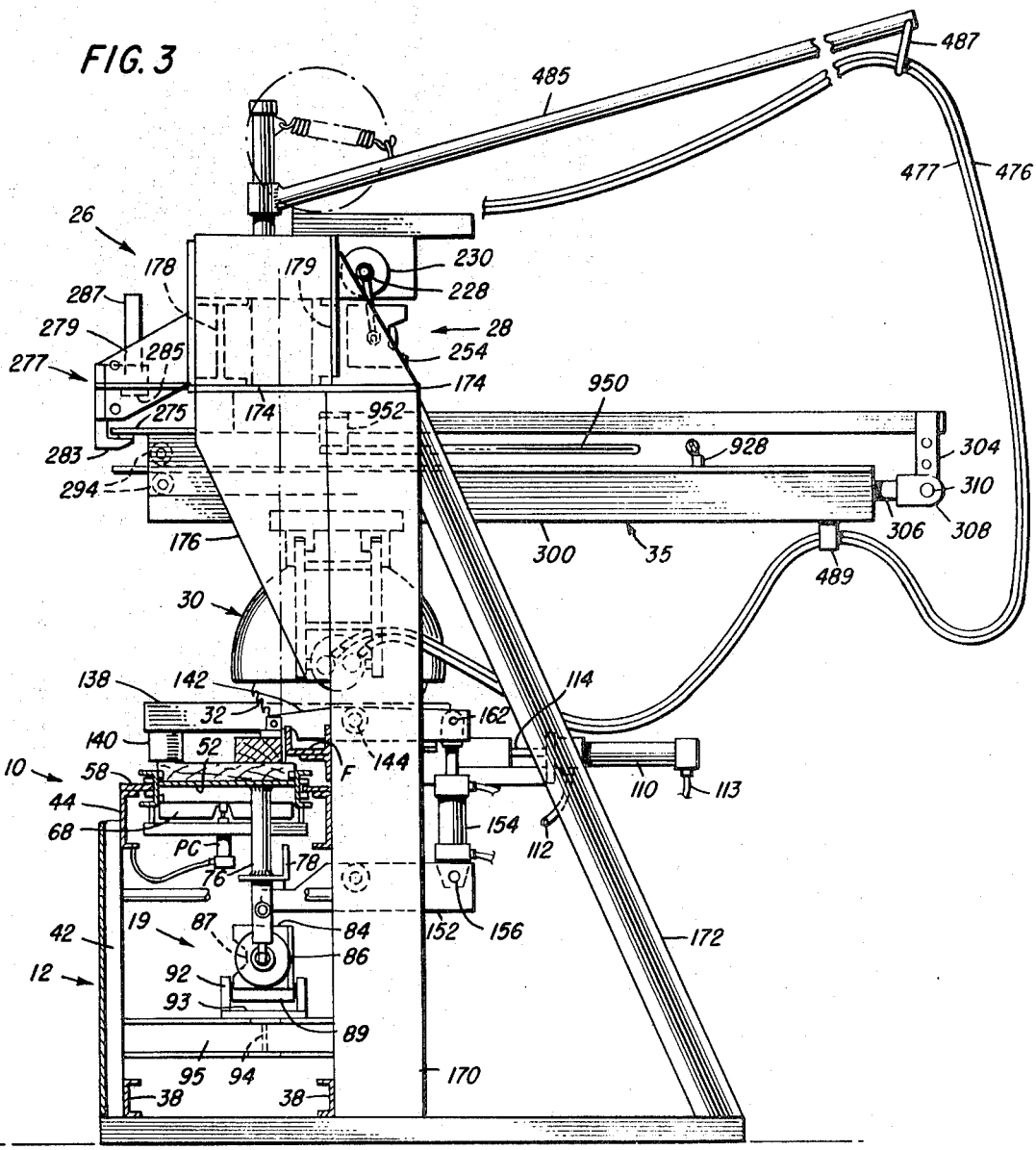
FIG. 3 is a transverse cross-sectional view taken about on line 3—3 of FIG. 1.

Referring now to FIGS. 1–3, the fabricating machine hereof comprises, in general, a saw table 10 having a fixed base table 12 and a table 14 mounted on base table 12 for longitudinal movement therealong. Tables 12 and 14 together form a planar surface on which pieces of lumber or boards are placed for cutting to form framing members W which are later assembled to form completed trusses illustrated in FIG. 29.

Outrigger assemblies 16 are connected at opposite ends of base table 12 and form a continuation thereof for handling unusually long boards W. Outriggers 16 are conventional roller conveyors and per se form no part of the present invention and further description thereof is believed unnecessary. A length positioner assembly 17 is provided and includes a plurality of popup stop assemblies 18 (FIG. 5A) mounted on and at predetermined spaced intervals along movable table 14. Length positioner assembly 17 also includes length positioner 19 comprising a plurality of fluid-actuated cylinders LC (FIGS. 3, 6 and 7), selected actuation of which displaces movable table 14 along base table 12 a predetermined distance from a reference point R.

A fence F is mounted along the rear edge of base table 12. A plurality of pullback clamp assemblies 20 are longitudinally spaced one from the other along the rear edge of table 10 and engage the outer lateral edge of boards or webs W to butt the inner edges thereof against fence F during the cutting operation. A plurality of holddown clamp assemblies 24, four being shown, are longitudinally apaced one from the other along the rear edge of table 10 and clamp boards W to table 14 during cutting operations.

A superstructure 26 overlies central portions of table 10 and mounts angle positioner and saw assemblies 28 and 30, respectively. Saw assembly 30 includes a saw blade 32 and motor 34 therefor mounted on a ram assembly 35 for traversing movement along a ram guide assembly 36 across movable table 14 from the rear edge to the front edge thereof and back. Angle positioner assembly 28 rotates ram guide assembly 36 about a vertical axis for angularly displacing blade 32 relative to fence F whereby the angle of traverse of blade 32 through board W may be selectively adjusted relative to the longitudinal axis of table 10. Saw assembly 30 is mounted such that saw blade 32 crosses the rear edge of table 10 at a fixed point denoted as unipoint U regardless of the angle of cut to be made.

To provide consistent and readily understood notation throughout the description hereof, the reference notation having the letter prefixes L, A, and P indicates that the parts so designated are related to the length positioner 19, angle positioner assembly 28, and the popup stops assembly 18, respectively. The reference notation having an S, V, C, or R succeeding the designation L, A, or P indicates a solenoid, valve, cylinder, or piston rod associated with the respective positioner or assembly.

Saw Table Assembly

Referring now particularly to FIGS. 3, 4, and 5, base table 12 comprises a pair of lower, laterally spaced, longitudinally extending beams 38 resting at opposite ends on a pair of transverse base beams 40 providing a footing for table 10. The lower ends of a plurality of longitudinally spaced stanchions 42 are suitably secured, as by welding, to beams 38, the upper ends thereof mounting a pair of laterally spaced, longitudinally extending, inwardly facing channel beams 44. Angled beams 46 connect at their respective lower ends to opposite ends of lower beams 38 and are connected at their upper ends to end stanchions 47 which are connected to the ends of beams 44. The web portions of stanchions 42 and 47 bear against the web portions of beams 38 and 44 and beams 44 and 46, respectively, and plural pairs of spaced channels 48, four pairs being shown, having flange portions connected to the webs of the rear beams 44 and 38 provide additional support for table 10, as well as mounting supports for holddown clamp assemblies 24 hereinafter described.

Figure 4B:
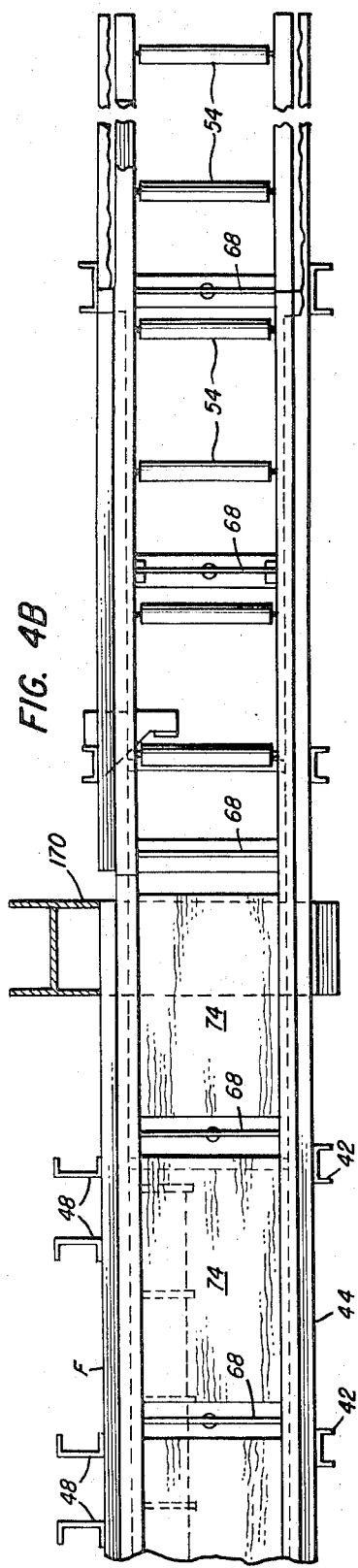

As best seen in FIG. 14, movable table 14 comprises a pair of elongated, laterally spaced, outwardly facing channel members 50 having a plurality of longitudinally spaced across angle members 52 connecting between the webs of members 50. As seen in FIG. 4B, longitudinally spaced rollers 54 also connect between channel members 50 along the right end portion of movable table 14, the upper roller surfaces thereof projecting above the upper flanges of members 50. Pairs of vertically spaced rollers 56 are pivotally mounted at longitudinally spaced positions along the inner face of each channel member 50. A pair of plates 58 overlie the upper flanges of and are coextensive with beams 44. The inner edges of plates 58 project inwardly between rollers 56, thereby supporting table 14 for longitudinal movement along base table 14 between beams 44. Table 14 is illustrated in FIGS 2, 4A, and 5A in the fully retracted position with the left end thereof butting the left outrigger assembly 16, table 14 extending on table 12 past unipoint U below saw assembly 30 and past the right end of base table 12. The right end of table 14 is spaced at least 2 feet from right outrigger 16 for reasons which will become apparent.

Length Positioner Assembly

The length positioner assembly 17 includes popup stop assemblies 18 which are carried by movable table 14 at predetermined spaced intervals therealong. The popup stop assemblies 18 each comprise a fluid-actuated cylinder PC (FIGS. 14 and 15) suitably secured to and depending from the underside of a cross-channel beam 60. Beams 60 are secured in spaced relation below and at spaced intervals, i.e., 2 feet, along channel members 50 by suitable bolts 62 and spacers 64. The piston rods PR associated with cylinders PC extend upwardly through central openings formed in beams 60 and have clevises 66 secured on their upper ends which connect to popup stops 68 by pins 69. Popup stops 68 comprise transversely disposed rectangular members mounted for vertical sliding movement between vertically spaced pairs of rollers 70 pivotally secured to each channel member 50 at longitudinally spaced positions along the inner face thereof. Stops 68 have central slots 72 along their lower edges for receiving clevises 66. Sheets of wood 74 are carried on top of cross members 52 and extend between channel members 50 and stops 68, as illustrated in FIGS. 13 and 14. It can be seen that selected actuation of any one of cylinders PC extend its associated rod PR and stop 68 so that the upper edge of stop 68 projects upwardly beyond the upper surfaces of and between wood sheets 76 and that retraction of rod PR withdraws the upper edge of such stop 68 below the upper surfaces of wood sheets 74. The popup stop assemblies 18 located between the rollers 54 adjacent the right end portion of the movable table 14 likewise extend and retract the associated stops 68 above and below the plane upper surface of movable table 14.

Popup assemblies 18 are spaced at intervals, preferably 2 feet, each from the other along table 14. With the movable table 14 fully retracted on base table 12, the first popup assembly 18 is located at reference point R 2 feet to the left of unipoint U. The succeeding popup assembly is 2 feet to the right at unipoint U. Succeeding popup assemblies are spaced at 2 foot intervals to the right of unipoint U as seen in FIG. 4B. Selected actuation of any one cylinder PC accordingly projects the associated stop 68 above table 14 and locates the same a predetermined distance from reference point R. To simplify further reference herein, the reference number succeeding the designation, PC, PR, PV, or PS indicates the popup cylinder, piston rod, valve, or solenoid associated with the popup assembly which is located a distance in feet from reference point R equal to such number designation.

Upright tubular members 76 are secured to crossmembers 52 and depend therefrom to carry at their lower ends a longitudinally extending angle member 78. As best seen in FIGS. 5, 6, and 7, length positioner 19 includes a plurality of fluid-actuated cylinders LC serially mounted within a cylindrical casing 80 having an elongated slot 82 coextensive in length therewith opening through a lateral face thereof. Casing 80 is carried by a plurality of longitudinally spaced brackets 84 fixed to a longitudinally extending, laterally disposed support member 86. Brackets 84 encompass casing 80 and are laterally recessed to form a slot as at 87 (FIG. 7) in registry with slot 82 whereby flexible fluid conduits 434 and 436 communicating with cylinders LC can move lengthwise along slot 82 without interference from brackets 84. Casing 80 is mounted on a trunnion shaft 89 having a chordwise slot 90 adjacent an end thereof and an axial groove 91. Trunnion shaft 89 is pivotally mounted between a pair of trunnion blocks 92 carried on a mounting plate 93. Plate 93 is carried on a mounting beam 94 fixed at opposite ends to cross support channels 95 welded at opposite ends to front stanchions 42 and rear channels 48, respectively (FIG. 3). The lower side of a central portion of support member 86 engages in slot 90 and the lower edge of a central support bracket 84 engages in groove 91 to fix casing 80 for pivotal movement relative to table 10.

Figure 8:
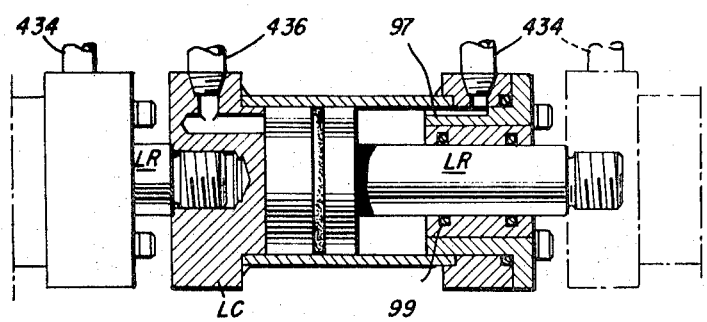
FIG. 8 is an enlarged longitudinal sectional view of a length positioner cylinder.
Figure 5B:
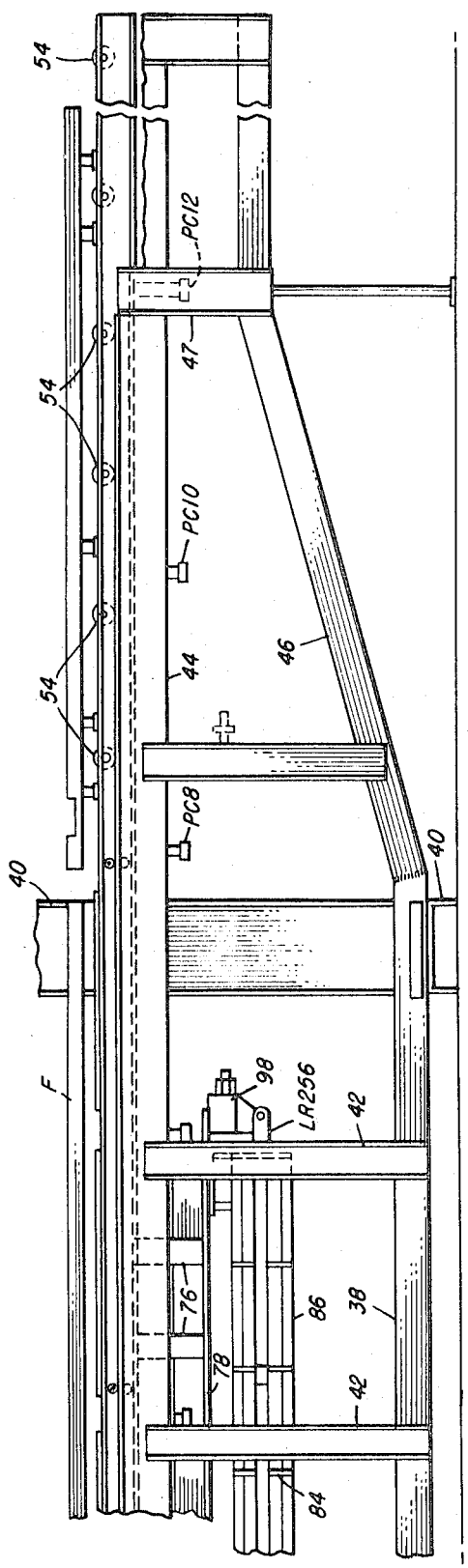

The first or left-hand cylinder as seen in FIG. 6 is fixed to the left-hand end of casing 80 while the remaining cylinders LC are free for axial movement within casing 80. As best seen in FIG. 8, the ends of the piston rods LR of each cylinder LC threadedly engage the base of the next succeeding cylinder LC whereby extension of the piston rod LR of any one cylinder displaces all of the succeeding cylinders axially along casing 80 a distance corresponding to the piston displacement of such cylinder(s). Accordingly, the total axial piston displacement of the right hand or free end of the cylinder of the length positioner cylinders LC equals the sum of the piston displacement(s) of the actuated cylinder(s). The piston rod end of the last or right-hand cylinder is fixed to angle member 78 by a bracket 98 (FIG. 5B) whereby actuation of any one or all of the cylinders LC in casing 80 displaces the movable table 14 longitudinally along base table 12 a distance corresponding to the sum of the individual piston displacements of the actuated cylinders LC. The piston rod of each cylinder LC is either fully extended or fully retracted and, when all of the piston rods of the several cylinders are fully retracted, movable table 14 is fully retracted locating the stop 68 of the first popup assembly 18 coincident with reference point R and the stop 68 of the second popup assembly coincident with unipoint U as seen in FIGS. 4A and 5A.

Each cylinder has a piston displacement double the piston displacement of the preceding cylinder with the first or left hand cylinder having, in the preferred form hereof, a piston displacement of one-sixteenth inch, the next cylinder one-eighth inch, the next one-fourth inch, and so on, with the last or largest cylinder having a piston displacement of 16 inches. It can therefore be seen that a total piston displacement of the length positioner cylinders equal to 31 15/16 inches may be obtained and that a predetermined displacement of table 14 within a usable range of 2 feet at 1/16-inch increments may be obtained by actuation of selected cylinders LC. To simplify further reference herein, the reference number succeeding each length positioner cylinder designation LC is given in sixteenths of an inch of the piston displacement of the cylinder so designated, the piston rod, valve, and solenoid LR, LV, and LS, respectively associated with each cylinder having like numerical designation. It will be noted (FIG. 8) that the cylinders LC per se are conventional and have the usual bushings 97 and O-ring seals 99.

Pull-Back Clamps

As seen in FIGS. 9–12, pullback assemblies 20 each comprise a base channel member 100 secured at one end to a plate 102 which is bolted as at 104 to a mounting block 106 welded to plate 58 and to the undersurface of fence F, channel 100 extending rearwardly from the rear edge of table 10. A plate 108 is secured to the opposite end of channel 100 and mounts a pullback cylinder 110 having fluid conduits 514 and 502 for the pullback assemblies 20 to the left of unipoint U and conduits 514 and 506 for the assemblies 20 to the right of unipoint U communicating with opposite ends thereof, as the case may be, and a piston 114 mounting a clevis 116 on the end thereof for sliding movement through a block 118. A pair of sidewalls 120 are fixed along their lower edges to the outer faces of flange portions of channel 100, each wall 120 having an elongated slot 122 terminating at its forward end in an arcuate upwardly extending slot 124 having a radius indicated at r. A block 126 is slidably received between sidewalls 120 and mounts a pair of rollers 128 and 130 on each side thereof for engagement within slot formation 122. The front lower face portion of block 126 is cut away as at 131 and the base of block 126 has a central slot 132 which receives the forward end of a link 134. A pin 136 extends through clevis 116 and an opening in the base of block 126 and pivotally secures link 134 to block 126. Link 134 is pivotally connected at its opposite end to clevis 116 by a like pin 136. An arm 138 is welded at one end to the front upper face portion of block 126 and has a short tubular member 140 depending from its opposite end.

Slot formations 122 and 124 provide a track in which rollers 128 and 130 roll to guide block 126 during the pullback clamping action. It will be seen that when cylinder 110 is actuated to fully retract piston 114, block 126 and arm 138 are displaced rearwardly to the position illustrated by the dashed line in FIG. 9 with rollers 128 and 130 displaced to the rear of slot 122. In this position, tube 140 bears against the outer edge of frame member W to clamp the latter against fence F. To release member W, cylinder 110 is actuated to extend piston 114, thereby to displace block 126 and arm 138 forwardly to the full line position shown in FIG. 9 and locate the forwardmost rollers 130 on opposite sides of block 126 in registry with the lower end of arcuate slot formation 124. Further extension of piston 114 pivots block 126 about rear rollers 128 to force rollers 130 into arcuate slot 124, thereby pivoting arm 138 upwardly about the axis of rear rollers 128 (FIG. 11) whereby frame member W may be withdrawn across the front edge of table 10. To return arm 138 to a clamping position, cylinder 110 is actuated to retract piston 114 causing block 126 to pivot axis 128 in a counterclockwise direction as seen in FIG. 11 whereby roller 130 traverses arcuate slot formation 124 to register with the forward end of longitudinal slot 122. When rollers 130 enter slot formation 122, block 126 is free for rearward movement upon further retraction of piston 114 to the dashed line position shown in FIG. 9 to again clamp a frame member W against fence F.

Holddown Assembly

Figure 15:
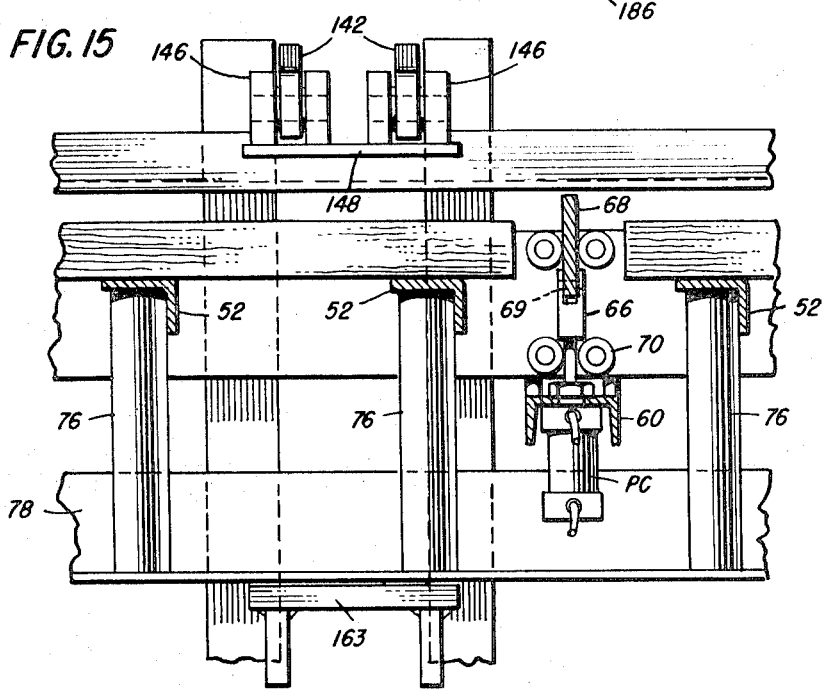
FIG. 15 is an enlarged fragmentary sectional view of the saw table taken about on line 15—15 of FIG. 13 and illustrating the holddown clamp assembly in front elevation.

Holddown assemblies 24 are located interiorly of pullback clamp assemblies 20 along table 10 adjacent saw assembly 30 and each comprise, as seen in FIGS. 13–15, a pair of arms 142 spaced in side-by-side relation and having a sleeve 143 extending therebetween. A pin 144 engages through sleeve 143 and registering openings through the upper ends of paired channels 48 to mount arms 142 between channels 48 for pivotal movement. A pair of brackets 146 are secured along the upper surface of a jaw 148 and pivotally secure the ends of arms 142 as by pins 150 to jaw 148 whereby jaw 148 overlies movable table 14 in spaced relation thereto adjacent rear fence F.

A pair of lower clamping arms 152 are pivotally secured to channels 48 as by pin 153 below pin 144 and pivotally mount between the rear ends thereof the lower end of an actuating cylinder 154 as by pin 156. Piston 158 of cylinder 154 mounts a knuckle 160 on its end which extends between a pair of bushings 161 secured to the inner rear faces of arms 142, knuckle 160 being pivotally mounted to the rear ends of arms 142 as by pin 162. A sleeve 164 is fixed between arms 142 adjacent the rear ends thereof and is engageable against a fixed pad 166 suitably mounted to table 10 as by bracket 167 and channel beam 168 to limit pivotal motion of arms 142 in a clockwise direction as seen in FIG. 14. The forward end of lower arms 152 mounts a lower jaw 163 engageable against the undersurface of angle member 78. It is thus apparent that extension and retraction of piston 158 pivots arms 142 and 152 between positions clamping board W on top of movable table 14 between upper and lower jaws 148 and 163, respectively, and a board release position indicated by the dashed lines of FIG. 14, the clamping force being applied through wood sheets 74, tubular members 76 and angle member 78 and being essentially a scissors action.

Angle Positioner Assembly

Figure 18:
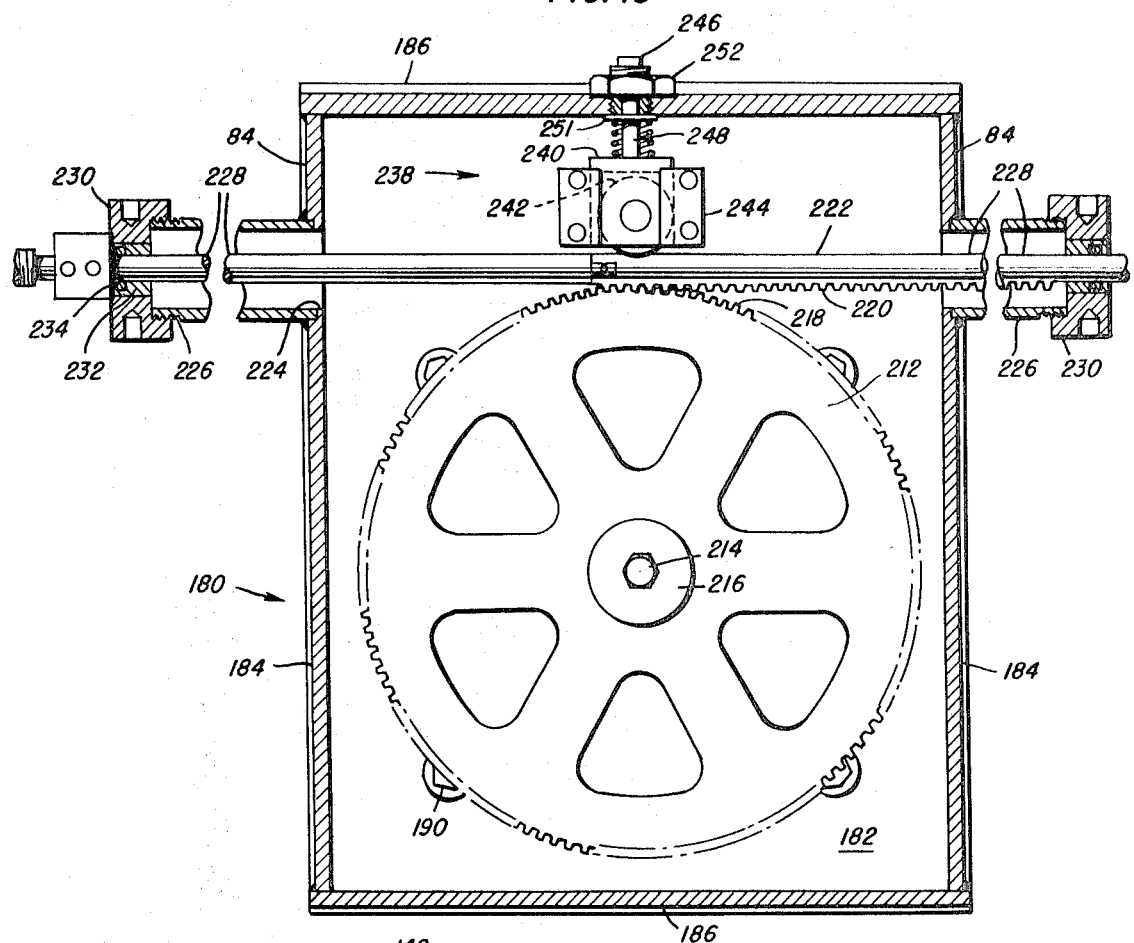
FIG. 18 is a horizontal sectional view of the angle positioner assembly taken about on line 18—18 of FIG. 17.
Figure 17:
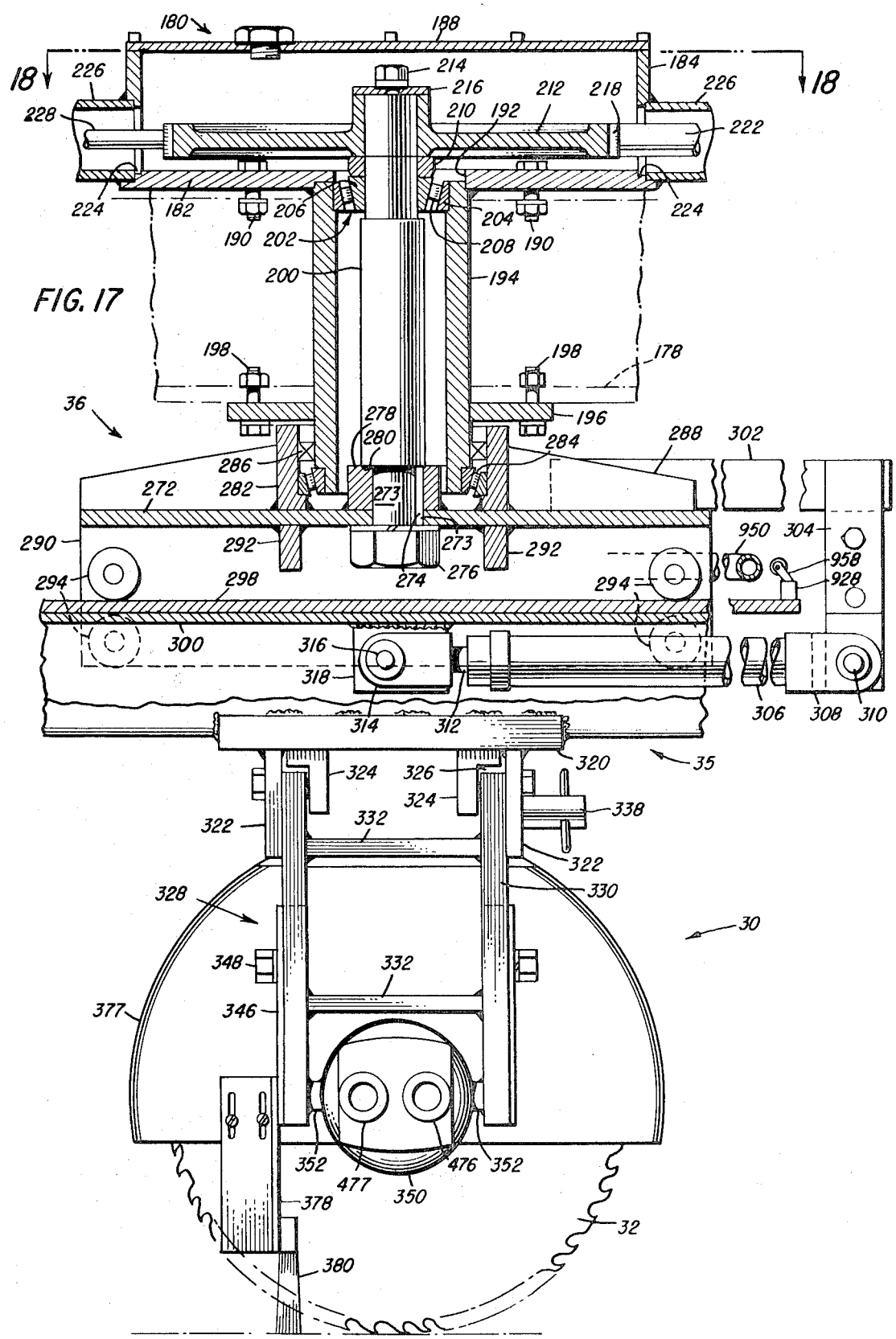
FIG. 17 is an enlarged longitudinal section view thereof taken about on line 17—17 of FIG. 16.

Superstructure assembly 26 comprises a pair of upstanding support H-beams 170 spaced longitudinally one from the other and welded at their lower ends to base beams 40 and along their front edges to rear beams 38 and 44. Suitable bracing 172 (FIG. 3) is provided connecting between the rear ends of base beams 40 and the upper ends of H-beams 170. A pair of plates 174 are welded on the upper ends of H-beams 170 and project forwardly over table 10 with reinforcing support provided by gusset plates 176 welded along the front upper edges of H-beams 170 and the underside of plate 174. Opposite ends of a front I-beam 178 and a rear channel 179 are secured on plates 174. As seen in FIGS. 16-18, a boxlike housing 180 having a bottom plate 182, side and end walls 184 and 186, respectively, and an upper plate 188 is mounted as by bolts 190 on top of beams 178 and 179 medially between the ends thereof. Bottom plate 182 is centrally apertured as at 192 and a sleeve 194 is welded thereabout to depend from plate 182. A centrally apertured plate 196 is secured as by bolts 198 to the lower inner flanges of beams 178 and 179 and receives the lower end portion of sleeve 194 (FIG. 17). A shaft 200 extends axially through sleeve 194 and is journaled therein by a suitable thrust bearing 202 comprising a cup 204 fixed about the upper end of sleeve 194 and a cone 206 mounted about shaft 200 with roller bearings 208 therebetween. A locknut 210 threads about shaft 200 to preclude axial displacement of shaft 200 downwardly through sleeve 194.

A spur gear 212 is keyed on the reduced diameter upper end of shaft 200 and a capscrew 214 and lockwasher 216 retain gear 212 on shaft 200. As seen in FIG. 18, spur gear 212 has peripheral teeth 218 which mesh with the teeth 220 on a rack 222 whereby longitudinal displacement of rack 222 rotates shaft 200. Sidewalls 184 of housing 180 are apertured as at 224 and a pair of sleeves 226 are welded at one end to sidewalls 184 about apertures 224 and receive rack 222. Opposite end portions 228 of rack 222 are formed to provide shafts which extend through end caps 230 threaded on the outer opposite ends of sleeves 226, end caps 230 having suitable bushings 232 and O-ring seals 234. A bracket 236 (FIG. 19) is threaded on one end of rack 222 and depends therefrom for connection with a piston rod AR forming a portion of the angle positioner assembly 28 to be described.

With reference to FIG. 18, a yoke assembly 238 is provided to maintain rack 222 in meshing engagement against spur gear 212 and comprises a yoke 240 mounting a roller 242 between the legs thereof and projecting beyond the front edge of yoke 240 to engage against the rear smooth face of rack 222. Yoke 240 is slidable toward gear 212 between a pair of gibs 244 mounted on bottom plate 182. The baring pressure of roller 242 against rack 222 is selectively adjustable by a screw 246 which slidably receives one end of a dowel 248, the opposite end of dowel 248 being slidably received in a recess formed through the rear face of yoke 240. A spring 250 encompasses dowel 248 and opposite ends thereof bear against the rear face of yoke 240 and the inner face of a washer 251 which bears against screw 246 whereby threading screw 246 through end wall 186 selectively varies the spring pressure against yoke 240 to adjust the bearing pressure of roller 212 against rack 222. A jamnut 252 threads about screw 246 to retain the same in selected position.

Figure 19:
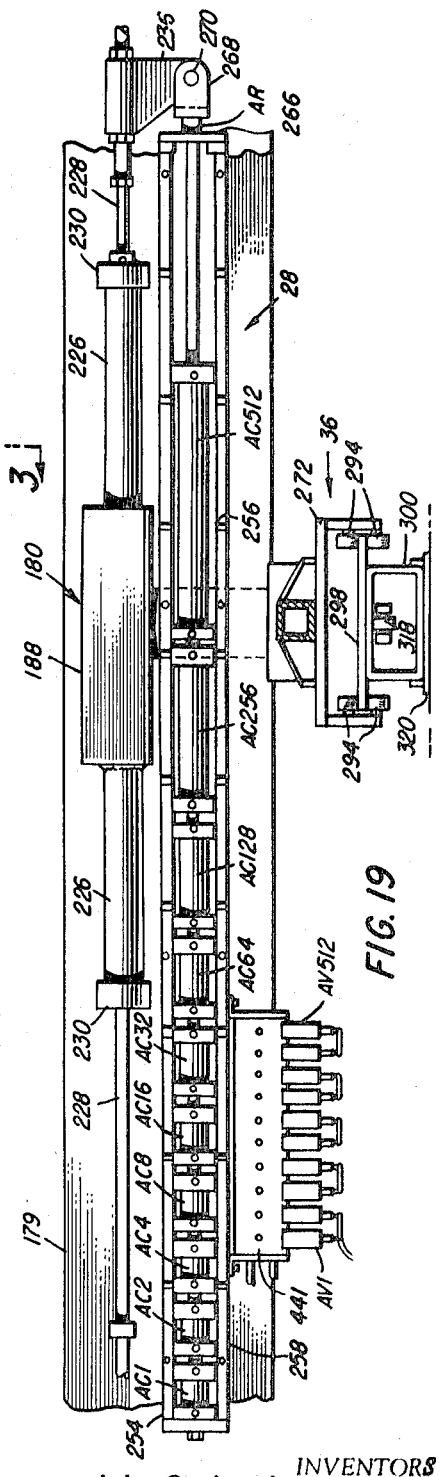
FIG. 19 is an enlarged rear elevational view of the angle positioner and saw guide assemblies.

As seen in FIG. 19, the angle positioner cylinders AC are connected in end-to-end serial relation one to the other within a casing 254 mounted by means of brackets 256 fixed to an elongated plate 258 which, in turn, is mounted by bolts 260 to the web of rear channel 179. Casing 254 is spaced below sleeves 226 and has a slot 262 coextensive in length therewith and opening laterally through the rear face thereof for receiving and permitting lengthwise movement of hydraulic conduits 444 associated with the angle position cylinders AC. The first or left-hand cylinder AC as seen in FIG. 19 is fixed to the end or left-hand end of casing 254 while the remaining cylinders AC are free for axial sliding movement within casing 254. The cylinders AC of angle positioner assembly 28 are similarly connected one to the other as are the cylinders of length positioner assembly 17 as, for example, the ends of the piston rods AR of each cylinder AC threadedly engage the base of the next succeeding cylinder AC similarly as the cylinders seen in FIG. 8, whereby extension of piston rod AR of any one cylinder AC displaces all of the succeeding cylinders AC axially along casing 254 a distance corresponding to the piston displacement of such cylinder(s). The length of casing 254 is such as to accommodate all of the cylinders AC when actuated to fully extend their associated pistons AR. As in the previously described length positioner cylinders LC, the total axial piston displacement of the left-hand or free end cylinder AC seen in FIG. 19 equals the sum of the piston displacement(s) of the actuated cylinder(s) of the angle positioner cylinders AC. The piston AR associated with the free end cylinder AC extends through an end plate 266 on casing 254 and mounts a clevis 268 which pivotally connects with the lower portion of brackets 236 as by pin 270, whereby the piston displacement of cylinders AC displaces rack 222 an equal longitudinal distance. Thus, the piston rod end of the free or right-hand end cylinder rotates shaft 200 through rack 222 and gear 212, shaft 200 rotating saw assembly 30 as will presently be described, actuation of any one or all of cylinders AC angularly displacing saw assembly 30 a predetermined distance proportional to the sum of the individual piston displacements of the actuated cylinders AC. The piston rod of each cylinder AC is either fully extended or fully retracted and, when all of the piston rods of the several cylinders are fully retracted, saw blade 32 is longitudinally aligned with the saw table and the long axis of frame member W.

The piston displacement of each cylinder AC is double the piston displacement of the preceding cylinder AC or one-half the piston displacement of the succeeding cylinder AC and actuation of each cylinder individually provides a predetermined angular displacement of spur gear 212. For example and in a preferred form hereof, actuation of cylinder AC having the smallest piston displacement and which is fixed to end plate 264 provides an angular displacement of gear 212 equal to ¼°, actuation of the next cylinder provides an angular displacement of gear 212 equal to ½°, actuation of the next cylinder provides an angular displacement of 1°, and so on, with the last and largest cylinder providing an angular displacement of spur gear 212 equal to 128°. Accordingly, it can be seen that actuation of selected cylinders AC can provide a predetermined angular displacement of gear 212 and hence saw blade 32 throughout a range at least equal to the desired range of 180° at increments of ¼°. For future reference, the reference number succeeding each angle positioner cylinder designation AC is given in quarters of a degree of rotation of gear 212 provided by displacement of the cylinder so designated, the piston rod, valve and solenoid AR, AV, and AS, respectively associated with each cylinder having like numerical designation.

Ram and Guide Assembly Therefor

The ram guide assembly 36, as best seen in FIGS. 16 and 17, comprises a rectangular baseplate 272 keyed on the lower reduced diameter end portion 273 of shaft 200 as at 274 and retained thereon by a nut 276 threaded about the lower end of shaft 200. A collar 278 spaces baseplate 272 along portion 273 from a shoulder 280. A sleeve 282 is connected as by a at one end to the upper surface of baseplate 272 about sleeve 174 and mounts thrust bearings 284 comprising the usual cone, cup and roller bearings, the upper end of sleeve 282 being spaced from plate 196. A grease seal 286 is provided between sleeve 194 and sleeve 282. Gusset plates 288 are secured to sleeve 282 and baseplate 272. A substantially semicircular plate 275 suitably slotted to receive gusset plates 288 and sleeve 282 overlies and is suitably secured to baseplate 272. A C-clamp 277 is supported between a pair of plates 279 fixed to plate 281 carried by I-beam 178. The lower jaw 283 of clamp 277 underlies plate 275 and an upper jaw 285 is secured on the piston end of cylinder 287 secured between plates 279. The guide assembly 36 may accordingly be clamped or stabilized in a predetermined angular position by actuation of cylinder 287 to clamp plate 275 between jaws 283 and 285.

A pair of side flats 290 are secured as by welding to baseplate 272 to depend therefrom along the opposite edges thereof. A pair of reinforcing plates 292 extend between side flats 290 and are welded thereto and to the undersurface of baseplate 272. A pair of vertically spaced rollers 294 are pivotally mounted at opposite ends of each side flat 290 and extend inwardly of the downwardly opening channel formation formed by side flats 290 and baseplate 272 and provide a roller support and guideway for ram assembly 35.

Ram Assembly

Ram assembly 35 comprises an elongated ram plate 298 mounting a laterally reduced ram tube 300 having a rectangular cross section as seen in FIG. 16. The edges of ram plate 298 which extend laterally beyond tube 300 engage between vertically spaced rollers 294 whereby tube 300 may be longitudinally displaced relative to ram guide assembly 36 (the fixed channel formation). To longitudinally displace tube 300, an elongated bracket 302 is secured at one end along the upper surface of baseplate 272 and extends parallel to tube 300 beyond the rear end thereof (FIGS. 3 and 17). A bracket 304 depends from the rear opposite end of bracket 302 and the base of a feed cylinder 306 mounts a clevis 308 which is pivotally secured to the lower end of bracket 304 as by pin 310. Cylinder 306 extends within ram tube 300 through the open rear end thereof and piston rod 312 of cylinder 306 mounts a clevis 314 at its outer end. Clevis 314 is pivotally secured as by pin 316 to a depending lug 318 suitably secured as by welding to the underside of the upper surface of ram tube 300. In this manner, extension or retraction of piston rod 312 as by actuation of cylinder 306 displaces ram tube 300 longitudinally along ram guide assembly 36.

Saw Assembly

Saw assembly 30 is fixed to and depends from ram tube 300 for longitudinal and angular movement therewith and a baseplate 320 is suitably secured to the underside of ram tube 300. A pair of plates 322 and 324 are mounted to depend from baseplate 320 adjacent the opposite lateral edges thereof to form a pair of tracks 326 extending transversely of ram tube 300. A tilt bracket generally indicated 328 comprises a pair of sector plates 330 spaced one from the other by reinforcing plates 332 and have arcuate grooves 334 formed in the outer faces thereof adjacent arcuate edges 336. The arcuate edge portions of sector plates 330 extend within track formations 326 between plates 324 and 322 and a plurality of roller pins 337 engage through outer plates 322 within grooves 334 to support tilt bracket 328 from ram assembly 35. A locking screw 338 threads through outer plates 322 into grooves 334 to bear against the flat of the grooves to maintain tilt bracket 328 in a selected tilt position.

A hydraulic motor 340 of the fixed displacement piston type is disposed between sector plates 330 adjacent the lower edges thereof and has hydraulic inlet and exhaust connections 476 and 477, respectively. A pair of support plates 346 are inset in corresponding recesses formed in the outer faces of sector plates 330 and a pair of bolts 348 engage through plates 346 into sector plates 330 to maintain plates 346 in selected fixed position. The lower ends of plates 346 depend below the lower edge of sector plates 330 and mount a housing 350 therebetween by suitable inwardly projecting brackets 352 seen in FIG. 17. A bolt 354 engages through the lowermost reinforcing plate 332 and is fixed at its lower end to housing 350. A nut 356 threads thereon and secures housing 350 in a selected position relative to sector plates 330. A spindle 358 is mounted within housing 350 on suitable bearings 360 located adjacent opposite ends thereof with locknuts 362 threaded on reduced diameter portions of spindle 358 butting the inner races of bearings 360 against respective shoulders 364. Opposite ends of spindle 358 engage through seals 366 at opposite ends of housing 350 and a coupling shaft 368 connects the output shaft 369 of motor 340 with one end of spindle 358. The coupling shaft 368 has shock-absorbing springs 371 to preclude damage to motor 340 as the saw cuts through wood having varying resistances to cutting, such as knots, etc. A saw blade 370 is mounted on the other end of spindle 358 between a pair of collars 372, collars 372 and blade 370 being clamped on the end of spindle 358 against a shoulder 374 by a nut 376 threaded on the distal end of spindle 358. A shield 377 encompasses the upper portions of blade 370 on opposite sides thereof. A pair of support brackets 3878 are suitably secured to the lower end of one of the brackets 352 and the lower end of shield 377, each bracket 378 mounting a brush 380 located adjacent the lower edge of saw blade 370 on opposite sides thereof for traversing movement with blade 370 across table 10 to sweep the cuttings from the table.

Repeat Cycle Timer

Figure 22:
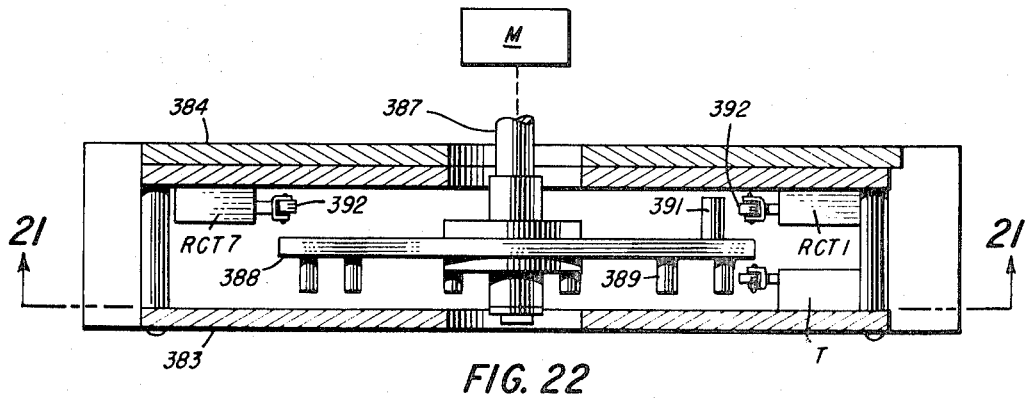
FIG. 22 is a horizontal sectional view thereof taken about on line 22—22 of FIG. 21.
Figure 21:
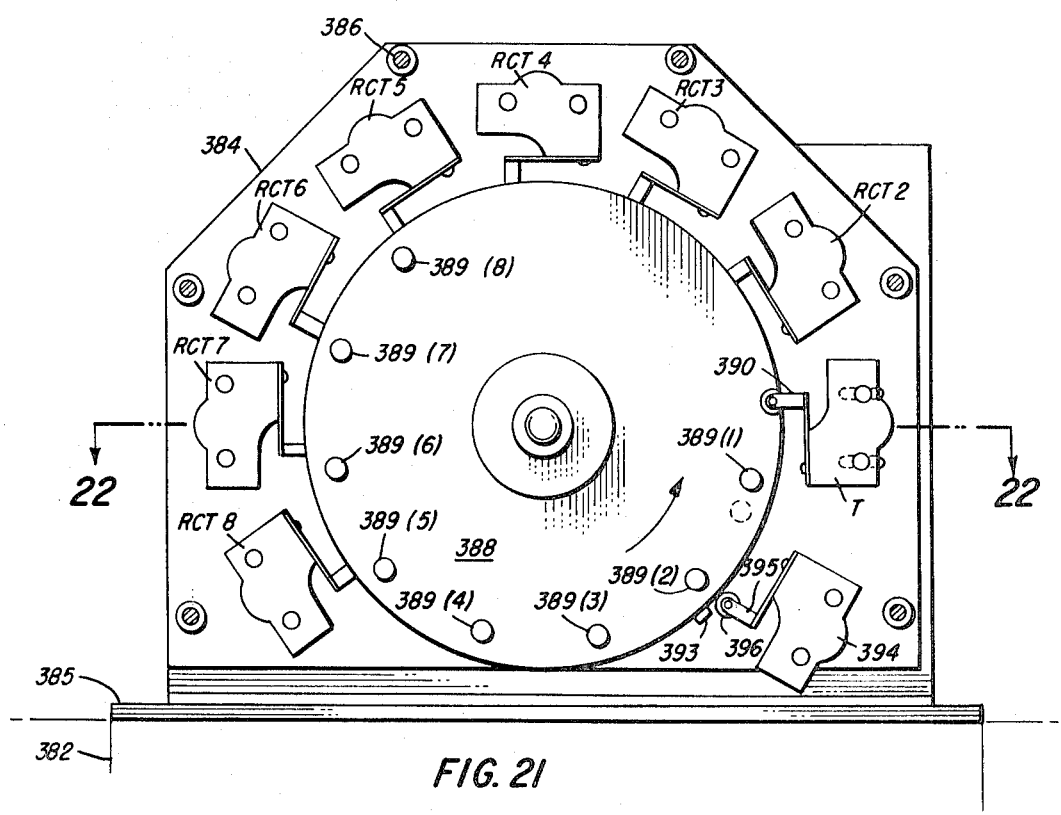
FIG. 21 is a longitudinal sectional view of a repeat cycle timer taken about on line 21—21 of FIG. 22.

A repeat cycle timer RCT is mounted on a suitable stand 382 (FIG. 1) and comprises spaced front and rear walls 383 and 384, respectively, (FIGS. 21 and 22) mounted on a base 385, walls 384 and 383 being joined one to the other by dowels 386 spaced about and connected between the peripheries thereof. An electric motor M is suitably mounted on stand 382 by means not shown and drives a shaft 387 suitably journaled in central openings through walls 383 and 384. An index wheel 388 is fixed on shaft 387 for rotation therewith within walls 383 and 384. Eight pins 389(1)-389(8) are spaced about the periphery of wheel 388 to project from the front face of wheel 388. A tape-stepping normally open switch T is suitably secured to the front wall 383 and mounts a switch-actuating arm 390 carrying a roller extending in the path of rotation of pins 389. Accordingly, as wheel 388 rotates, pins 389(1)-389(8) successively engage arm 390 to successively close and open switch T for reasons as will become apparent.

A pin 391 is fixed adjacent the periphery of wheel 388 and projects from the rear face thereof. Eight switches RCT1-RCT8 biased in a normally open position are fixed to rear wall 384 and spaced about the periphery of wheel 388. Switches RTC1-RTC8 have arms 392 carrying rollers which project into the path of movement of pin 391. As wheel 388 rotates, pin 391 successively closes switches RCT1-RCT8. For reasons as will presently become clear, pin 391 is located on the rear face of wheel 388 slightly behind the first pin 389(1) and the pins 389(1)-389(8) are spaced equally about wheel 388 similarly as switches RCT1-RCT8 such that switch T is closed by successive pins 389(1)-389(8) prior to respective successive closing of switches RCT1-RCT8 by pin 391. In this manner, pine 389(1) closes timer switch T just prior to the closing of switch RCT1 by pin 391, pin 389(2) closing switch T just prior to the closing of switch RCT2 by pin 391, and so on until pin 389(8) closes switch T just prior to the closing of switch RCT8 by pin 391.

A pin 393 is mounted on and projects from the periphery of wheel 388. A normally closed switch 394 is suitably mounted on repeat cycle time RCT and has a switch-actuating arm 395 mounting a roller 396 projecting into the rotary path of pin 393 whereby pin 393 momentarily opens switch 394 upon engagement of pin 393 against arm 395. Pin 393 and switch 394 are located such that switch 394 is opened by in 393 prior to closing stepping switch T by first pin 389(1) to stop motor M in a manner to be described before initiation of another switch-actuating cycle of rotation of wheel 388.

Fluid Control Circuit

As illustrated in FIGS. 24A-24F, a fluid circuit is provided and arranged in controlling relation to the length and angle positioner cylinders LC and AC, respectively, the popup stop cylinders PC, the pullback and holddown cylinders 110 and 154, respectively, hydraulic motor 340 for the saw, and the ram cylinder 306.

As best seen in FIG. 24A, a pair of hydraulic pumps 400 and 401 of the vane type are driven by an electric motor EM and provide a constant delivery of hydraulic fluid from a reservoir 402 to a pair of hydraulic conduits 404 and 406. A filter 408 is provided in suction conduit 410, filter 408 being provided with a reusable filtration screen 412 and a bypass valve 414 having a suitable cracking pressure to avoid pump starvation. A filter condition indicator gage is also provided at 416. Pressurized fluid is provided the length and angle positioner assemblies 17 and 28, respectively, through main feed conduit 404 having a relief valve 418 of the balanced piston type and a filter 420 having a filtration screen 422 and bypass valve 424 similarly as filter 408.

The length positioner 19, angle positioner 28, and the popup stop assembly 18 are connected in parallel to conduit 404 by branch conduits 426, 428, and 430, respectively. Pressure fluid from conduit 426 flows to four-way, two-position directional control valves LV connected in parallel with feed conduit 426. A control valve LV is provided each of the length positioner cylinders LC and accordingly control valves LV1, LV2, LV4, LV8, etc., to LV256 are arranged in respective controlling relation to the associated cylinders LC1, LC2, LC4, LC8, etc., to LC256. A solenoid LS is arranged in controlling relation to each of the valves LV and operates to alternately shift the corresponding valve LV between positions providing pressure fluid on opposite sides of the associated piston to extend and retract the same, solenoids LS being actuated in a manner to be described, Valves LV and solenoids LS are mounted in a bracket 431 secured to beam 44 of table 12 as seen in FIG. 5A. Valves LV are illustrated in the piston-retracting position and provide pressurized fluid from feed conduit 426 to the right or rod side of cylinders LC as seen in FIG. 24E via conduits 432 and 434. In the retracted position, pressure fluid exhausts from the piston or left side of cylinders LC via conduits 436, through valves LV and conduits 437 into an exhaust conduit 438 connected in parallel with conduits 437 and returns the fluid to reservoir 402 via a conduit 439. An exhaust conduit filter 440 is provided and has the usual filter screen 442, bypass valve 444 and filter element condition gage 446.

Selected actuation or energization of any one or all of solenoids LS shifts the associated valve or valves LV to the right as seen in FIG. 24E to provide pressure fluid from feed conduit 426 to the left or piston side of associated cylinder(s) LC via conduits 432 and 436 to extend the associated piston. Pressure fluid exhausts from the rod or right side of cylinders LC through the associated valve(s) LV into exhaust conduit 438 via conduits 434 and 437 for return to reservoir 402 via conduit 439. In this manner, any one or all of the cylinders LC can be selectively actuated to extend an associated piston rod LR from the illustrated retracted position to a fully extended position whereupon cylinders LC succeeding the actuated cylinder(s) are axially displaced along casing 80 to the right, as seen in FIGS. 5A and 5B, a distance equal to the sum of the piston displacement(s) of the preceding actuated cylinder(s). Deenergization of solenoids LS shifts valves LV to the illustrated position to provide pressure fluid to the rod or right side of cylinders LC as hereinbefore noted, thereby retracting the associated piston rods LR and axially displacing cylinders LC2, LC4, etc., to LC256 to the left. Cylinders LC2, LC4, etc., to LC256 and all piston rods LR are, accordingly, maintained in the fully retracted position in the absence of energization of any one or more of solenoids LS by the supply pressure fluid in conduit 426.

The angle positioner assembly 28 has a similar fluid control circuit comprising an angle positioner feed conduit 428 which provides pressurized fluid to four-way two-position directional control valves AV connected in parallel with angle positioner feed conduit 428 via conduits 442. A control valve AV is provided each of the angle positioner cylinders AC and, accordingly, control valves AV1, AV2, AV4, AV8, etc., to AV512 are arranged in respective controlling relation to the associated cylinders AC1, AC2, AC4, AC8, etc. to AC512. A solenoid AS is arranged in controlling relation to each of the valves AV and operates to alternately shift the corresponding valve AV between positions providing pressure fluid on opposite sides of the associated piston to extend and retract the same, solenoid AS being actuated in a manner to be described. Valves AV and solenoids AS are mounted in a bracket 441 depending from plate 258 as seen in FIG. 19. The pistons AR of the cylinders AC are maintained in the illustrated retracted positions by pressurized fluid flowing from feed conduit 428 through valves AV via conduits 442 and 444 into the left or rod side of cylinders AC as seen in FIG. 24E with pressure fluid exhausting from the right or piston side of cylinders AC through valves AV via conduits 446 and 448 into fluid reservoir 402 via an exhaust conduit 449 communicating with return conduit 439.

Selected actuation or energization of any one or all of solenoids AS shifts the associated valve or valves AV to the left as seen in FIG. 24E to provide pressure fluid from feed conduit 428 through the associates valve(s) AV via conduits 442 and 446 to the right or piston side of the associated cylinders(s) AC to extend the associated piston rod(s). Pressure fluid exhausts from the left or rod side of cylinder(s) AC through the associated valves AV into exhaust conduit 449 via conduits 444 and 448 for return to reservoir 402 via conduit 439. It is thus seen that any one or all of cylinders AC can be selectively actuated to extend an associated piston rod AR from the illustrated retracted position whereupon cylinders AC succeeding the actuated cylinder are displaced to the left as seen in FIG. 24E (to the right in FIG. 19) a distance equal to the sum of the piston displacement(s) of the preceding actuated cylinders which is proportional to a predetermined angle of rotation of gear 212 and hence saw assembly 30. Deenergization of solenoids AS shifts valves AV to the right as seen in FIG. 24E to provide pressure fluid to the left or rod side of the associated cylinders AC, thereby retracting the associated piston rods AR and axially displacing cylinders AC2, AC4, AC8, etc., to AC512 to the right (to the left in FIG. 19) to return the same to the fully retracted illustrated position. Cylinders AC2, AC4, AC8, etc., to AC512 and all piston rods AR are, accordingly, maintained in the fully retracted position in the absence of energization of any one or more of solenoids AS by the supply pressure fluid in conduit 428.

The fluid control circuit for the popup stop assembly 18 comprises a popup stop feed conduit 430 providing pressure fluid to a series of four-way two-position directional control valves PV connected in parallel with feed conduit 430 via conduits 450. A valve PV is provided each of the popup stops and, accordingly, popup valves PV0, PV2, PV4, etc., to PV24 are arranged in controlling relation to popup cylinders PC0, PC2, PC4, etc., to PC24, respectively. A solenoid PS is arranged in controlling relation to each of the valves PV and operates to alternately shift the corresponding valve PV between positions providing pressure fluid on opposite sides of the associated piston to extend and retract the same and alternately raise and lower the corresponding stops, solenoids PS being actuated in a manner to be described. Cylinders PC are illustrated in the lowered position and pressurized fluid is provided from feed conduit 430 through valves PV via conduits 450 and 452 to the upper sides of cylinders PC while pressure fluid exhausts from the lower sides of cylinders PC through valves PV via conduits 454 connected in parallel with a fluid return conduit 456 emptying into reservoir 402 through filter 440 and conduit 439. Selected energization or actuation of any one of solenoids PS shifts the associated valve PV to the left as seen in FIGS. 24C and 24D to provide pressure fluid from feed conduit 430 through the associated valve PV via conduits 450 and 454 into the lower side of the corresponding cylinder PC to extend the piston PR thereof. In the shifted position, pressure fluid exhausts from the upper side of the actuated cylinder PC through the associated valve PV via conduits 452 and 458 into conduit 456 for return to reservoir 402. Deenergization of the solenoid PS shifts the associated valve PV to the right to again provide pressure fluid to the upper side of the associated cylinder PC to retract the corresponding stop. In this manner, a stop located at a predetermined distance from the reference point R and from the unipoint U may be raised above movable table 14 in a manner and for reasons as will presently become clear.

The other main feed fluid conduit 406 provides pressure fluid through a relief valve 460 to four-way three-position spring-centered directional control valves 462, 464 and 466 connected in series via conduits 468 and 470. With the latter valves arranged in the illustrated center position, pressure fluid from feed conduit 406 flows serially through such valves via conduits 468 and 470 and through a filter 472 having the usual filtration screen 474, bypass valve 475, and indicator gage G via conduit 479 to reservoir 402. A solenoid S is arranged to shift the first valve 462 to the right as seen in FIG. 24A against the bias of spring 481 to provide pressure fluid via conduits 406 and 476 to hydraulic motor 340 for rotating saw blade 32 while pressure fluid exhausts from motor 340 through valve 462 via conduit 477 into conduit 468 for flow to valves 464 and 466. This fluid motor circuit is provided with a speed control and replenishing valve 478 communicating with pressure fluid flowing into motor 340 via a conduit 480 for regulating the rotary speed of saw blade 32, valve 478 emptying into reservoir 402 via conduit 482. Deenergization of solenoid S permits valve 462 to shift to the left as seen in FIG. 24A under the bias of spring 481 and returns the same to the illustrated position whereby pressure fluid to motor 340 is cut off and motor 340 stops. In order to prevent motor 340 from running dry, a motor brake 484 which communicates with exhaust conduit 477 from motor 340 via conduit 486 provides an adjustable restriction in exhaust conduit 477, motor brake 484 communicating with reservoir 402 via conduit 482. As seen in FIG. 3, a spring-supported arm 485 extends rearwardly from superstructure assembly 26 and mounts a ringlet 487 at its rear end to carry conduits 476 and 477 clear of ram assembly 35, a ringlet 489 being carried below member 300 for carrying conduits 476 and 477 as saw assembly 30 traverses table 10.

The second series-connected valve 464 is arranged in controlling relation to feed cylinder 306 for advancing and retracting saw assembly 30 across table 10 for respectively making a cut and returning the saw to its initial position. A pair of solenoids F488 and R490 are arranged to shift valve 464 between positions providing fluid pressure to opposite sides of piston 312 alternately advance and retract saw assembly 30 and are actuated in a manner to be described. Actuation of solenoid F488 shifts valve 464 to the right as seen in FIG. 24A against the bias of spring 491 to provide pressure fluid from conduit 468 through valve 464 into the right side of feed cylinder 306 via conduit 492 to extend piston 312. Pressure fluid exhausts from the left or opposite side of piston 312 through valve 464 via conduit 494 into conduit 470. A speed control and replenishing valve 496 is disposed in conduit 492 whereby the speed of advance of saw assembly 30 through wood frame W may be regulated. Deenergization of solenoid F488 permits valve 464 to return to the illustrated center position under the bias of spring 491. Energization of solenoid R490 shifts valve 464 to the left as seen in FIG. 24A against the bias of spring 497 to provide pressure fluid from conduit 468 through valve 464 and conduit 494 to the left side of piston 312 to retract the same and return saw assembly 30 to its initial position. Pressure fluid exhausts from the right side of feed cylinder 306 on the return stroke of piston 312 through valve 464 via conduit 492 into conduit 470. A similar speed control valve 498 is disposed in conduit 494 to control the speed of return of saw assembly 30 to its initial position.

The third series-connected valve 466 is arranged in controlling relation to the pullback and holddown clamp assemblies 20 and 24, respectively. Solenoids CC and CU are arranged to shift valve 466 between positions providing pressure fluid on opposite sides of the pistons of the pullback and holddown cylinders 110 and 154, respectively, for alternately clamping the wood W to and releasing the same from saw table 10. Actuation of solenoid CC shifts valve 466 to the right as seen in FIG. 24A against the bias of spring 499 to provide pressure fluid directly from conduit 470 via conduit 500 and parallel connected conduit 502 to the pullback and holddown clamp cylinders 110 and 154, respectively, on the left side of unipoint U as seen in FIGS. 1 and 24B and sequentially to the pull back and holddown clamp cylinders 110 and 154, respectively, on the right side of unipoint U. The pressure fluid in the left-hand pullback cylinders 110 retracts the respective pistons 114 thereof while the pressure fluid in the left-hand holddown cylinder 154 extends the respective pistons 158 thereof to thus initially clamp a framing member W against fence F and to table 10 on the left side of unipoint U.

The right side pullback and holddown cylinders 110 and 154, respectively, are arranged for sequential actuation; the pullback clamp 20 located furthest from the unipoint U being initially actuated with next adjacent pullback clamps 20 being sequentially actuated in a direction toward unipoint U until all are actuated, at which time the two holddown clamps 24 are successively actuated in a direction toward unipoint U. To accomplish this, sequence valves 504 are serially connected between the feed conduits 506 of next adjacent pullback and holddown clamps 20 and 24, respectively, by inlet and outlet conduits 508 and 510, respectively, each valve 504 having a port 512 biased by a spring 514 to normally preclude communication across the valve via inlet and outlet conduits 508 and 510 between adjacent feed conduits 506(1)–506(6). Check valves 513 are disposed in conduits 506(2)–506(6) to preclude direct communication between feed conduit 500 and the associated right-hand cylinders 110 and 154. Sequence valves 504(1)–504(5) are of the balanced piston type and, as pressure builds up to a predetermined pressure in conduit 506(1) associated with the first pullback cylinder 110 after its piston 144 is retracted, sequence valve 504(1) shifts against the bias of spring 514 to provide pressure fluid from conduit 506(1) to conduit 506(2) communicating with the cylinder 110 of the next adjacent pullback clamp 20 via conduit 508, port 512 and conduit 510. Pressure fluid is maintained in the first pullback cylinder 110 as the piston of the second clamp 20 is retracted. As pressure builds up in its feed conduit 506(2) to the predetermined pressure, sequence valve 504(2) shifts to provide pressure fluid from conduit 506(2) to the third conduit 506(3) to retract the piston of the next pullback cylinder 110. The sequence is repeated until all pullback cylinders 110 are actuated with the last actuated pullback cylinder 110 providing pressure fluid from its associated feed conduit 506(4) through sequence valve 504(4) via conduits 508 and 510 to feed conduit 506(5) associated with the first holddown cylinder 154. Pressure in its feed conduit 506(5) extends piston 158 to clamp the frame member W against table 10 and, when pressure in conduit 506(5) builds to a predetermined pressure, sequence valve 504(5) shifts to provide pressure fluid from feed conduit 506(5) into the last conduit 506(6) whereby the last holddown clamp 24 directly adjacent the unipoint U is actuated to extend its associated piston 158 and clamp the frame member W.

Pressure fluid exhausts from the opposite sides of all the cylinders 110 and 154 through respective conduits 514 and 516 connected in parallel with a conduit 518 returning fluid through valve 466 to reservoir 402 via conduit 479 and filter 472. A speed control valve 520 is disposed in return conduit 518 for regulating the speed of the pullback and holddown clamping action. Pressure fluid is also supplied from conduit 470 through valve 466 (when sifted to the clamping position) to actuate switch 522 via a conduit 524 which opens an electrical circuit to deenergize solenoid CC in response to a predetermined pressure in feed conduit 500. Deenergization of solenoid cc permits spring 499 to return valve 466 to the illustrated center position.

Energization of solenoid CU shifts valve 466 to the left as seen in FIG. 24A against the bias of spring 526 to provide fluid pressure from conduit 470 via conduits 518 and 514 to the opposite sides of clamping cylinders 110 and 154 to a pressure actuated switch 527 via a conduit 528 for purposes as will presently become clear, and to stabilizing clamp cylinder 287 via a conduit 530. Fluid pressure is thus provided to extend pistons 114 of pullback cylinders 110 and retract pistons 158 of holddown cylinders 154 with pressure fluid from the opposite side of the respective cylinders exhausting through conduits 502 associated with the cylinders 110 and 154 to the left of unipoint U and conduit 506 and check valves 513 associated with the cylinders to the right of unipoint U into conduit 500. With valve 466 in the clamp release position, pressure fluid thus exhausts through conduit 500, through a valve 529 regulating the clamp release speed, through valve 466 to reservoir 402 via conduit 479 and filter 472. The dashed lines shown in FIGS. 24B-E represent drain conduits 432 connecting with the various valves LV, AV, and PV, all of which communicate with reservoir 402.

Information Input

The length and angle positioner assemblies 17 and 28, respectively, are controlled by an electrical circuit hereinafter described which actuates the various solenoids of such assemblies in response to sensing length and angle information recorded, in the illustrated form, on punched paper tape. It will be understood that information may be provided the fabricating machine hereof in other forms, such as, for example, by punch cards, magnetic tape, etc. The punch tape employed herein, as seen in FIG. 25, comprises eight-channel tape which corresponds to the standard telegraphic tape so that information recorded on the tape may be transmitted over conventional telegraph lines. Information is recorded as by punching holes through the tape at selected stations therealong, in this instance in eight parallel channels extending lengthwise along the paper tape. However, only the first four channels are employed herein, and are selectively prepunched and sensed both in a manner as will be described to control the length and angle positioner assemblies 17 and 28, respectively.

The tape is arranged in transverse rows and, in the present form, eight such transverse rows comprise a frame on which is recorded sufficient information to actuate the length and angle positioner assemblies 17 and 28 for each cutting pass of the saw. Each row represents information corresponding to a predetermined length, angle, or machine stop function. For example, the first three transverse rows represent input information for controlling length positioner 19 which provides for fine length adjustment by selected movement of table 14, the fourth transverse row represents input information for controlling popup stop assembly 18 which provides a coarse length adjustment, the fifth, sixth and seventh rows represent input information for controlling angle position assembly 28, and the eighth row represents a machine stop function.

The intersection of the transverse rows and the channels form information input stations, the perforations at such stations being sensed by a tape reader TR (to be described) arranged in controlling relation to an electrical circuit (also to be described) which, in turn, actuates the solenoids of the length and angle positioner assemblies 17 and 28, respectively. The sum of the information represented by the perforated stations in each tape row equals the total length or angle information, as the case may be, provided by such tape rows. As will be understood, only the tape stations corresponding to the intersection of channel 1 with row 1, channels 1-2 with row 5, and channels 1-4 with rows 2, 3, 4, 6, and 7 provide intelligence information for generating useful signals controlling the actuation of the associated valve solenoids as will become clear. Perforations at other tape stations, while sensed by reader TR, do not provide intelligence information and these other stations may or may not be punched as desired provided the stations are not perforated in a manner representing the DEL or CR tape functions as will become clear. Referring to FIG. 25, the tape station corresponding to the intersection of the first row and the first channel represents input information for controlling the actuation of cylinder LC256 of length positioner 19. The sensing of a perforation at such station by tape reader TR actuates the cylinder LC256 represented thereby through the electrical circuit to afford movement of table 14 along base table 12 a distance equal to the piston displacement of cylinder LC256 or 16 inches from reference point R.

The tape stations corresponding to the intersection of the second row of the tape with channels 1 through 4 represent input information for controlling the actuation of length positioner cylinders LC16, LC32, LC64, and LC128, respectively. None, one, or any combination of perforations up to a total of 15 possible combinations may be prepunched at these four stations. Accordingly, none, one, or any predetermined combination of the cylinders represented thereby may be actuated through the electrical circuit by selected punching of the tape at the station(s) corresponding to the cylinder(s) desired to be actuated. Since the overall displacement of movable table 14 is the sum of the piston displacements of the individual cylinders LC, selected punching of the tape stations in the second row affords selected displacement of movable table 14 within a range between 0 and 15 inches in increments of 1 inch.

The tape stations at the intersection of the third row with channels 1 through 4 represent input information for controlling the actuation of cylinders LC1, LC2, LC4, and LC8, of the length positioner 19, respectively. None, one, or any combination of perforations up to a total of 15 possible combinations may be prepunched at these four stations. Accordingly, none, one, or any predetermined combination of the cylinders represented thereby may be actuated through the electrical circuit by selected punching of the tape at the station(s) corresponding to the cylinder(s) desired to be actuated. Selected punching of the tape stations in the third row thus provides for selected displacement of movable table 14 within a range between 0 and fifteen-sixteenths inch at increments of one-sixteenth inch.

Thus, selected displacement of table 14 from reference R within a range of 2 feet at 1/16-inch increments may be provided by selected punching of the tape stations in the first three rows and four channels thereof and accordingly provides a fine adjustment of the table 14 along base table 12. It will be noted that, if all the stations providing useful information in the first three rows are perforated, the total piston displacement and hence displacement of movable table 14 would be 31 15/16 inches. However, since the popup stops 68 are located at 2 foot intervals, it is only necessary that those length positioner cylinders LC be actuated which will provide a desired displacement within a range of 2 feet at 1/16-inch increments.

The tape stations at the intersection of the fourth row with channels 1-4 represent input information for actuating one of popup cylinders PC0, PC2, PC4, etc., to PC24, with the tape stations representing respective distances of 2, 4, 8, and 16 feet from the first popup cylinder PC0. As in the previous rows of the tape, the sum of the values of the distances represented by the punched stations equals the total distance represented by the intelligence input in the fourth row. Accordingly, any one of the 13 popup cylinders PC may be actuated to project a selected stop 68 a distance within a range of 0 to 24 feet at increments of 2 feet from the first popup stop 68 (cylinder PC0).

By selected punching of the tape stations located in the first four rows and channels of the tape, length control information can be provided the length positioner 19 and popup assembly 18 to project a selected stop 68 above table 14 a predetermined distance from reference point R within a range of 0 to 26 feet at increments of one-sixteenth inch and hence a predetermined distance from unipoint U. For example, to cut a length of lumber 9 feet, 7 13/16 inches long, length information input of 11 feet, 7 13/16 inches is required as the tape input information distance is measured from reference point R which is 2 feet to the left side of unipoint U for reasons as will presently become clear. The tape is accordingly prepunched to provide holes at the stations corresponding to the intersections of the first row and the first channel, the second row with the first and second channel, the third row with the first, third and fourth channels, and the fourth row with the first and third channels. Each row 1-3 thus provide for a displacement of movable table 14 of 16 inches, 3 inches, and thirteen-sixteenths inch, respectively, from reference R by actuation of cylinders LC256, LC16, LC32, and LC1 which correspond to the punched stations. The total fine displacement of table 14 from reference R equals 19 13/16 inches. The sum of the length information represented by the perforated stations in the fourth row actuates popup cylinder PC10 to project the associated stop 68 (located 10 feet from the end of movable table 14) above table 14, the stop 68 being thus located a total distance from reference point R equal to the sum of the length values represented by the punched tape stations in the first four rows of the frame or 11 feet, 7 13/16 inches. The projected stop 68 is accordingly located 9 feet, 7 13/16 inches from unipoint U.

The tape stations corresponding to the intersection of the fifth row with channels 1 and 2 represent information input for controlling the actuation of cylinders AC256 and AC512, respectively, of angle positioner assembly 28, selected actuation of which respectively provides for 64° or 128° of rotary movement of saw assembly 30 with respect to fence F. Either one or neither of these stations may be prepunched, it being understood that both stations would not be concurrently prepunched as this would result in rotary movement of saw assembly 30 through an angle of 192° which is unnecessary. Accordingly, either one or neither of the cylinders represented thereby may be actuated through the electrical circuit by selected punching of the tape at the station corresponding to the cylinder desired to be actuated.

The tape stations at the intersection of the sixth row with channels 1 through 4 represent information input for controlling the actuation of cylinders AC16, AC32, AC64, and AC128, respectively, of the angle positioner assembly 28, actuation of which respectively provides for 4°, 8°, 16°, and 32° of rotary movement of saw assembly 30 with respect to fence F. None, one, or any combination of perforations up to a total of 15 possible combinations may be prepunched at these four stations. Accordingly, none, one, or any combination of the cylinders thus represented thereby may be actuated through the electrical circuit by selected punching of the tape at the station(s) corresponding to the cylinder(s) desired to be actuated, thereby selectively angularly displacing saw assembly 30 from fence F within a range of 0° to 60° to 4° increments.

The tape stations corresponding to the intersections of the seventh row with channels 1 through 4 represent information input for controlling the actuation of cylinders AC1, AC2, AC4, and AC8, respectively, of the angle positioner assembly 28, actuation of which respectively provides for ¼°, ½°, 1° and 2° of rotary movement of saw assembly 30 with respect to fence F. None, one, or any combination of perforations up to a total of 15 possible combinations may be prepunched at these four stations. Accordingly, none, one, or any combination of the cylinders represented thereby may be actuated through the electrical circuit by selected punching of the tape at the station(s) corresponding to the cylinder(s) desired to be actuated, thereby selectively angularly displacing saw assembly 30 from fence F within a range of 0° to 3¾° at ¼° increments.

The sum of the total values assigned each of the fifth, sixth and seventh rows represents the total angle input information in degrees of rotation of the saw assembly from fence F. For example, to provide an angled cut of and accordingly rotation of saw assembly 30 from fence F of 149¼°, the stations at the intersection of row 5 and channel 2, row 6 and channels 1 and 3, and row 7 and channels 1 and 3 are prepunched providing an angular sum in rows 5-7 respectively equaling 128°, 20°, and 1¼°, providing a sum tape punched total of 149¼°. The prepunched stations thus actuate cylinders AC512, AC16, AC64, and AC1 which have a total piston displacement providing for 149¼° of rotation of the saw assembly 30.

The tape stations correspond to the intersections of the eighth tape row and channels 1, 3, 4, and 8 represent a machine stop function which, as hereinafter described, precludes further stepping of the tape and indicates to the operator that the clamping and saw operations may be performed. Prepunching all of the tape stations in a single row indicates an error and automatically steps the tape in the tape reader to locate the next tape row in tape-reading position.

The tape reader TR includes tape feed and sensing mechanisms comprising a barrel 550 mounted on a shaft 552 having a toothed wheel 554 for engaging feed holes 556 formed between the third and fourth channels of the tape for advancing the same about barrel 550. Forward and reverse solenoids TF and TB, respectively, are provided for stepping ratchet wheels 558 and 560 for rotating drum shaft 552 in respective opposite directions. Energization of either solenoid TF or TB pivots an associated arm 562 toward the respective solenoids against the bias of spring 564 to retract an associated pawl blade 566 along the teeth of the corresponding ratchet wheel to engage the tip thereof behind the next tooth. Deenergization of solenoids TF and TB releases arm 562 for pivotal movement under the bias of spring 564 to step the associated ratchet wheel, thereby rotating the drum in the forward or reverse directions as desired.

Eight lever arms 570(1)-570(8), corresponding in number to the number of channels, are pivotally mounted as at 572 and rotatably mount starwheels 574 on their outer ends. The teeth in the starwheels are spaced a distance one from the other corresponding to the longitudinal spacing between adjacent rows of the tape, whereby the teeth may engage through the holes on the tape. Lever arms 570 are biased as by springs 575 bearing against the underside of arms 570 at the opposite ends thereof to maintain the starwheels in contact with the tape as the latter is advanced about drum 550. The spring-biased ends of lever arms 570 have normally open contacts providing a series of normally open switches S1-S8 corresponding with the associated channels 1-8. Switches S1-S8 are closed in response to pivotal movement of lever arm 570 as starwheels 574 on the opposite ends of arms 570 engage through holes in the tape. The closing of the switches S1-S8 are correlated with the closing of switches RCT1-RCT8 as the tape is stepped row by row through the tape reader by repeat cycle timer RCT to energize various circuits in the electrical control circuit and provide control signals to the length, angle, and popup assemblies corresponding to the predetermined length, angle, and popup positions denoted by the perforated tape.

Electrical Control Circuit

Figure 28B:
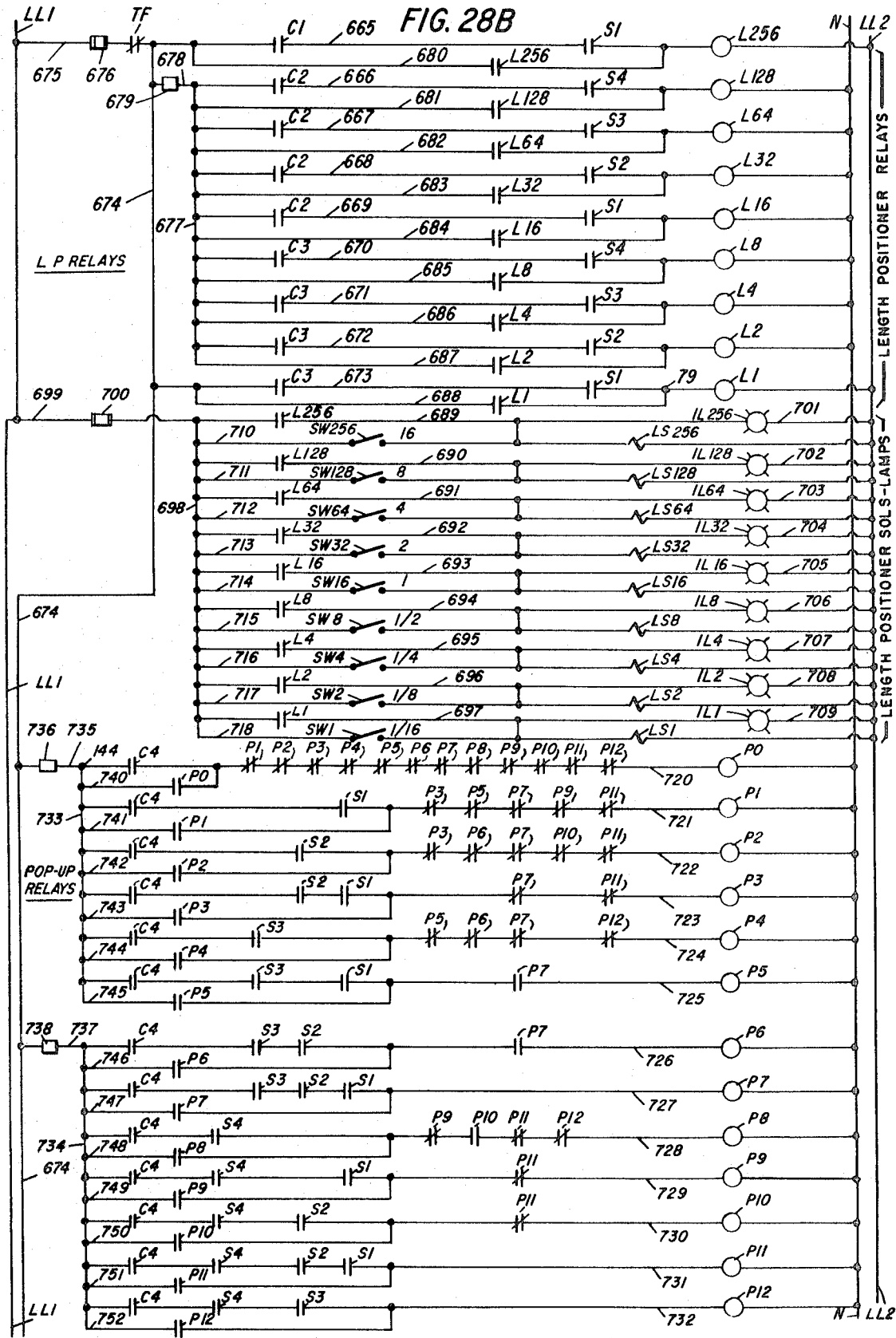
Figure 28D:
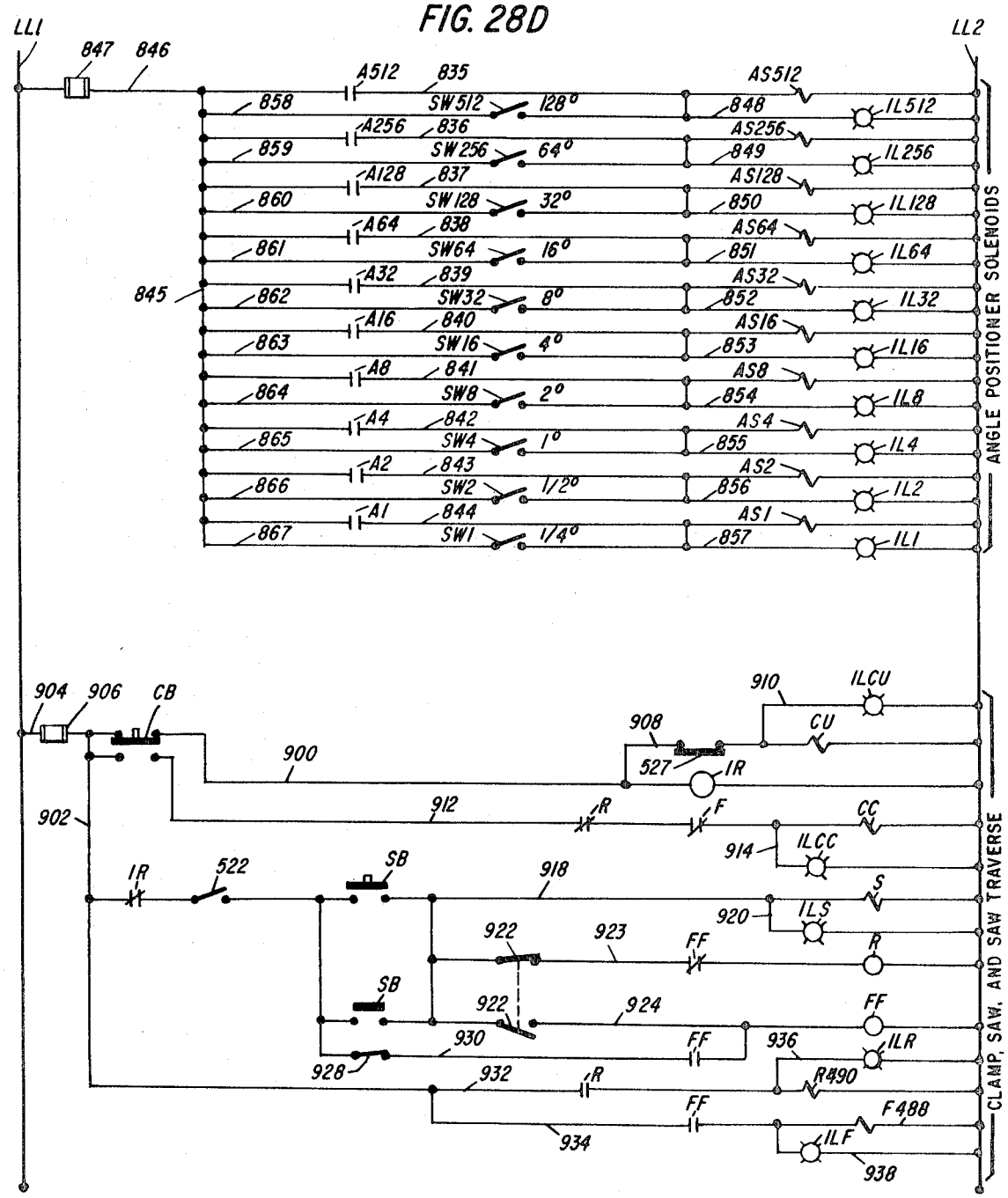

The electrical control circuit disclosed in FIGS. 28A-28D is arranged to actuate the various solenoids of the length, and angle positioner assemblies 17 and 28, respectively, in response to control signals received from tape reader TR and repeat cycle time RCT by the synchronized and successive closing of selected switches of switches S1-S8 and switches RCT1-RCT8, respectively, as the tape is stepped through tape reader TR under the control of timer RCT. This circuit is also arranged to actuate the various solenoids controlling the pullback and holddown assemblies 20 and 24, respectively, as well as solenoids controlling saw motor 340 and the traverse of saw assembly 30 across table 10. The control circuit is illustrated in a detached contract mode wherein the various relays, represented by circles, open and close associated contacts in a manner to be described, normally open and closed contacts being denoted by the vertical pairs of parallel lines and the slashed pairs of vertical parallel lines, respectively, with the contacts having letter suffixes corresponding to the letter suffixes of their actuating relays. The electrical circuit has been grouped according to the functions preformed by the various components thereof; FIG. 28A illustrating the tape reader and stepping relays, FIG. 28B illustrating the length positioner relays and solenoids actuated thereby, as well as the popup relays, FIG. 28C illustrating the solenoids actuated by the popup relays shown in FIG. 28B and the angle positioner relays, and FIG. 28D illustrating the angle positioner solenoids actuated by the relays shown in FIG. 28C, the frame member clamp and saw traverse circuits. The electrical control circuit will be described hereinafter specifically in conjunction with the cutting sequence of a chord W of truss T having double cuts at opposite ends as a specific example thereof. However, for the sake of clarity, a general description of the arrangement and function of the electrical control circuit will now be provided.

A 220-volt, 60-cycle, single-phase power supply SP1 is provided across a pair of lead lines LL1 and LL2. A neutral or center tap line N is also provided from the power supply. A 220-volt, 60-cycle, three-phase power supply SP2 is also provided for energizing electric motor EM which drives hydraulic pumps 400 and 401. Lead lines LL3, LL4 and LL5 connect between power supply SP2 and electric motor EM through normally open contacts M and a starting relay SR is connected across lead lines LL4 and LL5 through a normally open starting switch SSW. A pair of normally open contacts SR are located in lines LL1 and LL2 between power supply SP1 and the remaining circuitry. To provide power to hydraulic pumps 400 and 401, the length, angle, popup and clamp and saw circuits to be described, switch SSW is closed to energize relay SR, which closes normally open contact SR to provide power across lines LL1 and LL2. A start button 600, located on a control panel CP mounted to an H-beam 170 of superstructure 26 as seen in FIG. 1, is then momentarily depressed to complete a circuit to hydraulic motor starting coil MC via lead lines LL1 and 601, a normally closed stop pushbutton 602, and lead lines 604, 606 and LL2. Energization of coil MC closes normally open contacts M to complete a holding circuit through lead lines LL1, 601, 608, 606 and LL2 whereby start pushbutton 600 may be released and a holding circuit through lead lines LL3, LL4 and LL5 maintains motor EM continuously energized.

To energize the tape reader and stepping relay circuits and the repeat cycle timer motor M, start tape feed switches STF1 and STF2 are simultaneously closed, closing of switch STF1 energizing coil RCT via a circuit including a rectifier 609 which is connected across the secondary windings 610 of a transformer 611 and energized via lead lines LL1 and 612 through a suitable fuse 613 and line LL2, the circuit energizing coil RCT further including lead lines 614, 616, 618, 620 and 621, line 616 having a suitable fuse 615. Energization of relay RCT closes normally open contacts RCT in a repeat cycle timer motor circuit which includes lead line 622, series-connected normally open contact HR and motor M, normally closed switch 625, lead line 630 and the secondary winding 610 of transformer 611, a suitable fuse 623 being disposed between transformer 611 and contact RCT in lead line 622. To start RCT motor M, pushbutton RCT is momentarily depressed to close a circuit through lead lines LL1, 624, and LL2 to energize a relay HR which, in turn, closes normally open contact HR in the RCT motor circuit to energize motor starting coil D through a circuit including secondary windings 610, lead lines 622, closed contact RCT, closed switch 625, closed contact HR, and lead lines 626, 628 and 630. Energization of motor-starting coil D closes normally open contact D to complete a motor-holding circuit via secondary windings 610, lead lines 622, 632 and 630 to RCT motor M and coil D, thereby initiating rotation of index wheel 388. A normally open manually operated tape feed forward switch TF and associated solenoid TF are connected in series by lead line 633. A normally open tape feed reverse switch TB and associated solenoid TB are connected in series by lead line 634, lead lines 633 and 634 connecting in parallel across lead lines 618 and 621. A timer switch T connects across switch TF by a lead line 635 connecting between lead lines 618 and 633.

In general, and assuming the tape is threaded in feed position about barrel 550, as index wheel 388 rotates, pins 389(1)-389(8) on the outer face thereof successively close and open time switch T to successively energize and deenergize tape feed solenoid TF through a tape-stepping circuit including rectifier 609 and lead lines 614, 616, 618, 635, 633, and 621. Successive deenergization of solenoid TF causes the ratchet wheel, arm and pawl arrangement associated therewith to successively step drum 550 and advance the tape to locate succeeding rows of each tape frame in tape-reading position. The teeth of starwheels 574 bear against the eight tape stations as each row steps through the tape reading position and the lever arms 570 of those starwheels which engage in the perforations in each tape row pivot under the bias of their associated springs 575 to close corresponding switches of switches S1–S8 as seen in FIGS. 26 and 27. While each tape row periodically lies in the tape-reading position, index wheel 388 continues to rotate and pin 391 momentarily closes one of the switches RCT1–RCT8 which corresponds to the particular row located in the tape-reading position during that time, the RCT motor M and tape being synchronized such that successive switches RCT1–RCT8 are closed as succeeding rows 1–8 respectively of each tape frame lie in the tape-reading position. Thus a selected switch of switches RCT1–RCT8 corresponding to the particular tape row lying in the tape-reading position and selected switches of switches S1–S8 are simultaneously closed to complete circuits providing synchronized control signals to the various length, popup and angle relays and solenoids as will be described presently.

Switches S1, S3, S4, and S8 and relays S1, S3, S4, and S8 are respectively connected in series by respective lead lines 642–645 which connect in parallel across lead lines 646 and LL2. Switches S2, S5, S6, and S7 and relays S2, S5, S6, and S7 are respectively connected in series by respective lead lines 647–650 which connect in parallel across lead lines 646 and N. Lead line 651 connects lead line 646 to supply line LL1 through a suitable fuse and has a start switch STF2 which is closed simultaneously with switch STF1. The closing of one or more switches S1–S8 accordingly energizes one or more corresponding relays via respective circuits including lead lines LL1, 651, and 646, the one or more respective lead lines 642–645 and 647–650 containing the closed switch(es) and associated relay(s) and lead lines LL2 and N, as the case may be, hereinafter referred to as tape-reading circuits. Switches RCT1–RCT8 and relays C1–C8 are respectively connected in series by respective lead lines 652–659 which connect in parallel across lead lines 660 and 621, lead line 660 being connected to lead line 616 by a lead line 661 through a suitable fuse 662. The successive closing of switches RCT1–RCT8 successively energizes the corresponding relays C1–C8 via circuits including lead lines 614, 661, 660, 621, and 652–659, respectively. With the tape threaded about barrel 550 to initially locate row CR thereof in the tape-reading position and the foregoing circuit actuated by closing switches STF1, STF2, and RCT, thereby rotating index wheel 388, it will be seen that the tape will automatically step to successively locate tape rows 1–8 in the tape-reading position and close selected switches of switches S1–S8 with the perforations at the selected tape stations in each row being successively sensed by reader TR to successively energize corresponding relays of relays S1–S8. As each tape row steps beyond the tape-reading position, the previously closed switches of switches S1–S8 open to deenergize the previously energized relays of relays S1–S8. Switches RCT1–RCT8 are synchronized by timer RCT to successively and momentarily close, thereby successively and momentarily energizing corresponding relays RCT1–RCT8 as respective tape rows 1–8 successively lie in the tape-reading position. The concurrent energization of each successively energized relay C1–C8 and the selected S relays as each row 1–8 respectively lies in the tape-reading position actuates various relays and solenoids in the length, popup and angle relay and solenoid circuits which will now be described.

The length positioner relay and solenoid circuits are illustrated in FIG. 28B, the relays and solenoids thereof being actuated only in response to sensing length information provided on the first three tape rows as will become clear. The length positioner relays are connected in series with various C and S contacts as follows: Length positioner relay L256 and contacts C1 and S1 are connected in series by lead line 665; relay L128 and contacts C2 and S4 are connected in series by lead line 666; relay L64 and contacts C2 and S3 are connected in series by lead line 667; relay L32 and contacts C2 and S2 are connected in series by lead line 668; relay L16 and contacts C2 and S1 are connected in series by lead line 669; relay L8 and contacts C3 and S4 are connected in series by lead line 670; relay L4 and contacts C3 and S3 are connected in series by lead line 671; relay L2 and contacts C3 and S2 are connected in series by lead line 672; and relay L1 and contacts C3 and S1 are connected in series by lead line 673. Lead lines 665 and 673 connect in parallel across lead line 674 and LL2, Lead line 675 connecting lead line 674 to LL1 through a suitable fuse 676 and a normally closed contact TF. Lead lines 666–672 connect in parallel across lead line 677 and N, lead line 678 connecting lead line 677 to lead line 674 through a suitable fuse 679. Each relay L256, L128, etc., to L1 has a holding circuit connecting across the associated C and S contacts comprising lead lines 680–688, respectively. Lead lines 680–688 have normally open contacts L256, L128, etc., to L1, respectively, disposed therein which are closed in response to energization of the associated relays L256, L128, etc., to L1.

The length positioner solenoids LS256, LS128, etc., to LS1 are respectively connected in series with normally open contacts L256, L128, etc., to L1 by respective lead lines 689–697. Lead lines 689–697 are connected in parallel across lead lines 698 and LL2, lead line 699 connecting lead line 698 to lead line LL1 through a suitable fuse 700. Indicator lamps IL256, IL128, etc., to IL1 connect in parallel across associated solenoids LS256, LS128, etc., to LS1 by respective lead lines 701–709 which connect respective lead lines 689–697 and LL2, the lamps IL accordingly being lit upon actuation of the associated solenoid. Normally open manually operated switches SW256, SW128, etc., to SW1 connect in parallel across normally open contacts L256, L128, etc., to L1, respectively, by lead lines 710–718 which connect respective lead lines 689–697 to lead line 698.

Assuming that the first tape row has been stepped to lie in tape-reading position in reader TR, the starwheels register above the tape stations of the first row and the lever arms overlying the perforated stations pivot under the bias of springs 574 to close the corresponding switch or switches S1–S8. As noted hereinbefore, only channel 1 in the first tape row provides meaningful length position input information and accordingly switch S1 will either remain open in the absence of a perforation in channel 1 or will close in response to the sensing of a perforation. If channel 1 is perforated, switch S1 closes and relay S1 is energized via a tape-reading circuit including lead lines LL1, 651, 646, 642, and LL2. While the first tape row is disposed in the tape-reading position, tape-reading wheel 388 rotates such that pin 391 on the rear face thereof momentarily closes switch RCT1 to energize the corresponding relay C1 via a circuit including rectifier 609, lead lines 614, 661, 660, 652, closed switch RCT1, and lead line 621. Accordingly, the S1 and C1 relays are concurrently energized and close corresponding normally open contacts C1 and S1, respectively, in the length positioner relay circuit to energize relay L256 via a circuit including lead lines LL1, 675, 665, and LL2. Energization of relay L256 closes normally open contact L256 to complete the holding circuit via lead lines LL1, 675, 680, and LL2 to maintain relay L256 energized as subsequent rows of tape step through tape reader TR. Energization of relay L256 also closes normally open contact L256 in the length positioner solenoid circuit to energize solenoid LS256 and the associated indicator lamp IL256 via a circuit including lead lines LL1, 699, 689, and LL2 and a circuit including lead lines LL1, 699, 689, 701 and LL2, respectively. Energization of solenoid LS256 shifts valve LV256 to provide pressure fluid to extend the piston of cylinder LC256, thus providing a 16-inch displacement of movable table 14 as described hereinbefore.

As index wheel 388 rotates further, second pin 389(2) thereof momentarily closes timer switch T to again energize and deenergize tape feed solenoid TF through the tape-stepping circuit hereinbefore described to step the tape and locate the second row thereof in the tape-reading position. The starwheels 574 register above the tape stations in the second row and the lever arms 570 overlying the perforated stations thereof pivot under the bias of their associated springs 574 to close the corresponding switch(es), i.e., S1–S8. As noted hereinbefore with respect to the second tape row, any one of 15 combinations of perforations in channels 1–4 or none may be prepunched and, accordingly, none, one or more, or all of switches S1–S4 may be closed depending on the need to actuate none, one or more or all of cylinders LC16, LC32, LC64 and LC128 of length positioner 19. Therefore, none, any one or all of relays S1–S4 may be energized in response to sensing perforations in the second tape row through the tape-reading circuits including lead lines LL1, 651, 646, and/or the associated lead lines 642, 647, 643 and 644, as the case may be, and which contain switches S1–S4 and associated relays, and the corresponding lead lines LL2 and N.

During the interval that the second tape row is maintained in tape-reading position, index wheel 388 continues to rotate and pin 391 closes switch RCT2 to energize relay C2 via a circuit including rectifier 609 and lead lines 614, 661, 660, 653, and 621. Thus, relay C2 and the energized relays S1, S2, S3 and/or S4 are concurrently energized and close normally open contacts C2 and the contacts S1, S2, S3, and/or S4 (FIG. 28C) associated with the energized relays S1, S2, S3 and/or S4. Closing such contacts energizes one or more of relays L128, L64, L32 and L16 via a circuit comprising lead lines LL1, 674, 677, the lead lines 666–669 associated with the closed contacts C2 and S1, S2, S3, and/or S4, and lead line N. Energization of relays L128, L64, L32 and/or L16 closes associated normally open contacts L128, L64, L32 and/or L16 to complete a holding circuit(s) via lead lines 681–684, as the case may be, and N to maintain the associated relay(s) energized as relay C2 and the selected relays S1, S2, S3, and/or S4 are deenergized and corresponding contacts C2 and selected contacts S1, S2, S3 and/or S4 return to their normally open positions upon further stepping of the tape.

Energization of any one or more of relays L128, L64, L32, and L16 closes associated normally open contact(s) L128, L64, L32 and L16 to energize an associated length positioner solenoid(s) through a circuit(s) including lead lines LL1, 699, 698, 690–693 as the case may be, and LL2. The lamps IL128, IL64, IL32 and/or IL16 associated with the energized solenoids are lit via circuits including lead lines LL1, 698, respective lead lines 690–693 and 702 and 705 as the case may be, and LL2. Energization of solenoids LS128, LS64, LS32 and/or LS16 shifts the corresponding valve(s) LV to provide pressure fluid to the associated length positioner cylinders LC128, LC64, LC32 and/or LC16 to extend the piston(s) thereof. The sum of the piston displacement(s) of the cylinder(s) LC128, LC64, LC32 and/or LC16 thus actuated equals the sum of the distances represented by the perforated stations of the first 4 channels of the second tape row of the tape.

Continued rotation of index wheel 388 causes the third pin 389(3) to momentarily close timer switch T and actuate tape feed solenoid TF as before to step the tape and locate the third row thereof in the tape-reading position. Starwheels 374 sense the perforations in stations 1–4 in the third row and close the corresponding switches S1–S4 to energize the associated relays S1–S4 as before through the appropriate tape-reading circuit(s) described hereinbefore. As noted previously with respect to the third row, any one of 15 combinations of perforations in channels 1–4 or none may be prepunched and, accordingly, any one of 15 combinations of relays S1–S4 may be energized depending on the need to actuate one or more or all of cylinders LC8, LC4, LC2 and LC1 or none. Further rotation of index wheel 388 causes pin 391 to close switch RCT3 to energize relay C3 via a circuit including rectifier 609 and the lead lines 614, 661, 660, 654 and 621. Thus, the C3 relay and the energized relays S1, S2, S3 and/or S4 are concurrently energized and close normally open contact C3 and the contacts S1, S2, S3 and/or S4 (FIG. 28C) associated with the energized relays S1, S2, S3 and/or S4. Closing such contacts energizes one or more relays L8, L4, L2 and L1 via a circuit comprising lead lines LL1, 674, 677, the lead lines 670–673 associated with the closed contacts C3 and S1, S2, S3 and/or S4, the lead line LL2 or N, as the case may be. Energization of relays L8, L4, L2 and/or L1 closes associated normally open contacts L8, L4, L2 and/or L1 to complete a holding circuit(s) via lead lines 662, 685–688 as the case may be, and lead line LL2 or N as appropriate to maintain the associated relay(s) energized as relay C3 and the selected relays S1, S2, S3 and/or S4 are deenergized and corresponding contacts C3 and selected contacts S1, S2, S3 and/or S4 return to their normally open position upon further stepping of the tape.

Energization of any one or more of relays L8, L4, L2 and L1 closes associated normally open contact(s) L8, L4, L2 and/or L1 to energize an associated length positioner solenoid(s) through a circuit(s) including lead lines LL1, 698, respective lead lines 694–697 as the case may be, and LL2. The lamps IL8, IL4, IL2 and/or IL1 associated with the energized solenoids are lit via a circuit comprising lead lines LL1, 698, respective lead lines 694–697 and 706–709 as the case may be, and LL2. Energization of solenoids LS8, LS4, LS2 and/or LS1 shifts the corresponding valve(s) LV to provide pressure fluid to the associated length positioner cylinders LC8, LC4, LC2 and/or LC1 to extend the piston thereof. The sum of the piston displacement(s) of such cylinder(s) equals the sum of the distances represented by the perforations through the first four channels of the third row of the tape. It is thus seen that the cylinders LC256, LC128, etc. to LC1 of length positioner 19 are selectively actuated to provide an overall piston displacement equal to the sum of the distances represented by the prepunched tape stations in the first three rows of the tape frame.

Continued rotation of index wheel 388 causes the fourth pin 389(4) to momentarily close switch T and actuate tape feed solenoid TF through the tape-stepping circuit described previously to step the tape and locate the fourth row in the tape-reading position. Starwheels 374 sense the perforations in stations 1–4 in the fourth row and close corresponding switches S1–S4 to energize the associated relays S1–S4 as before. Further rotation of index wheel 399 causes pin 391 to close switch RCT4 and energize relay C4 via a circuit including rectifier 609 and lead lines 614, 661, 660, 655 and 621. Accordingly, relay C4 and the energized relays S1, S2, S3 and/or S4 are concurrently energized and energized certain relays of the popup stop assembly relay circuit which will now be described.

The popup stop relays and various contacts C, P, and S are connected in series as follows: Relay P0, normally open contact C4, and normally closed contacts P1–P12 are connected in series by lead line 720; relay P1, normally open contacts C4 and S1, and normally closed contacts P3, P5, P7, P9, and P11 are connected in series by lead line 721; relay P2, normally open contacts C4 and S2, and normally closed contacts P3, P6, P7, P10, and P11 are connected in series by lead line 722; relay P3, normally open contacts C4, S2, and S1, and normally closed contacts P7 and P11 are connected in series by lead line 723; relay P4, normally open contacts C4 and S3, and normally closed contacts P5, P6, P7 and P12 are connected in series by lead line 724; relay P5, normally open contacts C4, S3 and S1, and normally closed contact P7 are connected in series by lead line 725; relay P6, normally open contacts C4, S3, and S2, and normally closed contact P7 are connected in series by lead line 726; relay P7 and normally open contacts C4, S3, S2, and S1 are connected in series by lead line 727; relay P8, normally open contacts C4, and S4, and normally closed contacts P9, P10, P11 and P12 are connected in series by lead line 728; relay P9, normally open contacts C4, S4 and S1, and normally closed contact P11 are connected in series by lead line 729; relay P10, normally open contacts C4, S4, and S2 and normally closed contact P11 are connected in series by lead line 730; relay P11 and normally open contacts C4, S4, S2, and S1 are connected in series by lead line 731; and relay P12 and normally open contacts C4, S4, and S3 are connected in series by lead line 732. Lead lines 720–725 connect in parallel across lead lines 733 and N while lead lines 726–732 connect in parallel across lead lines 734 and N. Lead line 735 connects lead line 733 to lead line 674 through a suitable fuse 736 and lead line 737 connects lead line 734 to lead line 674 through a suitable fuse 738. Each relay P0–P12 has a holding circuit connecting across the associated C and S contacts comprising lead lines 740–752 respectively. Lead lines 740–752 have respective normally open contacts P0–P12 disposed therein which are closed in response to energization of the associated relay.

The circuit for the popup stop solenoids and associated lamps will now be described with reference to FIG. 28C. The popup stop solenoids PS0, PS2, PS4, etc., to PS24, are connected in series with normally open contacts P0–P12 respectively by respective lead lines 760–772. Lead lines 760–763 are connected in parallel across lead lines 773 and LL2, lead line 774 connecting lead line 773 to lead line LL1 through a suitable fuse 775 and a normally open contact IR. Lead line 768 connects across lead lines LL2 and 774 between fuse 775 and contact IR. Lead lines 764–767 and 769–772 are connected in parallel across lead lines 776 and LL2, lead line 777 connecting lead line 776 to lead line LL1 through a suitable fuse 778. Indicator lamps IL0, IL2, IL4, etc., to IL24 are connected across associated solenoids by respective lead lines 780–792 which connect respective lead lines 760–772 and LL2 and are accordingly lit upon actuation of the associated solenoids. Normally open, manually operated switches SW0 SW2, SW4, etc., to SW24 are connected across normally open contacts P0–P12 respectively by respective lead lines 795–807. Lead lines 795–807 connect lead lines 760–772, respectively, with their associated supply lines 773, 774, or 776, as the case may be.

Referring to the popup stop relay circuit (FIG. 28C), it is seen that selected energization of relays S1, S2, S3, and/or S4 and relay C4 as the fourth row of the tape lies in the tape-reading position completes circuits to the appropriate relays P0–P12, energization of relays S1, S2, S3 and/or S4 and relay C4 respectively closing the associated normally open contacts C and S in lead lines 720–732. It will be seen that various combinations of closed switches S1–S4 are required to energize certain of the relays P0–P12. For example, in order to energize relay P7, switches S1, S2, and S3 must be closed to energize corresponding relays S1, S2, and S3 as before to close normally open contacts S1, S2, and S3 in lead line 727 in addition to closing normally open contact C4 through the closing of switch RCT4 and resulting energization of relay C4 as previously described. It will also be noted that while certain of the relays P0–P12 may be instantaneously energized, other relays which are energized may open associated normally closed contacts P in the various relay energizing circuits. For example, with switches S1– S3 closed, Relays S1–S3 are energized to close contacts S1-S3, thereby energizing relay P7. Closing of switches S1 and S2 also energizes relay S1 and S2 which close contacts S1 and S2 in lead 723 which would normally energize relay P3. However, the energization of relay P7 opens the normally closed contact P7 in lead line 723 to maintain relay P3 deenergized.

With the foregoing circuit configuration and the predetermined placement of the contacts C, S, and P in the energizing circuits for the various relays, concurrent energization of relays C4 and S1, S2, S3 and/or S4 closes normally open contact C4 of the corresponding contacts S1, S2, S3 and/or S4 to energize the one relay of relays P0–P12 which actuates the popup solenoid PS corresponding in distance from reference point R to the sum of the values represented by the punched stations in the fourth row of tape. Such relay will be maintained energized as the tape steps through reader TR by the closing of its associated normally open P contact in the corresponding holding circuit 740–752. Energization of the one relay of relays PO–P12 closes the associated normally open contact in the popup solenoid circuit which, as seen in FIG. 28C, energizes the associated solenoid of solenoids PSO, PS2, PS4, etc., to PS24, via a circuit from the corresponding supply line 773, 774, or 776, as the case may be, an associated lead line of lines 760–772, and lead line LL2. The indicator lamp ILO, IL2, IL4, etc., to IL24 across the energized solenoid is also lit via a circuit including the corresponding lead line of lead lines 780–792. Energization of the selected solenoid shifts the associated popup valve PV to provide pressure fluid to the associated cylinder PC to extend the piston thereof and project the stop 68 secured thereto above table 14 as hereinbefore described. The projected stop is thus located a distance from the first or PO stop equal to the sum of the distances represented by the punched stations 1–4 in the fourth row, the total distance of the projected stop from reference point R being equal to the sum of the distances represented by the punched stations in rows 1–4.

Continued rotation of index wheel 388 causes the fifth pin 389(5) to close timer switch T and actuate tape feed solenoid TF through the tape feed circuit to step the tape to locate the fifth row thereof in the tape-reading position. The fifth, sixth, and seventh rows of the tape, which provide the angle input information, actuate the various relays and solenoids of the angle positioner relay and solenoid circuits which will now be described.

The angle positioner relays A512, A256, etc., to A1, seen in FIG. 28C, are connected in series with various contacts C and S as follows: Relay A512 and normally open contacts C5 and S2 are connected in series by lead line 810; relay A256 and normally open contacts C5 and S1 are connected in series by lead line 811; relay A128 and normally open contacts C6 and S4 are connected in series by lead line 812; relay A64 and normally open contacts C6 and S3 are connected in series by lead line 813; relay A32 and normally open contacts C6 and S2 are connected in series by lead line 814; relay A16 and normally open contacts C6 and S1 are connected in series by lead line 815; relay A8 and normally open contacts C7 and S4 are connected in series by lead line 816; relay A4 and normally open contacts C7 and S3 are connected in series by lead line 817; relay A2 and normally open contacts C7 and S2 are connected in series by lead line 818; and relay A1 and normally open contacts C7 and S1 are connected in series by lead line 819. Lead lines 810–819 connect in parallel across lead lines 820 and N, lead line 821 connecting lead line 820 to lead line 659 through a suitable fuse 822. Each relay A512, A256, etc., to A1 has a holding circuit connecting across the associated C and S contacts comprising lead lines 824–832, respectively. Lead lines 824–832 have respective normally open contacts A512, A256, etc. to A1 disposed therein which are closed in response to energization of the associated relay.

The angle positioner solenoid circuit is illustrated in FIG. 28D and solenoids AS512, AS256, AS128, etc., to AS1 are connected in series with respective normally open contacts A512, A256, A128, etc. to A1 by respective lead lines 835–844. Lead lines 835–844 are connected in parallel across lead lines 845 and LL2, lead line 846 connecting lead line 845 to supply line LL1 through a suitable fuse 847. Indicator lamps IL512, IL256, IL128, etc., to IL1 are connected across associated solenoids AS512, AS256, AS128, etc. to AS1 by respective lead lines 848–857 which connect respective lead lines 835–844 and LL2 and are accordingly lit upon energization of the associated solenoids. Normally open switches SW512, SW256, SW128, etc., to SW1 are connected across respective normally open contacts A512, A256, A128, etc., to A1 by respective lead lines 858–867 which connect corresponding lead lines 835–844 to lead line 845.

With the fifth row of the tape lying in the tape-reading position, switches S1 or S2 may be closed in response to the sensing of perforations in channels 1 or 2 of the tape to energize one of relays S1 and S2 via the appropriate tape-reading circuit. Further rotation of index wheel 388 causes pin 391 to close switch RCT5 to energize relay C5 through a circuit including rectifier 609 and lead lines 614, 661, 660, 656, and 621. Relay C5 and either relay S1 or S2 are concurrently energized and close their associated contacts C5 and S1 or S2 to thereby energize either relay A512 or A256 via circuits including lead lines LL1, 821, 820, 810 or 811, as the case may be, and N. Energization of either relay A512 or A256 closes the associated normally open contacts A512 or A256 in the holding circuit 824 or 825 to maintain such relay energized as the tape steps through reader TR. Energization of either relay A512 or A256 also closes the associated contact A512 or A256 in the angle positioner solenoid circuit to energize the corresponding solenoid AS512 or AS256 via circuits including lead lines LL1, 846, 845, 835 or 836, as the case may be, and LL2. The lamp IL512 or IL256 associated with the energized solenoid is also lit via a circuit completed through lead line 835 or 836, and the corresponding lead line 848 or 849, as the case may be, and LL2. Selected energization of either solenoid AS512 or AS256 shifts the associated valve AV512 or AV256 to provide pressure fluid to the associated angle positioner cylinder AC512 or AC256 to extend the piston thereof, thereby providing for rotary movement of saw assembly 30 through an angle equal to the angle values represented by either station 1 or 2 in the fifth tape row.

Continued rotation of index wheel 388 causes the sixth pin 389(6) to close timer switch T and energize tape feed solenoid TF to step the tape and locate the sixth row thereof in the tape-reading position. Starwheels 374 sense the perforations in stations 1–4 in the sixth row and close the corresponding switches S1–S4 to relays S1, S2, S3, and/or S4 as before. As noted previously with regard to the sixth tape row, any one of 15 combinations of perforations in channels 1–4 or none may be prepunched and accordingly any one of 15 combinations of relays S1–S4 may be energized depending on the need to actuate one or more or all of cylinders AC128, AC64, AC32 and AC16 or none. Further rotation of index wheel 388 causes pin 391 to close switch RCT6 and energize relay C6 via a circuit including rectifier 609 and lead lines 614, 661, 660, 657, and 621. Thus, relay C6 and the energized relays S1, S2, S3 and/or S4 are concurrently energized and respectively close normally open contacts C6 and the associated normally open contacts S1, S2, S3 and/or S4 in the angle positioner relay circuit, thereby energizing one or more relays A128, A64, A32 and/or A16 via circuits comprising lead lines LL1, 821, 820, one or more of lead lines 812–815 as the case may be, the lead line N. Energization of one or more of these relays closes the corresponding normally open contacts A128, A64, A32, and/or A16 in the associated holding circuits 826–829, as the case may be, to maintain such relays energized when relay C6 and the energized relays S1, S2, S3 and/or S4 are deenergized upon continued rotation of index wheel 388. Energization of one or more of relays A128, A64, A32 and A16 also closes the associated contacts in the angle positioner solenoid circuit to energize the associated solenoids AS128, AS64, AS32 and/or AS16 via circuits comprising lead lines LL1, 846, 845, one or more of lead lines 837–840 as the case may be, and lead line LL2. The lamps IL connected across the energized solenoid(s) are also lit via circuit(s) comprising lead lines 845, one or more of lead lines 837–840 and 850–853 as the case may be, and lead line LL2. Energization of one or more of the solenoids AS128, AS64, AS32 and AS16 shifts the corresponding valve(s) AV128, AV64, AV32 and AV16 to provide pressure fluid to the associated cylinder(s) AC128, AC64, AC32 and AC16 to extend the piston(s) thereof, thereby providing for rotary movement of saw assembly 30 through an angle equal to the sum of the angular values represented by the perforated stations in the sixth tape row.

Continued rotation of index wheel 388 causes the seventh pin 389(7) to close timer switch T and energize tape feed solenoid TF to step the tape and locate the seventh row thereof in the tape-reading position. Selected switches S1, S2, S3 and/or S4 close in response to the sensing of perforations at the tape stations coincident with the first four channels of the seventh row of the tape to energize corresponding relays S1, S2, S3 and/or S4. As noted previously with respect to the seventh tape row, any one of 15 combinations of perforations in channels 1–4 or none may be prepunched and accordingly any one of 15 combinations of relays S1–S4 may be energized depending on the need to actuate one or more or all of cylinders AC8, AC4, AC2 and AC1 or none. Further rotation of index wheel 388 causes pin 391 to close switch RCT7 and energize relay C7 via a circuit including rectifier 609 and lead lines 614, 661, 660, 658 and 621. Thus, relay C7 and the energized relays S1, S2, S3 and/or S4 are concurrently energized and respectively close normally open contacts C7 and the associated normally open contacts S1, S2, S3, and/or S4 in the angle positioner relay circuit, thereby energizing one or more relays A8, A4, A2, and A1 via circuits comprising lead lines LL1, 821, 820, one or more of lead lines 816–819 as the case may be, and lead line N. Energization of such relays closes the corresponding normally open contacts A8, A4, A2, and A1 in their associated holding circuits 830–833 as the case may be, to maintain such relays energized when relay C7 and the energized relays S1, S2, S3 and/or S4 are deenergized upon further rotation of index wheel 388. Energization of one or more relays A8, A4, A2, and A1 also closes the associated normally open contacts in the angle positioner solenoid circuit to energize the associated solenoids AS8, AS4, AS2, and AS1 via circuits comprising lead lines LL1, 846, 845, one or more of lead lines 841–844 as the case may be, and lead line LL2. The lamps IL connected across the energized solenoids are also lit via circuits comprising lead line 845, one or more of lead lines 841–844 and 854–857, respectively, as the case may be, and lead line LL2. Energization of one or more of solenoids AS8, AS4, AS2 and AS1 shifts the corresponding valve(s) AV8, AV4, AV2 and AV1 to provide pressure fluid to the associated cylinder(s) AC8, AC4, AC2, and AC1 to extend the piston(s) thereof, thereby providing for rotary movement of saw assembly 30 through an angle equal to the sum of the angular values represented by the perforated stations in the seventh tape row. Accordingly, the total displacement of the angle positioner piston(s) provides for rotary movement of saw assembly 30 through an angle equal to the sum of the values assigned to the perforated tape stations in the fifth, sixth and seventh rows thereof.

Continued rotation of index wheel 388 causes the eighth pin 389(8) to close timer switch T and energize tape feed solenoid TF to step the tape and position the eighth row thereof in the tape-reading position. The perforations in the eight row of each frame are located in channels 1, 3, 4, and 8 and accordingly switches S1, S3, S4, and S8 are closed and energize corresponding relays S1, S3, S4, and S8 through the circuits previously described. Further rotation of index wheel 388 causes pin 391 to close switch RCT8 and energize relay C8 via a circuit including rectifier 609 and lead lines 614, 661, 660, 659 and 621. An indicating lamp IL870 is connected across relay C8 via a lead line 872 connecting between lead line 659 and lead line 621, energization of which indicates to the operator that repeat cycle timer RCT has completed a full cycle. Energization of relays S1, S3, S4, and S8 energizes relay CR via a circuit including lead lines LL1, 874, and LL2 (FIG. 28A). An amber indicating light IL876 is connected across relay CR by a lead line 878 and is accordingly lit as relay CR is energized to indicate to the operator that the last row CR of a tape frame lies in tape-reading position. Energization of relay CR closes a normally open contact CR after a short time delay on the order of about 12 seconds and lights a green indicating lamp IL880 via lead line 882 connecting between lead lines 874 and LL2 across the S contacts and relay CR. Continued rotation of index wheel 388 causes peripherally mounted pin 393 to open normally closed switch 394 to interrupt the RCT circuit and deenergize RCT motor M and stop rotation of wheel 388. This occurs within the 12-second time delay provided by delayed closing of contact CR and lamp IL880 indicates to the operator that the machine is ready for clamping and sawing.

Figure 23:
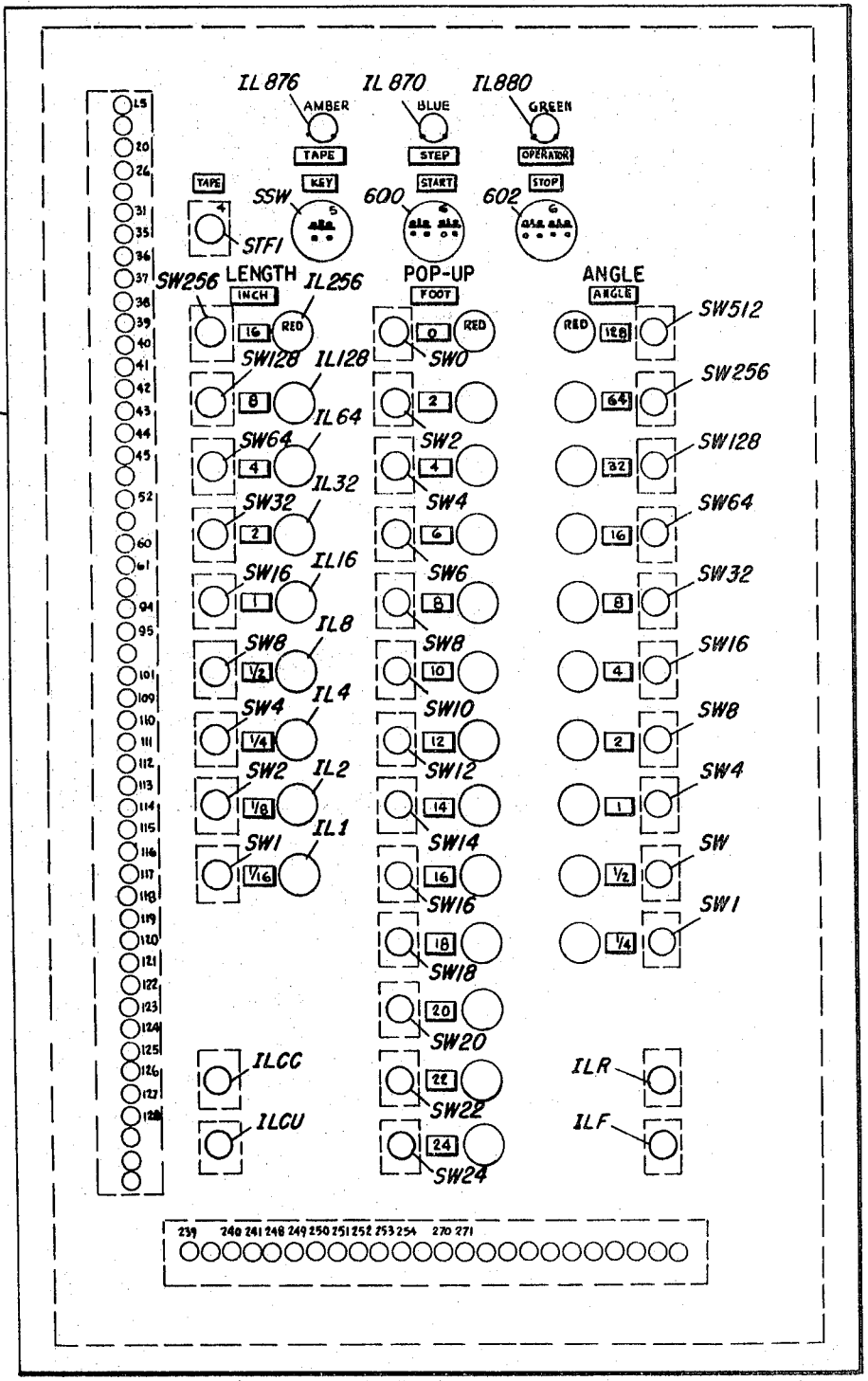
FIG. 23 is an enlarged front elevational view of a control panel.

As will be seen in FIG. 23, control panel CP mounts the normally open manually operated switches SW and the indicating lamps IL corresponding to the length, popup and angle positioner solenoid circuits and the notation providing the actual length and angle positions corresponding to the various cylinders to be energized may be displayed as indicated. The start, tape feed, and stop switches SSW and 600, STF1–STF2, and 602, respectively, are also located on control panel CP, as well as indicating lamps IL870, IL876 and IL880, and lamps ILCC, ILCU, ILR and ILT to be described. It is thus apparent that all of the functions performed automatically by the tape in actuating the various length, angle and popup cylinders can be performed manually if desired by closing selected switches of switches SW.

The clamping circuit will now be described. As seen in FIG. 28D, a clamping button CB and interlock relay IR are connected in series by a lead line 900 connecting lead line 902 and LL2, lead line 904 connecting lead line 902 to lead line LL1 through a suitable fuse 906. Normally closed pressure actuated switch 527 and solenoid CU are connected in series by lead line 908 connecting between lead lines 900 and LL2 across interlock relay IR. An indicating lamp ILCU connects across solenoid CU via lead line 910 and is accordingly lit when solenoid CU is energized. Normally closed contacts R and F, a solenoid CC, and the open contacts of pushbutton CB are connected in series by lead line 912 which connects between lead lines 902 and LL2. An indicating lamp ILCC connects across solenoid CC by a lead line 914.

The saw and saw traverse circuits will now be described. Normally closed contact IR, normally open pressure switch 522, the normally open contacts of a pushbutton SB, and a solenoid S are connected in series by a lead line 918 connecting lead lines 902 and LL2. An indicating lamp ILS is connected across solenoid S by a lead line 918. The normally closed contact of a limit switch 922, normally closed contact F and a relay R are connected in series by a lead line 923 which connects across solenoid S to lead lines 918 and LL2. The normally open contacts of limit switch 922 and a relay F are connected in series by a lead line 924 connecting across solenoid S to lead lines 918 and LL2. A normally closed limit switch 928 and normally open contact F are connected in series by a lead line 920 connecting across limit switch 922 and button SB to lead lines 918 and 924. A normally open contact R and a solenoid R are connected in series by a lead line 932. A normally open contact F and a solenoid F are connected in series by a lead line 934. Lead lines 932 and 934 are connected in parallel across lead lines 902 and LL2. Indicator lamps ILR and ILF are connected across the respective solenoids R and F by respective lead lines 936 and 938.

It will be noted that when the machine is at rest, button CB maintains interlock relay IR energized through a circuit including lead lines 902, 900 and LL2, and maintains solenoid CU energized through a circuit via lead lines 902, 900, 908 and LL2. The continued energization of solenoid CU maintains valve 466 shifted to the left as seen in FIG. 24A to provide pressure fluid to the unclamping sides of the pullback and holddown cylinders to maintain the same in reacted position. Also, the continued energization of relay IR maintains normally open contact IR in lead line 774 in FIG. 28C as closed, whereby solenoids PSO, PS2, PS4 and PS6 may be selectively energized as noted hereinbefore. Further, by maintaining relay IR energized, normally closed contact IR in lead line 920 is maintained open, thereby preventing energization of the saw and saw traverse circuits through lead line 918 until the operator depresses clamping button CB. After indicator lamp IL880 is lit, which indicates that the length and angle information has been fed to the machine, the operator depresses button CB to clamp wooden member W to table 14 and thereby energizes solenoid CC via a circuit including lead lines 902, 912 and LL2. By depressing button CB, relay IR is deenergized, thereby returning contact IR in the saw and saw traverse circuits to its normally closed position and thereby permitting energization of the saw and saw traverse circuits through switch 522 as hereinafter described and returning contact IR in lead line 744 to its normally open position to deenergize the circuit to solenoids PS0, PS2, PS4 and PS6. Energization of solenoid CC shifts valve 466 to the right as seen in FIG. 24A to provide pressure fluid to the clamping sides of the pullback and holddown cylinders whereby board W is drawn against fence F and clamped between the jaws of the holddown assembly. When the pressure in supply line 500 is the pullback and holddown cylinders increases to a predetermined pressure, pressure-actuated switch 522 closes.

To energize the saw and saw traverse circuits, the operator depresses button SB thereby energizing solenoid S via a circuit including lead lines 902, 918, closed contact IR, closed pressure switch 522, and lead line LL2, the indicating lamps ILS being lit via lead line 920. It will be noted that buttons CB and SB must be simultaneously depressed to energize solenoid S as release of button CB would energize relay IR to open normally closed contact IR in the saw circuit, interrupting or preventing energization of solenoid S. Energization of solenoid S shifts valve 462 to the right as seen in FIG. 24A to provide pressure fluid to saw motor 340 and thereby rotate blade 32. As seen in FIG. 16, limit switch 922 (normally closed across lead lines 918 and 923) is mounted on flat 290 by a bracket 943 and carries a switch-actuating arm 944 which depends in the path of travel of a bracket 946 projecting laterally from member 300. When saw assembly 30 is fully retracted to the rear side of table 10, bracket 946 engages arm 944 to open the circuit across lead lines 903 and 918 and closes the circuit across lead lines 918 and 924. Thus, if saw assembly 30 is at rest in an intermediate position between the front and rear edges of table 10, depression of button SB (concurrently with button CB) energizes relay R via a circuit including lead lines 902, 918, 923 and LL2 and closed contact F. Energization of relay R opens normally closed contact R in lead line 912 to deenergize solenoid CC, thereby permitting valve 466 to shift to the center position under the bias of spring 499. This maintains the fluid pressure to the pullback and holddown cylinders, retaining the same in their clamping position and permits the supply pressure to act solely in ram cylinder 306 and to drive motor 340. Energization of relay R also closes normally open contact R in lead line 932 to energize solenoid R via a circuit including lead lines 902, 932, and LL2. Energization of solenoid R shifts valve 464 to the right as seen in FIG. 24A to provide pressure fluid to the rod side of cylinder 306, thereby retracting ram assembly 35 to its rearmost position. With both switches CB and SB depressed, bracket 946 engages switch arm 944 to momentarily reverse the contacts in switch 922 to simultaneously deenergize relay R and energize relay F, the latter via a circuit including lead lines 902, 918, 924 and LL2. Energization of relay F closes normally open contact F to complete a holding circuit via lead lines 902, 918, 930 and LL2, whereby relay F is maintained energized. Energization of relay F also closes normally open contact F in lead line 934 to energize solenoid F488 via a circuit including leas lines 902, 934, and LL2, the corresponding lamp ILF being lit through a lead line 938. Energization of relay F opens normally open contacts F in lead lines 912 and 923 to respectively maintain solenoid CC and relay R deenergized. Energization of solenoid F488 shifts valve 464 to the right as seen in FIG. 24A to provide pressure fluid to the piston side of cylinder 306 to drive respective ram and saw assemblies 35 and 30 forwardly across table 10.

As seen in FIGS. 1, 3 and 17, a semioval-shaped hoop 950 depends from brackets 952 which are connected to superstructure assembly 26 and extends rearwardly between plate 298 and bracket 302. Normally closed limit switch 928 is mounted on and adjacent the rear end of plate 298 for adjusting movement longitudinally relative to plate 298 by means not shown. Switch 928 has a switch-actuating arm 958 engageable against hoop 950 to open the same. As saw assembly 30 completes a forward traverse across table 10, switch 928 opens, thereby deenergizing relay F by interrupting the holding circuit through lead line 930 and returning closed contact F to its normal position. Deenergization of relay F opens contact F in lead line 932 to deenergize solenoid F488. Deenergization of relay F also returns open contact F in lead line 923 to its normally closed position to again energize relay R via a circuit including lead lines 902, 918, 923, and LL2. Energization of relay R closes normally open contact R in lead line 932 to energize solenoid R490 and its associated lamp ILR via a circuit including lead lines 902, 932, and LL2, and thereby shifts valve 464 to the left as seen in FIG. 24A to retract piston rod 312 and saw assembly 30. Accordingly, as long as the operator maintains buttons CB and SB depressed, saw assembly 30 will reciprocate back and forth across saw table 10 through alternate actuation of limit switches 922 and 928. To stop the saw and saw traverse after a cut has been made, either one or both of buttons CB and SB are released, the release of button CB energizing relay IR and opening normally closed contact IR in lead line 918 to interrupt the circuit to forward and reverse relays F and R, respectively, while release of button SB interrupts the same circuit. Release of button CB energized solenoid CU through the circuit described previously to shift valve 466 to the left as seen in FIG. 24A, thereby providing pressure fluid to retract the pullback and holddown clamps.

It is a feature of this invention that the saw traverse across table 10 from the rear edge thereof may be limited to a predetermined distance and this for any angular displacement of saw assembly 30 from fence F. Hoop 950 is configured such that limit switch 928 engages thereagainst to stop forward motion of saw assembly 30 when the latter has traveled a predetermined distance across table 10, such distance being measured normal to fence F. For example, when cutting a 6-inch wide board, the extent of saw traverse may be limited to 6-inches in a direction normal to fence F, by spacing switch 928 6 inches to the rear of hoop 950 when saw assembly 30 is fully retracted. Thus, for making a 90° cut, the saw assembly 30 travels 6 inches in a forward direction whereupon switch 928 engages hoop to reverse the direction of transverse of saw assembly 30. When making an angled cut, the saw assembly 30 travels a further distance from unipoint U, along the desired angle. By configuring the hoop 950 to form an oval, a greater travel of saw assembly 30 along the angled cut is permitted before switch 928 engages hoop 950, although the normal distance from the fence to the saw assembly for the angled cut remains the same 6 inches.

Example Cutting Operation

In general, for each cut, the operator causes a full tape frame (rows 1–8) to step through the tape reader TR. The length and angle information thereon is sensed and the appropriate length and angle position cylinders are actuated in response thereto to project the selected stop 68, advance table 14 to locate the projected stop 68 a predetermined distance from reference R and position saw assembly 30 to make the predetermined angle of cut. The operator then places a board W on table 10 and butts the end to be cut against the projected stop. The operator then initiates the clamping and sawing action whereby the board W is clamped to table 14 against fence F and the saw traverses table 10 making the cut. The tape is prepunched to provide length and angle information to the machine for the cuts at first one end of the board and then for the cuts at the other end thereof. Accordingly, if double cuts at each end are to be made, the operator then causes the second frame to step through reader TR whereby a selected stop is projected and advanced from reference R by movement of table 14 relative to table 10 and the saw assembly is rotated to provide the second angled cut. The operator then butts the previously cut end of the board against the projected stop, and initiates the clamping and sawing action whereby the second cut at the same end of board W is made. Note that the board is not flipped over about its lengthwise axis or otherwise repositioned other than to butt the end against the second projected stop in order that the second angled cut can be made. Other additional cuts can be made at the same or first cut end of the board if necessary by following the above procedure.

After the cut or cuts have been made at one end of the board, the operator causes the tape frame or frames providing the length and angle information for the cuts at the opposite end of the board to step through tape reader TR (the tape being usually prepunched such that the frame(s) for the cut(s) made at the opposite end immediately succeed the tape frame(s) for the cuts at the first board end). The selected stop is projected, table 14 is moved and saw assembly 30 is angularly positioned in response to the tape information. The operator then slides the board W longitudinally along table 14 to butt the previously or first cut end of the board against the projected stop and initiates the clamping and sawing action as before, whereby a first cut is made at the opposite end of the board. It is noted that in order to make the opposite end cut, the operator need only slide the board lengthwise along table 14 and need not flip the board over about its transverse axis or otherwise manipulate the board. If a double cut is being made at the opposite end, the procedure is repeated, that is, the operator causes the next tape frame (prepunched to contain the length and angle position information for the second cut at the opposite end) to advance through reader TR, butts the first cut end of the board against the projected stop and initiates the clamping and sawing action. It will be understood that the following detailed description is made with reference to providing double cuts at opposite ends of a piece of lumber and that single, double, or additional cuts can be made at each end with the angle or number of cuts at either end being in no way dependent on the angle or number of cuts at the opposite end.

Referring now to FIG. 29, the web W of truss T has a pair of angled cuts or surfaces at each end thereof designated by the numbers 1-4 enclosed within circles. Angled surfaces 1 and 4 butt adjacent webs y and z at opposite ends of web W, while surfaces 2 and 3 butt top and bottom chords TC and BC at opposite ends of web W. The cutting operation providing such double cuts 1-4 will now be described. The four tape frames on which are prepunched the information providing the length of these particular cuts from reference point R and the angle of the cuts relative to fence F are illustrated in FIG. 31 and noted beside each frame. The angles of the several cuts are measured from fence F counterclockwise about unipoint U to the plane of the saw if extended through unipoint U as seen in FIGS. 32A-E. The angled cuts are numbered 1-4 in the order of cutting and the tape frames providing the length and angle information for each cut are correspondingly designated.

To start the cutting operation, the operator first closes start switch SSW on control panel CP to energize relay SR and close normally open contacts SR to provide power across supply lines LL1 and LL2 as hereinbefore described. The operator then momentarily depresses start button 600 to energize motor coil MC to close normally open contacts M and maintain motor EM energized through holding circuits including lead lines LL3-LL5 as previously described. Energization of motor EM actuates pumps 400 and 401 causing pressure fluid to flow from reservoir 402 through lead lines 404 and 406 through the hydraulic conduits associated with length and angle positioner assemblies 17 and 28, respectively, the pullback and holddown clamp assemblies 20 and 24, respectively, and the saw motor and traverse assemblies 34 and 35, respectively, and return to reservoir 402.

The operator places the tape on tape reader TR and manually pulls the tape therethrough to locate the row CR thereof preceding the first tape frame in the tape-reading position. It will be noted that a check tape frame having length and angle information prepunched thereon providing for a cut at 0 feet and 90° respectively may precede the first tape frame. This check frame may be first stepped through the tape reader to insure that saw assembly 30 is functioning properly and calibrated to make the desired 90° or square cut. The operator may check the cut through a waste piece. Detailed operation of the machine in making the check cut is not provided as such operation will be apparent from the following and is performed only periodically. With the CR row of the check frame preceding the first frame in tape-reading position, the tape is now ready to step through tape reader TR. The operator closes tape feed switch STF1 and STF2 to energize relay RCT via a circuit including rectifier 609 and lead lines 614, 616, 620 and 621. Energization of relay RCT closes normally open contact RCT in the timer motor circuit. To commence rotation of index wheel 388 of timer RCT, the operator momentarily depresses pushbutton RCT and thereby energizes relay HR which closes normally open contact HR in the timer motor circuit, thereby energizing starting coil D which, in turn, closes normally open contacts D in the timer motor holding circuit via circuits previously described, whereby timer motor M is continuously energized to rotate index wheel 388. As index wheel 388 rotates, pin 389(1) closes timer switch T and energizes tape feed solenoid TF via a tape feed circuit comprising rectifier 609 and lead lines 614, 616, 635, 633 and 621. Continued rotation of index wheel 388 opens timer switch T and deenergizes tape feed solenoid TF, thereby stepping the tape one row to locate the first row of the first tape frame thereof in the tape-reading position.

First Cut

As seen in FIG. 31, the first frame represents information for locating a popup stop 68 a distance of 1 foot and 8⅞ inches from reference point R and for pivoting saw assembly 30 to provide an angle of traverse of blade 32 across table 10 equal to the cut angle of 30¾°. The tape frame has been prepunched to represent such information by selective perforation of the tape stations in channels 1-4 of the first seven rows as hereinbefore described and, accordingly, the first row has been punched at the station controlling the actuation of length positioner cylinder LC256, to provide a 16-inch piston displacement. With the first tape row in tape-reading position, the perforation in channel 1 is sensed, thereby closing switch S1 to energize relay S1 via a circuit including lead lines LL1, 651, 646, 642, and LL2. Continued rotation of index wheel 388 causes pin 391 to close switch RCT1 and energize relay C1 via circuitry described hereinbefore.

Turning now to FIG. 28B, it will be seen that concurrent energization of relays C1 and S1 close normally open contacts C1 and S1 in the length positioner relay circuit to energize relay L256 via a circuit including lead lines LL1, 657, 665, and LL2. Energization of relay L256 closes normally open contact L256 in the holding circuit therefor to maintain the same energized after relays C1 and S1 are deenergized by continued rotation of index wheel 388. Energization of relay L256 also closes normally open contacts L256 to energize solenoid LS256 and its associated lamp IL256 via a circuit including lead lines LL1, 699, 689, and LL2 and a circuit including lead lines LL1, 699, 689, 701 and LL2, respectively. Energization of solenoid LS256 shifts valve LV256 to the right as seen in FIG. 24F to provide pressure fluid from supply line 426 through conduits 432 and 436 to cylinder LC256 to completely extend the piston thereof a distance of 16 inches.

Continued rotation of index wheel 388 causes pin 389(2) to momentarily close timer switch T and momentarily energize tape feed solenoid TF whereupon the tape is stepped to locate the second row of the first frame in the tape-reading position. As seen in FIG. 31, only channel 3 of the first four channels thereof is perforated and the channel 1 starwheel 574 senses the perforation closing switch S3. Relay S3 is thus energized via lead lines LL1, 651, 646, 643, and LL2, the remaining switches S1, S2, and S4 remaining open precluding energization of their associated relays. Further rotation of index wheel 388 causes pin 391 to close switch RCT2 thereby energizing relay C2 via a circuit including rectifier 609 and lead lines 614, 661, 660, 653 and 621.

Turning now to FIG. 28B, concurrent energization of relays C2 and S3 closes contacts C2 and S3 in the length positioner relay circuit thereby energizing relay L64 via lead lines LL1, 657, 678, 677, 667, and LL2. Energization of relay L64 closes normally open contact L64 in the holding circuit therefor to maintain the same energized as relays C2 and S3 are deenergized upon continued rotation of index wheel 388. Referring now to the length positioner solenoid circuit, energization of relay L64 also closes contact L64 to energize solenoid LS64 and its associated lamp IL64 via a circuit including lead lines LL1, 699, 698, 691, and LL2 and a circuit including lead lines 698, 691 and 703, respectively. Energization of solenoid LS64 shifts valve LV64 to the right to provide pressurized fluid from supply line 426 through conduits 432 and 436 to cylinder LC64 to completely extend the piston thereof a distance of 4 inches, thereby displacing succeeding cylinders LC128 and LC256 axially to the right as seen in FIGS. 5A-B along casing 80 a like 4 inches.

Continued rotation of index wheel 388 causes pin 389(3) to momentarily close switch T and momentarily energize tape feed solenoid TF whereupon the tape is stepped to locate the third row in the tape-reading position. As seen in FIG. 30, the third row of the first frame has perforations in channels 2, 3, and 4. Starwheels 574 overlying these channels sense such perforations and close associated switches S2, S3 and S4 whereby relay S2 is energized via a circuit including lead lines LL1, 646, 647 and N and relays S3 and S4 are energized via circuits including lead lines LL1, 646, 643 or 644 as the case may be, and LL2. Further rotation of index wheel 388 causes pin 391 to close normally open switch RCT3 thereby energizing relay C3 via a circuit including rectifier 609 and lead lines 614, 661, 660, 654 and 621.

Turning now to FIG. 28B, it is seen that concurrent energization of relay C3 and relays S2, S3 and S4 closes associated contacts in the length positioner relay circuit to energize length positioner relays L2, L4 and L8 via circuits including lead lines 672, 671 and 670, respectively, which connect between lead lines 677 and N. Energization of relays L2, L4 and L8 closes respective normally open contacts L2, L4 and L8 in the associated holding circuits therefor to maintain the same energized after relays C3 and S2, S3, and S4 are deenergized upon continued rotation of index wheel 388. Energization of relays L2, L4, and L8 also closes the associated normally open contacts L2, L4 and L8 in the length positioner solenoid circuit thereby energizing the associated solenoids LS2, LS4, and LS8, respectively, via circuits including lead lines 696, 695 and 694, respectively, which connect between lead lines 698 and LL2. The lamps IL2, IL4, and IL8 on panel CP associated with solenoids LS2, LS4, and LS8, respectively, are also lit via circuits including respective lead lines 700, 707, and 706. Energization of solenoids LS2, LS4 and LS8 shifts the associated valves LV2, LV4, and LV8 to the right as seen in FIG. 24E to provide pressure fluid from supply line 426 through conduits 432 and 436 to the associated cylinders LC2, LC4 and LC8 to completely extend the pistons thereof distanced of one-eighth, one-fourth and one-half inches, respectively, thereby displacing succeeding cylinders LC16, e.g., to LC256 axially to the right along casing 81 as seen in FIGS. 5A-B a total distance of seven-eighths inch. It is thus apparent that the length information prepunched on the first three rows of tape of the first frame and representing a length of 1 foot and 8⅞ inches has been translated into actuation of the ⅛-, ¼-, ½-, 4-, and 16-inch cylinders of the length positioner assembly which provides for a total axial displacement of the free end piston rod LR256 equal to 1 foot, 8⅞ inches. Accordingly, table 14 is displaced along table 12 from its fully retracted position illustrated in FIG. 32A a total distance of 1 foot, 8⅞ inches as seen in FIG. 32B.

Further rotation of index wheel 388 causes pin 389(4) to momentarily close switch T and momentarily energize tape feed solenoid TF, whereupon the tape is stepped to locate the fourth row thereof in tape-reading position. As seen in FIG. 31, the first four information channels of the fourth row are not perforated and this information is sensed by associated starwheels 574 which maintain switches S1-S4 in the open position and the associated relays thereof deenergized. Further rotation of index wheel 388 causes pin 391 to close switch RCT4 and energize relay C4 via a circuit including rectifier 609 and lead lines 661, 660, 655 and 621.

As hereinbefore noted, the fourth row of each frame represents information controlling popup stop 68 and, referring to the popup relay circuit shown in FIG. 28B, energization of relay C4 closes normally open contact C4 and energizes only popup relay PO via a circuit including lead lines LL1, 675, 674, 735, 720 and N. It will be noted that each lead line 721-732 has at least one normally open contact of contacts S1-S4 whereby relays P1-P12 remain unenergized. Energization of relay PO closes normally open contact PO in the popup solenoid circuit to energize solenoid PSO and its associated light IL0 via a circuit including lead lines LL1, 774, 773, 760 and LL2 and a circuit including lead line 780 respectively. It will be noted that relay IR (FIG. 28D) is maintained energized via a circuit including lead lines LL1, 900 and LL2, whereby contact IR is closed in lead line 774. Energization of solenoid PSO shifts valve PVO to the left as seen in FIG. 24C to provide pressure fluid from supply line 430 through conduits 450 and 454 to popup cylinder PCO to extend the piston thereof, thereby projecting associated stop 68 above the upper face of movable table 14. It is thus seen that the projected stop 68 is located 1 foot, 8⅞ inches to the right of reference point R and 3⅛ inches to the left of unipoint U as seen in FIG. 32B.

Continued rotation of index wheel 388 causes pin 389(5) to momentarily close switch T and momentarily energize tape feed solenoid TF whereupon the tape is stepped to locate the fifth row thereof in tape-reading position. As seen in FIG. 31, there are no perforations in the first two channels of the fifth row and accordingly switches S1 and S2 remain open and relays S1 and S2 unenergized. Further rotation of index wheel 388 causes pin 391 to close switch RCT5 and energize relay C5 through a circuit including rectifier 609 and lead lines 614, 661, 660, 656 and 621. Referring to FIG. 28C, energization of relay C5 closes normally open contact C5 in lead lines 810 and 811, but relays A512 and A256 remain unenergized as contacts S1 and S2 remain open. Accordingly, contacts A512 and A256 in the angle positioner solenoid circuit remain open preventing extension of the pistons associated with cylinders AC512 and AC256. Further rotation of index wheel 388 causes pin 389(6) to close switch T and momentarily energize tape feed solenoid TF, whereby the tape is stepped to locate the sixth row thereof in tape-reading position. As seen in FIG. 30, channels 1, 2, and 3 are perforated and the perforations being sensed by starwheels 574 thereby close switches S1, S2, and S3 and energize relays S1, S2, and S3 via circuits including lead lines 642, 647 and 643, respectively.

Continued rotation of index wheel 388 causes pin 391 to close switch RCT6 and energize relay C6 via a circuit including rectifier 609 and lead lines 614, 661, 660, 657 and 621. Concurrent energization of relays C6, S1, S2, and S3 closes associated contacts C6, S1, S2, and S3, respectively, in the angle positioner relay circuit (FIG. 28C) to energize relays A16, A32, and A64 via circuits including lead lines 815, 814 and 813, respectively, which connect between lead lines 820 and N. Energization of relays A16, A32, and A64 closes associated contacts A16, A32, and A64 in their respective holding circuits to maintain the same energized upon deenergization of relays C6 and S1-S3 as index wheel 388 continues to rotate. Energization of relays A16, A32 and A64 also closes the associated contacts in the angle positioner solenoid circuit and energizes solenoids AS16, AS32, and AS64, respectively, via circuits including lead lines 840, 839, and 838, respectively, connecting between lead lines 845 and LL2. The lamps IL16, IL32 and IL64 associated with the energized solenoids are lit via circuits through lead lines 855, 854, and 853, respectively. Energization of solenoids AS16, AS32 and AS64 shifts the associated valves AV16, AV32, and AV64 to the left as seen in FIG. 24E to provide pressure fluid from supply line 428 through conduits 442 and 446 to cylinders AC16, AC32, and AC64 to extend the pistons thereof, thereby axially displacing succeeding cylinders AC128, AC256, and AC512 to the right as seen in FIG. 19, providing an angular displacement of saw assembly 30 equal to the sum of the angular displacements of the actuated cylinders AC or 28°.

Continued rotation of wheel 388 causes pin 389(7) to momentarily close switch T and momentarily energize tape feed solenoid TF to step the tape to locate the sixth row thereof in the tape reading position. As seen in FIG. 30, channels 1, 2, and 4 of the sixth row are perforated, the perforations being sensed by starwheels 574 thereby closing switches S1, S2, and S4 and energizing relays S1, S2, and S4 via circuits including leas lines 642, 647, and 644, respectively.

Further rotation of index wheel 388 causes pin 391 to close switch RCT7 and energize relay C7 via a circuit including rectifier 609 and lead lines 614, 661, 660, 658 and 621. Concurrent energization of relays C7, S1, S2, and S4 closes corresponding contacts C7, S1, S2, and S4, respectively, in the angle positioner relay circuit to energize relay A1, A2, and A8 via circuits including lead lines 819, 818, and 816, respectively, which connect between lead lines 820 and N (FIG. 28C). Energization of relays A1, A2, and A8 closes associated contacts A1, A2, and A8 in respective holding circuits to maintain the same energized upon deenergization of relays C7, S1, S2, and S4 as index wheel 388 continues to rotate. Energization of relays A1, A2, and A8 also closes the associated contacts in the angle positioner solenoid circuit and energizes solenoids AS1, AS2, and AS8 respectively, connecting lead lines 845 and LL2. The lamps IL1, IL2, and IL8 associated with solenoids AS1, AS2, and AS8 are lit via circuits through lead lines 857, 856, and 854, respectively. Energization of solenoids AS1, AS2, and AS8 shifts the associated valves AV1, AV2, and AV8 to the left as seen in FIG. 24F to provide pressure fluid from supply line 428 through conduits 442 and 446 to provide cylinders AC1, AC2, and AC8 to extend the pistons thereof, thereby axially displacing succeeding cylinders AC1, AC2, and AC8 to the right as seen in FIG. 19 providing an angular displacement of saw assembly 30 equal to the sum of the angular displacements of the actuated cylinders AC or 2¾°. In this manner, it is seen that the fifth, sixth and seventh rows of the first tape frame which are perforated to represent 30¾° operate to extend the pistons of angle positioner cylinders AC1, AC2, AC8, AC16, AC32 and AC64 providing for a total angular displacement of saw assembly 30 of 30¾° relative to fence F (FIG. 32B) through rack and gear 222 and 212 respectively. The fabricating machine has accordingly sensed the length and angle information provided on the first tape frame and responded thereto by projecting the stop 68 associated with cylinder PC0, advancing table 14 from its fully retracted position a distance of 1 foot, 8⅞ inches, thereby locating the projected stop 68 1 foot, 8¾ inches from reference point R and angularly displacing saw assembly 30 an angular distance of 30¾° from fence F (FIG. 32B).

Continued rotation of index wheel 388 causes pin 389(8) to momentarily close switch T and momentarily energize tape feed solenoid TF, thereby stepping the tape to locate the eighth or CR row in the tape reading position. As noted hereinbefore, the perforations on the eighth row are disposed in channels 1, 3, 4, and 8, and represent a machine stop function. Accordingly the corresponding switches S1, S3, S4, and S8 are closed energizing associated relays S1, S3, S4, and S8. Relays S1, S3, S4, and S8 close normally open contacts S1, S3, S4, and S8 and energize a relay CR via a circuit including lead lines LL1, 874 and LL2. Amber lamp IL876 connected across relay CR is lit via a lead line 878 to indicate that the eighth row of the tape lies in the tape reading position. Energization of relay CR closes normally open contact CR after a short time delay, on the order of about 12 seconds, thereby lighting a green lamp IL880 via a circuit including lead lines LL1, 874, 882 and LL2. Lamp IL880 indicates to the operator that he may proceed with the clamp and saw operations, the time delay providing adequate time for the fluid circuit and cylinders to respond to the electrical control signals. Continued rotation of index wheel 388 causes pin 391 to close switch RCT8 and energize relay C8 via a circuit including rectifier 609 and lead lines 614, 661, 660, 669 and 621. A light IL870 is connected across relay C8 and indicates that the tape frame has stepped through rows 1–8 thereof. Further rotation of index wheel 388 causes pin 393 to open a normally closed switch 394 to interrupt the motor circuit and deenergize timer motor M. Index wheel 388 stops, the eighth row of the tape lies in the tape-reading position, and lamp IL880 is lit, indicating that all is in readiness for the clamp and saw operations.

At this point, the operator places the board which will form a web W of truss T against fence F and butts the right-hand end thereof against the projected stop 68, the board being located entirely to the left side of unipoint U as seen in FIG. 32B. The operator then clamps the board against fence F and onto table 14 by depressing button CB, thereby energizing solenoid CC through a circuit previously described (FIG. 28D). Valve 466 is thus shifted to the right (FIG. 24A) and provides pressure fluid directly to the pullback and holddown cylinders 110 and 154, respectively, located to the left of unipoint U and sequentially to the pullback and holddown cylinders 110 and 154, respectively, to the right of unipoint U as previously described, whereby members 140 engage the outer edge of board W to clamp the same against fence F and jaws 148 and 163 move toward one another to clamp board W against table 14. Depressing button CB also deenergizes relay IR whereby contact IR (FIG. 28C) is opened and solenoid PSO is energized whereupon projected stop 68 of cylinder PC0 retracts. This prevents blade 32 from cutting through the projected stop 68 as blade 32 enters the end face of the wood while traversing table 14. It will be noted that only the stops 68 associated with cylinders PC0, PC2, PC4, and PC6 are energized through contact IR and accordingly a projected stop of these stops will retract as the board is clamped to preclude cutting thereof as blade 32 traverses table 14. Once the board is clamped, pressure switch 522 closes in response to a predetermined pressure buildup in clamping fluid supply line 500.

To saw, the operator maintains button CB depressed and simultaneously depresses button SB to energize solenoid S via a circuit previously described to shift valve 462 to the right (FIG. 24A), thereby providing pressure fluid to saw motor 340. Relay R (FIG. 28D) is also energized closing contact R and energizing solenoid R490 to shift valve 464 to the left (FIG. 24A) thereby retracting saw assembly 30 to its rearmost position. Switch 922 thereupon momentarily reverses and energizes relay FF which is maintained energized through its holding circuit. Closing contact FF energizes solenoid F488 (FIG. 28D) thereby shifting valve 464 to the right to advance saw assembly 30 across table 14 at the predetermined angle. The cut through board W is thus made as indicated by the dashed line in FIG. 32A with the saw initially entering the board medially of its width through the end face thereof. At the end of the predetermined distance of saw traverse, as determined by the configuration of hoop 950, switch 928 engages thereagainst and opens, thereby deenergizing relay FF and solenoid FF and energizing relay R and solenoid R. Saw assembly 30 is thus retracted as previously described and when fully retracted the operator releases buttons CB and SB and thereby deenergizes the saw circuit. It will be noted that both buttons CB and SB must be simultaneously depressed in order that saw blade 32 may be rotated and saw assembly 30 moved across table 14. This provides a safety feature since, as noted in FIG. 1, the CB and SB buttons are located on opposite sides of the control boxes disposed on the front side of table 10, requiring the operator to employ both hands to maintain such switches simultaneously depressed, whereby the danger of the operator placing his hands and arms in the saw path is eliminated, the control boxes being spaced a considerable distance to either side of saw blade 32. Release of button CB energizes solenoid CU through a circuit previously described and shifts valve 466 to the left (FIG. 24A) to provide pressure fluid to the unclamping sides of the pullback and holddown cylinders 110 and 154, respectively, thereby releasing board W.

It is significant to note that if board W were located at or to the right of unipoint U, a significant quantity of wood would be cut from the end thereof in making the first cut. By locating the first popup assembly preferably 2 feet to the left side of unipoint U with succeeding popup assemblies spaced therefrom at and on the other side of unipoint U, it is possible to make a double cut at one end without cutting an endpiece from the board which would go to waste.

Second Cut

To make the second cut on the same end of the wooden member as the first cut, the operator momentarily depresses timer motor start switch RCT to energize relay HR via a circuit including lead lines LL1, 624 and LL2. Energization of relay HR closes normally open contact HR in the motor circuit to energize motor starter coil D via a circuit including the secondary windings 610 of transformer 611, lead lines 622, 628 and 630. Energization of coil D closes normally open contact D in the motor holding circuit whereby motor M again rotates index wheel 388. Energization of relay HR also momentarily energizes a relay TF via a circuit including rectifier 609 and lead lines 614, 636 and 621, whereby contact TF (FIG. 28B) is momentarily opened. Since contact TF connects between supply line LL1 and the length, angle and popup relays, the solenoids which were previously energized in response to the information on the first tape frame are deenergized, whereby the cylinders LC, AC and PC associated therewith return to their fully retracted positions.

The second frame of the tape is now ready for advancement through the tape reader to actuate respective cylinders of the length, angle and popup assemblies in accordance with the information prepunched thereon. As index wheel 388 rotates, pin 389(1) momentarily closes switch T to momentarily energize solenoid TF, thereby stepping the next or first row of the second frame into tape-reading position. The second frame is prepunched to represent a length of 2 feet, 1 15/16 inches and 139½°, as seen in FIG. 31. Accordingly, the first four channels of the first row of the second frame are not punched and this information is sensed by tape reader TR whereby switches S1–S4 remain open. Further rotation of index wheel 388 causes pin 391 to close switch RCT1 and energize relay C1. As seen in FIG. 28B, contact C1 is closed thereby but since contact S1 remains open, relay L256 remains unenergized. Accordingly, cylinder LC256 remains fully retracted.

Continued rotation of index wheel 388 causes pin 389(2) to close switch T to momentarily energize solenoid TF, thereby stepping the second row of the second tape frame into tape-reading position. As seen in FIG. 31, channel 1 thereof is perforated and this information is sensed by reader TR to close switch S1, thereby energizing relay S1. Further rotation of index wheel 388 causes pin 391 to close switch RCT2 and energize relay C2. Concurrent energization of relays C2 and S1 closes associated contacts in the length positioner relay circuit to energize relay L16 via a circuit (FIG. 28B) including lead lines LL1, 677, 669, and N. Energization of relay L16 closes contact L16 in the holding circuit therefor and closes normally open contact L16 in the length positioner solenoid circuit to energize solenoid LS16 and light associated lamp IL16. Energization of solenoid LS16 shifts valve LV16 to the right as seen in FIG. 24E to provide pressure fluid from supply line 426 through conduits 432 and 436 to fully extend the piston of cylinder LC16 providing a 1-inch displacement of succeeding cylinders LC32, etc., to LC256 axially along casing 80.

Continued rotation of index wheel 388 causes pin 389(3) to momentarily close switch T to momentarily energize solenoid TF, thereby stepping the third tape row of the second frame into tape-reading position. As seen in FIG. 31, channels 1–4 thereof are perforated and this information is sensed by reader TR to close switches S1–S4, thereby energizing relays S1–S4, respectively. Further rotation of index wheel 388 causes pin 391 to close switch RCT3 and energize relay C3. Concurrent energization of relays C3 and S1–S4 closes associated contacts in the length positioner relay circuit to energize relays L1, L2, L4 and L8. Energization of the latter relays closes the normally open contacts L1, L2, L4 and L8 in the associated holding circuits therefor and corresponding normally open contacts L1, L2, L4 and L8 in the length positioner solenoid circuit to energize solenoids LS1, LS2, LS4, and LS8, respectively, and the lamps IL1, IL2, IL4, and IL8 associated therewith. Energization of solenoids LS1, LS2, LS4, and LS8 shifts the associated valves LV1, LV2, LV4 and LV8 to the right as seen in FIG. 24E to provide pressure fluid from supply line 426 through conduits 432 and 436 to fully extend the pistons of cylinders LC1, LC2, LC4, and LC8 providing a displacement of succeeding cylinders LC16, etc., to LC256 axially along casing 80 of fifteen-sixteenths inch.

Continued rotation of index wheel 388 causes pin 389(4) to momentarily close switch T to momentarily energize solenoid TF, thereby stepping the fourth tape row of the second frame to the tape-reading position. As seen in FIG. 31, channel 1 thereof is perforated and this information is sensed by reader TR to close switch S1, thereby energizing relay S1. Further rotation of index wheel 388 causes pin 391 to close switch RCT4 and energizes relay C4. Concurrent energization of relays C4 and S1 closes contacts in the popup relay circuit (FIG. 28B) to energize relay P1 through a circuit including lead lines LL1, 675, 674, 733, normally closed contacts P3, P5, P7, P9, and P11 and lead line N. Energization of relay P1 closes normally open contact P1 in the holding circuit therefor and normally open contact P1 in the popup solenoid circuit (FIG. 28C) to energize solenoid PS2 and lamp IL2 associated therewith. Energization of solenoid PS2 shifts valve PV2 to the left as seen in FIG. 24C to provide pressure fluid from supply line 430 through conduits 450 and 454 to extend the piston of cylinder PC2, thereby projecting the stop 68 associated therewith above table 14. It will be noted that cylinders LC1, LC2, LC4, LC8 and LC16 of length positioner 17 have been extended advancing table 14 a total distance of 1 15/16 inches from the fully retracted position. Therefore, the projected stop 68 of cylinder PC2 is located 2 feet, 1 15/16 inches from reference R in accordance with the information provided on the tape.

Continued rotation of index wheel 388 causes pin 389(5) to momentarily close switch T to momentarily energize solenoid TF, thereby stepping the fifth tape row of the second frame to the tape-reading position. As seen in FIG. 31, channel 2 thereof is perforated and this information is sensed by reader TR to close switch S2 thereof energizing relay S2. Further rotation of index wheel 388 causes pin 391 to close switch RCT5 and energize relay C5. Concurrent energization of relays C5 and S2 closes associated contacts in the angle positioner relay circuit (FIG. 28C) to energize relay A512. Energization of relay A512 closes normally open contact A512 in holding circuit therefor and normally open contact A512 in the angle positioner solenoid circuit (FIG. 28D) to energize solenoid AS512 and associated lamp IL512. Energization of solenoid AS512 shifts associated valve AV512 to the left as seen in FIG. 24E to provide pressure fluid from supply line 498 through conduits 442 and 446 to fully extend the piston associated with cylinder AC512 providing an angular displacement of saw assembly 30 of 128°.

Continued rotation of index wheel 388 causes pin 389(6) to momentarily close switch T to momentarily energize solenoid TF thereby stepping the sixth tape row of the second frame to the tape-reading position. As seen in FIG. 31, channel 2 thereof is perforated and this information is sensed by reader TR to close switch S2, thereby energizing relay S2. Further rotation of index wheel 388 causes pin 391 to close switch RCT6 and energize relay C6. Concurrent energization of relay C6 and relay S2 closes associated contacts in the angle positioner relay circuit (FIG. 28C) to energize relay A32. Energization of relay A32 closes normally open contact A32 in the holding circuit thereof and normally open contact A32 in the angle positioner solenoid circuit (FIG. 28D) to energize solenoid AS32 and associated lamp IL32. Energization of solenoid AS32 shifts associated valve AV32 to the left as seen in FIG. 24E to provide pressure fluid from supply line 498 through conduits 442 and 446 to fully extend the piston associated with cylinder AC32, providing an axial displacement of succeeding cylinders AC64, etc., to AC512 along casing 254 corresponding to an angular displacement of saw assembly 30 of 8°.

Continued rotation of index wheel 388 causes pin 389(7) to momentarily close switch T to momentarily energize solenoid TF, thereby stepping the seventh tape row of the second frame to the tape-reading position. As seen in FIG. 31, channels 1, 3, and 4 thereof are perforated and this information is sensed to reader TR to close switches S1, S3, and S4, thereby energizing relays S1, S3, and S4, respectively. Further rotation of index wheel 388 causes pin 391 to close switch RCT7 and energize relay C7. Concurrent energization of relays C7 and S1, S3, and S4 closes associated contacts in the angle positioner relay circuit (FIG. 28C) to energize associated relays A1, A4, and A8. Energization of relays A1, A4 and A8 closes associated normally open contacts A1, A4, and A8 in the holding circuits therefor and associated normally open contacts in the angle positioner solenoid circuit (FIG. 28D) to energize associated solenoids AS1, AS4, and AS8 and associated lamps IL1, IL4 and IL8, respectively. Energization of solenoids AS1, AS4, and AS8 shifts the associated valves AV1, AV4, and AV8 to the left as seen in FIG. 24E to provide pressure fluid from supply line 498 through conduits 442 and 446 to fully extend the pistons associated with cylinders AC1, AC4, and AC8 providing an axial displacement of successive cylinders AC16, etc., to AC512 corresponding to an angular displacement of saw assembly 30 of 3¼°. It is therefore seen that, in accordance with the prepunched information in the second tape frame, cylinders AC1, AC4, AC8, AC32, and AC512 of the angle positioner assembly have been actuated, providing a total piston displacement rotating gear 212 by rack 222 and hence blade 32 through an angle of 139¼° relative to fence F.

Continued rotation of index wheel 388 causes pin 389(8) to momentarily close switch T and momentarily energize solenoid TF, thereby stepping the eighth or CR tape row of the second frame into the tape-reading position. As seen in FIG. 31, channels 1, 3, 4, and 8 thereof are perforated and such information is sensed by reader TR, thereby closing switches S1, S3, S4, and S8 and energizing relays S1, S3, S4, and S8, respectively. As before, energization of the latter relays closes associated normally open contacts S1, S3, S4, and S8 to light lamp IL876 and energize relay CR which closes normally open contact CR after the 12-second time delay to light lamp IL880. Further rotation of index wheel 388 causes pin 391 to close switch RCT8 and energize relay C8. A lamp IL870 is lit indicating that the second tape frame has been stepped through reader TR. Continued rotation of index wheel 388 causes peripheral pin 393 to open normally closed switch 394 and interrupt the timer motor circuit, thereby deenergizing motor M and precluding further rotation of index wheel 388. Thus, saw table 14 and saw assembly 30 have been positioned in accordance with the information on the second frame of the tape to provide a cut through the board W as seen in FIG. 32C.

Lamp IL880 signals the operator that the clamping and sawing operations may be performed. Accordingly, the operator butts the previously cut end of the board against the stop 68 projected by actuation of cylinder PC2 and depresses button CB to clamp the board against fence F and on table 14 as previously described. When clamped, the operator depresses button SB while simultaneously maintaining button CB depressed to energize the saw and saw traverse circuits whereby the saw traverses table 14 to make the cut indicated by the dashed lines in FIG. 32C, the clamping and sawing action being performed in the manner discussed hereinbefore with respect to the first cut.

Third Cut

After completing the first and second cuts on the one end of board W, the double cuts at the opposite end are made. To accomplish this and starting with the third cut, which requires a length position of 8 feet, 11¾ inches from reference point R and an angle position of 120¾° relative to fence F, the operator depresses button RCT to energize timer motor M as previously described, thereby rotating wheel 388 to successively advance the eight rows in the third tape frame through tape reader TR as before. For brevity, it will be understood that switches RCT1-8 are respectively closed and hence corresponding relays C1-C8 respectively energized as respective rows 1-8 step to lie in tape-reading position.

With the first row of the third tape frame stepped to tape-reading position, it is seen in FIG. 31 that channel 1 is not perforated and accordingly switch S1 remains open precluding energization of relay L256 in the length positioner relay circuit, thereby precluding actuation of cylinder LC256 of length positioner 17.

When the second row of the third tape frame is stepped to the tape-reading position, it is seen (FIG. 31) that channels 1, 2, and 4 are perforated and this information is sensed by reader TR which closes switches S1, S2, and S4, thereby energizing relays S1, S2, and S4. The C2 relay is energized as the second row of the third tape frame lies in tape-reading position and concurrent energization of relays C2, S1, S2, and S4 closes associated contacts C2, S1, S2, and S4 in the length positioner relay circuit, thereby energizing relays L16, L32 and L128. Energization of the latter relays closes associated contacts L16, L32, and L128 in the corresponding holding circuits therefor and contacts L16, L32, and L128 in the length positioner solenoid circuit, thereby energizing solenoids LS16, LS32, and LS128 and the associated lamps IL16, IL32, and IL128. Energization of solenoids LS16, LS32, and LS128 shifts valves LV16, LV32 and LV128 to provide pressure fluid to cylinders LC16, LC32 and LC128 to fully extend the pistons thereof.

When the third row of the third tape frame is stepped into tape-reading position, it is seen that channels 1 and 3 are perforated and such information is sensed by reader TR which closes switches S1 and S3, thereby energizing relays S1 and S3. Relay C3 is also energized as the third row lies in tape-reading position. Concurrent energization of relays C3, S1 and S3 closes associated contacts in the length positioner relay circuit, thereby energizing relays L1 and L4. Energization of relays L1 and L4 closes normally open contacts L1 and L4 in the corresponding holding circuits therefor and contacts L1 and L4 in the length positioner solenoid circuit, thereby energizing solenoids LS1 and LS4 and associated lamps IL1 and IL4. Energization of solenoids LS1 and LS4 shifts valves LV1 and LV4 to provide pressure fluid to cylinders LC1 and LC4 to fully extend the pistons thereof. Accordingly, cylinders LC1, LC4, LC16, LC32 and LC128 are actuated providing a total displacement of table 14 from its fully retracted position of 11 5/16 inches.

When the fourth row of the third tape frame is stepped into tape-reading position, it is seen that channel 3 is perforated and such information is sensed by reader TR which closes switch S3, thereby energizing relay S3. Relay C4 is energized as the fourth row lies in tape-reading position. Concurrent energization of relays C4 and S3 closes associated contacts C4 and S3 in the popup relay circuit, thereby energizing relay P4. Energization of relay P4 closes contact P4 in the holding circuit therefor and normally open contact P4, in the popup solenoid circuit, thereby energizing solenoid PS8 and associated lamp IL8. Energization of solenoid PS8 shifts valve PV8 to provide pressure fluid to cylinder PC8 to extend the piston thereof and project the stop 68 connected thereto above the surface of the movable saw table. Thus, length positioner assembly 17 has been actuated in response to the length information prepunched in the third tape frame to project a stop 68 a total distance of 8 feet, 11 5/16 inches from reference point R.

The tape steps to locate the fifth row of the third frame in tape reading position, and it is seen that channel 1 is perforated and such information is sensed by reader TR which closes switch S1, thereby energizing relay S1. Relay C5 is also energized as the fifth row lies in tape-reading position. Concurrent energization of relays C5 and S1 closes associated contacts in the angle positioner relay circuit, thereby energizing relay A256. Energization of relay A256 closes contact A256 in the associated holding circuit therefor and contact A256 in the angle positioner solenoid circuit, thereby energizing solenoid AS256 and associated lamp IL256. Energization of solenoid AS256 shifts valve AV256 to provide pressure fluid to cylinder AC256 to extend the piston thereof, providing an angular displacement of saw assembly 30 of 64°.

When the sixth row of the third tape frame is advanced into the tape-reading position, it is seen that channels 2, 3, and 4 are perforated and such information is sensed by reader TR which closes switches S2, S3, and S4, thereby energizing relays S2, S3, and S4. Relay C6 is energized as the sixth tape row lies in tape-reading position. Concurrent energization of relays C6, S2, S3, and S4 closes associated contacts in the angle positioner relay circuit, thereby energizing relays A32, A64 and A128. Energization of relays A32, A64 and A128 closes corresponding contacts in the holding circuits therefor and closes contacts A32, A64, and A128 in the angle positioner solenoid circuit, thereby energizing solenoids AS32, AS64, and AS128. Energization of solenoids AS32, AS64, and AS128 shifts valves AV32, AV64, and AV128 to provide pressure fluid to cylinders AC32, AC64, and AC128 to extend the pistons thereof, providing an angular displacement of 56°.

The seventh row of the tape is stepped into tape-reading position and it is seen that channels 1 and 2 are perforated and such information is sensed by reader TR which closes switches S1 and S2 to energize relays S1 and S2. Relay C7 is also energized as the seventh tape row lies in tape-reading position. Concurrent energization of relays C7, S1 and S2 closes associated contacts C7, S1, and S2 in the angle positioner relay circuit, thereby energizing relays A1 and A2. Energization of relays A1 and A2 closes contacts A1 and A2 in the associated holding circuits therefor and contacts A1 and A2 in the angle positioner solenoid circuit thereby energizing solenoids AS1 and AS2 and associated lamps IL1 and IL2. Energization of the latter solenoids shifts valves AV1 and AV2 to provide pressure fluid to cylinders AC1 and AC2 to extend the pistons thereof, providing an angular displacement of saw assembly 30 of ¼°. It is thus seen that actuation of cylinders AC1, AC2, AC32, AC64, AC128 and AC256 in response to angle information on the tape provides a total angular displacement of saw assembly 30 of 120¼° relative to fence F.

The eighth tape row steps into the tape-reading position, whereupon the channel 1, 3, 4, and 8 perforations are sensed by reader TR which closes switches S1, S3, S4, and S8 thereby energizing relays S1, S3, S4, and S8. Energization of relays S1, S3, S4, and S8 closes associated contacts to energize relay CR which lights lamp IL880, thereby indicating to the operator that the clamp and saw operations may be performed. The motor circuit for the repeat cycle timer is deenergized as before by opening switch 394.

The operator then slides the board lengthwise along table 14 to butt the previously cut end against the projected stop 68 associated with cylinder PC8 without otherwise displacing the board. The clamp and saw circuits are actuated as before and the third cut is made as illustrated in FIG. 32D.

Fourth Cut

After the first, second, and third cuts are made, the tape is again advanced to successively locate rows 1-8 of the fourth frame in tape-reading position. The tape reader senses the perforations in each of the rows as before to close selected switches S1-S4 and energize selected relays S1-S4. As before, rotation of index wheel 388 successively closes switches RCT1-RCT8 and hence successively energizes relays C1-C8 as corresponding rows 1-8 respectively lie in tape-reading position. As previously described, the concurrent energization of each of the relays C1-C8 with the selected energization of relays S1-S4 corresponding to respective rows 1-8 energizes the respective length, angle and popup relays which, in turn, close associated contacts to energize the corresponding length, angle, and popup solenoids. Energization of the length, angle, and popup solenoids shifts the associated valves to provide pressure fluid to the corresponding cylinders whereby the selected popup stop is projected and located a predetermined distance from reference point R in accordance with the tape information prepunched on the first four rows of frame 4, i.e., 8 feet, 7 5/16 inches, and the saw assembly is rotated to provide an angle of cut in accordance with the tape information on the fifth, sixth and seventh rows of the fourth frame of 30¾°. This position of table 14 and saw assembly 30 for the fourth cut is indicated in FIG. 32E. As before, index wheel 388 stops, the tape feed stops with the eighth or CR row in tape-reading position, and lamp IL880 is lit indicating to the operator that the clamp and saw operations for the fourth cut may be performed. After making the fourth cut, the finished web W is removed from the table and the machine is ready to receive another board for cutting the same in accordance with length and angle information prepunched on tape frames succeeding the tape frames discussed above and which are not herein shown.

It is thus apparent that cuts 1-4 have been efficiently and accurately made, the length of the resulting web W between the pointed ends being equal to 6 feet, 10½ inches. The remaining webs and chords of truss T are similarly cut as web W and web W may be disposed on a jig table, not shown, with the angular cut ends thereof butting the top and bottom chords and webs y and z, respectively, in parallel relation to the butting surfaces thereof preparatory to final assembly. It is seen that the entire cutting operation for a single truss may be performed in a minimum of time and with an accuracy heretofore unavailable and that the webs and chords thereof may be cut without forming an initial waste piece whereby a reduction in the quantity of lumber employed for each truss may be effected.

Accordingly, it can be seen that the objects of the present invention have been fully accomplished in that there is provided an efficient, economical, accurate and laborsaving apparatus for cutting wooden members forming roof trusses, panels, and the like. The efficiency of the machine can be fully appreciated when it is realized that the operator need only slide the board lengthwise along the fabricating table to butt the same against a projected stop and depress a pair of buttons in order to accomplish a cut through a board at a predetermined length and angle. The board is automatically clamped in proper sawing position and it is a safety feature hereof that the same may not be removed therefrom while the saw is rotating and traversing across the table. A high degree of length and angle accuracy is afforded through the use of the serially arranged fluid actuated cylinders. The accuracy of the cut is further enhanced by the provision of a clamp which maintains the saw assembly in the predetermined angular position. It will be noted that wasted saw traversing motion is precluded by the provision of the saw traverse limiting assembly comprising hoop 950, whereby the traverse of saw assembly 30 across table 14 is limited to a predetermined displacement normal to fence F. By a proper selection of the distance between hoop 950 and switch 928, any width of boards over a wide range of widths may be cut without such lost motion.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A cutting machine comprising a framework including a cutting surface, cutting means carried by said framework for rotation about an axis substantially normal to said surface and for traversing movement across said surface, means for rotating said cutting means to selected angular positions, means for moving said cutting means across said surface at said angular positions, reference position means carried by said framework adjacent said surface for movement toward and away from said cutting means, fluid-actuated means for locating said reference position means selected distances from said cutting means, means providing information representing a predetermined distance between said reference position means and said cutting means and a determined angle of traverse, and means responsive to said information means and arranged in controlling relation to said locating means and said rotating means to respectively locate said reference position means a predetermined distance from said cutting means and pivot said cutting means to a predetermined angle.

2. A cutting machine according to claim 1 including means defining a reference point spaced along said surface a predetermined distance from said cutting means, said information means defining a distance between said reference point and said reference position means whereby a predetermined distance is defined between said reference position means and said cutting means.

3. A machine according to claim 1 wherein said reference position means comprises a plurality of stops, means for projecting said stops above said surface at predetermined spaced intervals therealong, said control means being operable to selectively project one of said stops above said surface.

4. A machine according to claim 1 wherein said rotating means is fluid actuated.

5. A machine according to claim 1 wherein said reference position means comprises a plurality of stops, said locating means including a fluid-actuated cylinder connected to each of said stops for projecting the same above said surface at predetermined spaced intervals therealong, said control means including means for sensing said information and providing control signals in response thereto for actuating a fluid cylinder associated with a selected stop to project the latter above said surface.

6. A machine according to claim 1 including a member mounted for movement toward and away from said cutting means, said locating means including a plurality of fluid-actuated cylinders coupled to said member for moving the same, said reference position means being carried by said member for movement therewith, said control means including means for sensing said information and providing control signals in response thereto for selectively actuating said cylinders to locate said reference position means a predetermined distance from said cutting means.

7. A machine according to claim 6 wherein said cylinders provide for movement of said member relative to said cutting means a maximum predetermined distance, each of said cylinders being arranged to move said member relative to said cutting means an incremental distance less than the maximum predetermined distance.

8. A machine according to claim 6 wherein said cylinders are connected axially one to the other in series with one of said cylinders being fixed to said framework, means mounting the remaining cylinders for axial displacement whereby selected actuation of said cylinders displaces succeeding cylinders relative to said fixed cylinder, the cylinder spaced furthest from said fixed cylinder being coupled to said member.

9. A machine according to claim 8 wherein each of said cylinders has a predetermined piston displacement double the piston displacement of the next smallest cylinder whereby said member may be displaced within a range at least equal to the piston displacement of the largest cylinder in increments equal to the piston displacement of the smallest cylinder.

10. A machine according to claim 1 including a table mounted for movement toward and away from said cutting means, said reference position means comprising a plurality of stops carried by said table at predetermined spaced intervals therealong, said locating means including a fluid-actuated cylinder coupled to each of said stops for projecting the same above said table and a plurality of fluid-actuated cylinders coupled to said table for moving the same, said control means including means for sensing said information and providing control signals in response thereto for actuating the cylinder associated with a selected stop to project the latter above the table and selectively actuating the cylinders coupled to said table thereby locating the projected stop a predetermined distance from said cutting means.

11. A machine according to claim 10 wherein said last-mentioned cylinders are connected axially one to the other in series with one of said cylinders being fixed to said framework, means mounting the remaining cylinders for axial displacement whereby selected actuation of said cylinders displaces succeeding cylinders relative to said fixed cylinder, the cylinder spaced furthest from said fixed cylinder being connected to said table, each of said last-mentioned cylinders having a predetermined piston displacement double the piston displacement of the next smallest cylinder, there being a sufficient number of said last-mentioned cylinders whereby said table may be displaced within a range at least equal to the predetermined spacing between said stops less the piston displacement of the smallest cylinder of said last-mentioned cylinders and in increments equal to the piston displacement of the smallest cylinder.

12. A machine according to claim 1 including a member mounted for movement toward and away from said cutting means, said reference position means comprising a plurality of stops carried by said member at equal spaced intervals therealong, said locating means including means for projecting said stops above said cutting surface and means for moving said member selected distances within a range substantially equal to the spacing between a next adjacent pair of said stops, said control means including means for sensing said information and providing control signals in response thereto for projecting a selected stop and moving said member a selected distance thereby locating the projected stop a predetermined distance from said cutting means.

13. A machine according to claim 1 wherein said rotating means comprises a plurality of fluid-actuated cylinders, each of said cylinders providing for a predetermined angular displacement of said cutting means, said control means including means for sensing said information and providing control signals in response thereto for selectively actuating said cylinders.

14. A machine according to claim 13 wherein said cutting surface comprises an elongated table, said cylinders being adapted to rotate said cutting means through a range approximating 180° from an angular position parallel to said elongated table.

15. A machine according to claim 1 wherein said rotating means comprises a plurality of fluid-actuated cylinders connected axially one to the other in series with one of said cylinders being fixed to said framework, means mounting the remaining cylinders for axial displacement whereby selected actuation of said cylinders displaces succeeding cylinders relative to said fixed cylinder, means for translating rectilinear motion into rotary motion, said translating means connecting between the cylinder spaced furtherest from said fixed cylinder and said cutting means for rotating the latter, said control means including means for sensing said information and providing control signals in response thereto for selectively actuating said cylinders to rotate said cutting means to said predetermined angle.

16. A machine according to claim 15 wherein each of said cylinders has a predetermined piston displacement providing a predetermined angular displacement of said cutting means, the piston replacement of each cylinder providing an angular displacement of the cutting means double the angular displacement of the cutting means provided by the piston displacement of the next smallest cylinder.

17. A machine according to claim 15 wherein said mounting means comprises a sleeve pivotally carried by said framework, a guide assembly carried by said sleeve, said cutting means being mounted for traversing movement along said guide assembly, said motion translating means comprising a rack and gear, said rack being connected to the cylinder spaced furthest from said fixed cylinder for linear displacement therewith, said gear being disposed in driving relation to said sleeve.

18. A machine according to claim 1 wherein said cutting surface is adapted to receive a wooden member, the extended axis of rotation of said cutting means intersecting said surface at a fixed point corresponding to the point of entry of said cutting means into the wooden member, said cutting means being mounted for swinging movement through an arc having said fixed point as its center, the cutting means entering the wooden member at the same point irrespective of the angular position of said cutting means.

19. A machine according to claim 15 wherein said cutting surface is adapted to receive a wooden member, said mounting means comprising a sleeve pivotally carried by said framework and having an extended axis of rotation intersecting said surface at a fixed point corresponding to the point of entry of said cutting means into the wooden member, a guide assembly carried by said sleeve, a carriage mounted on said guide assembly for movement therealong, said cutting means being fixed to said carriage for movement therewith and through said fixed point irrespective of the angular position of said cutting means.

20. A machine according to claim 19 wherein said moving means comprises a fluid-actuated cylinder connected between said guide assembly and said carriage for driving said carriage along said guide assembly.

21. A machine according to claim 13 including means for locking said cutting means in said predetermined angular position.

22. A machine according to claim 17 including a plate mounted on said guide assembly and extending in a plane substantially normal to the axis of rotation of said sleeve, a fluid-actuated clamp on said framework for clamping said plate irrespective of the angular position of said cutting means thereby locking said cutting means in said predetermined angle.

23. A machine according to claim 19 wherein said cutting means comprises a motorized saw, means pivotally mounting said saw on said carriage for rotation about an axis substantially normal to the axis of rotation of said carriage, and means for locking said saw in adjusted angular position.

24. A machine according to claim 1 wherein said moving means includes a fluid-actuated cylinder for advancing and retracting said cutting means across said cutting surface, means for actuating said cylinder including means for automatically retracting said cutting means in response to a predetermined advance thereof across said cutting surface.

25. A machine according to claim 24 wherein said cutting surface comprises an elongated table, said retracting means retracting said cutting means in response to a predetermined displacement of said cutting means transversely of said table irrespective of the angle of traverse of said cutting means.

26. A machine according to claim 1 wherein said cutting surface comprises an elongated table adapted to receive a wooden member and having abutment means fixed along said table adjacent a lateral edge portion thereof, and means for displacing the wooden member transversely across said table against said abutment means.

27. A machine according to claim 26 wherein said displacing means comprises an arm spaced above said table and having a member depending from adjacent an outer end portion thereof adjacent the opposite lateral edge portion of said table, said member being movable across said table toward said first-mentioned edge portion to engage the wooden member and displace the same laterally against said abutment means.

28. A machine according to claim 26 wherein said displacing means comprises an arm mounted adjacent said table edge portion for pivotal movement about an axis parallel to the longitudinal axis of the table, said arm extending upwardly and inclinedly over said table and having a member depending from adjacent the outer end portion thereof, said displacing means including means for pivoting said arm downwardly about said axis to swing said member to a position adjacent the opposite table edge portion and for drawing said member inwardly to engage the wooden member and move the same laterally against said abutment means.

29. A machine according to claim 28 wherein said pivotal mounting comprises a track, means mounting said arm for movement along said track, cam means carried by said track and a cam follower carried by said arm, said displacing means comprising a fluid-actuated cylinder for advancing and retracting said arm along said track, retraction of said arm along said track causing said arm to pivot downwardly about said mounting axis to draw said member toward said first-mentioned edge portion to butt the wooden member against said abutment means, and advancement of said arm along said track displacing said member away from said first-mentioned edge portion toward the opposite edge portion whereat said cam means and cam follower coact to pivot said arm to extend upwardly and inclinedly over said table.

30. A machine according to claim 1 wherein said cutting surface comprises an elongated table adapted to receive a wooden member and means for clamping the wooden member against said table.

31. A machine according to claim 30 wherein said clamping means comprises an arm pivotally mounted to said framework and having a clamping jaw carried by an end portion thereof, and a fluid-actuated cylinder connected to said arm to pivot the same and move said jaw toward and away from the wooden member.

32. A machine according to claim 31 wherein said clamping means includes a second arm pivotally mounted to said framework and having a clamping jaw carried by an end portion thereof below said table, said fluid cylinder being connected between the opposite end portions of said first and second arms for moving said clamping jaws simultaneously toward and away from each other to clamp the table and wooden member therebetween and to release the same.

33. A cutting machine comprising a framework including a cutting surface, cutting means carried by said framework for traversing movement across said surface, means for moving said cutting means across said surface, reference position means carried by said framework and spaced along said cutting surface from said cutting means for establishing a distance of cut between said cutting means and said reference position means, fluid-actuated means for providing relative movement between said cutting means and said reference position means toward and away from one another to selectively adjust the distance therebetween, means providing information representing a predetermined distance between said reference position means and said cutting means, and means responsive to said information means and arranged in controlling relation to said fluid-actuated means to provide a predetermined distance between said cutting means and said reference position means.

34. A cutting machine according to claim 33 wherein said fluid-actuated means comprises at least one cylinder, said control means including means for sensing said information and providing control signals in response thereto for actuating said cylinder.

35. A machine according to claim 33 wherein said fluid-actuated means comprises a plurality of fluid-actuated cylinders, said control means including means for sensing said information and providing control signals in response thereto for selectively actuating said cylinders.

36. A machine according to claim 35 wherein said cylinders are connected axially one to the other in series with one of said cylinders being fixed to said framework, means mounting the remaining cylinders for axial displacement whereby actuation of said cylinders displaces succeeding cylinders relative to said fixed cylinder.

37. A machine according to claim 36 wherein each of said cylinders has a predetermined piston displacement double the piston displacement of the next smaller cylinder whereby the distance between said cutting means and said reference position means may be adjusted within a range at least equal to the piston displacement of the largest cylinder in increments equal to the piston displacement of the smaller cylinder.

38. A machine according to claim 33 wherein said reference position means comprises a plurality of stops carried by said framework and said fluid-actuated means includes a fluid-actuated cylinder connected to each stop for projecting the same above said cutting surface at predetermined spaced intervals therealong, said control means including means for sensing said information and providing control signals in response thereto for actuating the cylinder associated with a selected stop to project the same above the cutting surface.

39. A machine according to claim 38 wherein said stops are located on opposite sides of said cutting means.

40. A machine according to claim 38 wherein said cutting surface comprises a table mounted for movement relative to said cutting means, said stops being carried by said table for movement therewith, said adjusting means including a plurality of fluid-actuated cylinders connected to said table for moving the same, said sensing means providing control signals for selectively actuating said last-mentioned cylinders to move said table a selected distance relative to said cutting means.

41. A machine according to claim 40 wherein said last-mentioned cylinders are connected axially one to the other in series with one of said cylinders being fixed to said framework, and means mounting the remaining cylinders for axial displacement whereby actuation of said cylinders displaces succeeding cylinders relative to said fixed cylinder.

42. A machine according to claim 33 wherein said cutting surface comprises a table adapted to receive a wooden member, means forming an abutment adjacent a lateral edge of said table, and means for moving the wooden member across said table for engagement against said abutment means.

43. A machine according to claim 33 wherein said cutting surface comprises a table adapted to receive a wooden member, and means for clamping said wooden member to said table surface thereby holding the wooden member rigid as said cutting means traverses said table.

44. A machine according to claim 38 wherein said cutting surface comprises a table adapted to receive a wooden member, means for clamping said wooden member to said table surface, means for actuating said clamping means, said control means being operable to retract the projected stop in response to actuation of said clamping means.

45. A cutting machine comprising framework including a cutting surface, cutting means carried by said framework for rotation about an axis substantially normal to said surface, fluid-actuated means for rotating said cutting means to selected angular positions, means providing information representing a predetermined angular position of said cutting means, and means responsive to said information means and arranged in controlling relation to said rotating means to rotate said cutting means to a predetermined angular position.

46. A machine according to claim 45 wherein said rotating means comprises a plurality of fluid-actuated cylinders, said control means including means for sensing said information and providing control signals in response thereto for rotating said cutting means to a predetermined angular position.

47. A machine according to claim 46 wherein said cylinders are connected axially one to the other in series with one of said cylinders being fixed to said framework, means mounting the remaining cylinders for axial displacement whereby actuation of said cylinders displaces succeeding cylinders axially relative to said fixed cylinder.

48. A machine according to claim 47 wherein each of said cylinders has a predetermined piston displacement providing a predetermined angular displacement of said cutting means, the piston displacement of each cylinder providing an angular displacement of the cutting means double the angular displacement of the cutting means provided by the piston displacement of the next smaller cylinder.

49. A machine according to claim 46 including a guide assembly pivotally carried by said framework, a carriage carried by said guide assembly for rotation therewith and mounted for movement relative thereto across said cutting surface, said cutting means being carried by said carriage, and fluid-actuated means connecting between said guide assembly and said carriage for moving said carriage and cutting means across said cutting surface.

50. A machine according to claim 45 including means for clamping said cutting means in said predetermined angular position.

51. A cutting machine comprising framework including a cutting surface, cutting means mounted to said framework for rotation about an axis substantially normal to said cutting surface, fluid-actuated means for rotating said cutting means to selected angular positions, reference position means carried by said framework and spaced along said cutting surface from said cutting means for establishing a distance of cut between said cutting means and said reference position means, and fluid-actuated means for selectively adjusting the distance between said cutting means and said reference position means, means providing information representing a predetermined distance between said cutting means and said reference position means and a predetermined angular position of said cutting means, and means responsive to said information means and arranged in controlling relation to said adjusting means and said rotating means to provide a predetermined distance between said cutting means and said reference position means and to rotate said cutting means to a predetermined angular position.

52. A machine according to claim 51 wherein said cutting surface comprises a table adapted to receive a wooden member, means forming an abutment adjacent a lateral edge of said table, and means for moving the wooden member across said table for engagement against said abutment means.

53. A machine according to claim 51 wherein said cutting surface comprises a table adapted to receive a wooden member, and means for clamping said wooden member to said table surface thereby holding the wooden member rigid as said cutting means traverses said table.

54. A machine according to claim 51 including means mounting said cutting means for traversing movement across said cutting surface irrespective of the angular position thereof, means for moving said cutting means from an initial position across said surface at said predetermined angle, and means responsive to a predetermined displacement of said cutting means across said cutting surface preventing further movement across said cutting surface.

55. A machine according to claim 54 wherein said latter means automatically reverses the direction of movement of said cutting means to move the same toward its initial position in response to said predetermined displacement of said cutting means.

56. A machine according to claim 51 including means for normally disabling said cutting means.

57. A machine according to claim 53 including means mounting said cutting means for traversing movement across said cutting surface, means for moving said cutting means across said surface, means normally disabling said cutting means and moving means, and means response to actuation of said clamping means to enable said cutting means and said moving means to permit said cutting means to make a cutting traverse across said surface.

* * * * *

PO-1050
(5/69)

UNITED STATES PATENT OFFICE
CERTIFICATE OF CORRECTION

Patent No. 3,620,270  Dated  November 16, 1971

Inventor(s)  JOHN C. JUREIT et al

It is certified that error appears in the above-identified patent and that said Letters Patent are hereby corrected as shown below:

Col. 4, line 61, "the popup" should read --of the popup--.
Col. 6, line 23, "section" should read --sectional--.
Col. 7, line 71, "across" should read --cross--.
Col. 11, line 52, "baring" should read --bearing--; line 61, "212" should read --242--.
Col. 12, line 64, "a at" should read --welding at--.
Col. 14, line 14, "3878" should read --378--; line 66, "in" should read --pin--.
Col. 16, line 22, "associates" should read --associated--; line 25, "valves" should read --valve(s)--.
Col. 18, line 68, "sifted" should read --shifted--; line 72, "cc" should read --CC--.
Col. 19, line 10, "conduit" should read --conduits--.
Col. 21, line 49, "to" second occurrence should read --at--; line 74, after "AC64," and before "and" --AC4,-- should be inserted.
Col. 22, line 1, "correspond" should read --corresponding--; line 56, "time" should read --timer--; line 64, "contract" should read --contact--; line 71, "preformed" should read --performed--.
Col. 23, line 75, "time" should read --timer--.
Col. 25, line 55, "tape-reading" should read --index--.
Col. 26, line 9, "574" should read --575--.
Col. 27, line 9, "the" first occurrence should read --and--; line 30, "piston" should read --piston(s)--; line 46, "wheel 399" should read --wheel 388--; line 50, "energized" second occurrence should read --energize--.
Col. 28, line 59, "Relays" should read --relays--; line 61, "relay" should read --relays--; line 62, "lead" should read --lead line--.

---- over

UNITED STATES PATENT OFFICE
CERTIFICATE OF CORRECTION

Patent No. 3,620,270            Dated November 16, 1971

Inventor(s)     JOHN C. JUREIT et al

It is certified that error appears in the above-identified patent and that said Letters Patent are hereby corrected as shown below:

Col. 30, line 24, "angle" second occurrence should read --angular--; line 47, "the" second occurrence should read --and--; line 61, "lines" should read --line--.

Col. 31, line 48, "eight" should read --eighth--.

Col. 32, line 10, "ILT" should read --ILF--; line 17, "connecting" should read --connecting between--; line 58, "reacted" should read --retracted--; line 60, "as closed" should read --closed--.

Col. 33, line 8, "is" should read --to--; line 13, "lamps" should read --lamp--; line 28, "lines 903" should read --lines 923--; line 55, "leas" should read --lead--; line 75, "normal" should read --normally open--.

Col. 34, line 19, "energized" should read --energizes--; line 33, "F," should read --F--; line 37, "hoop" should read --hoop 950--; line 37, "transverse" should read --traverse--.

Col. 36, lines 43 and 73, "657" should read --675--.

Col. 37, line 51, "distanced" should read --distances--; line 54, "e.g." should read --etc.--; line 54, "81" should read --80--.

Col. 39, lines 3 and 5, "sixth" should read --seventh--; line 8, "leas" should read --lead--; line 14, "relay" second occurrence should read --relays--; line 24, "respectively,connecting" should read --respectively, via circuits including lead lines 844, 843, and 841, respectively, connecting--; line 31, cancel "provide"; line 47, "8 3/4 inches" should read --8 7/8 inches--.

Col. 40, line 7, "a web" should read --web--; line 24, "energized" should read --deenergized--.

Col. 43, line 10, "to" should read --by--.

---- over

PO-1050
(5/69)

UNITED STATES PATENT OFFICE
CERTIFICATE OF CORRECTION

Patent No. 3,620,270  Dated November 16, 1971

Inventor(s) JOHN C. JUREIT et al

It is certified that error appears in the above-identified patent and that said Letters Patent are hereby corrected as shown below:

Col. 44, line 2, "11 3/4 inches" should read --11 5/16 inches--.
Col. 45, line 45, "1/4°" should read --3/4°--; line 48, "120 1/4°" should read --120 3/4°--.
Col. 46, line 19, "perforated" should read --performed--.
Col. 47, line 13, Claim 1, "determined" should read --predetermined--.
Col. 48, line 72, Claim 16, "replacement" should read --displacement--.
Col. 52, line 66, Claim 57, "response" should read --responsive--.

Signed and sealed this 20th day of June 1972.

(SEAL)
Attest:

EDWARD M. FLETCHER, JR.
Attesting Officer

ROBERT GOTTSCHALK
Commissioner of Patents